US011987649B2

(12) United States Patent
Lavigne et al.

(10) Patent No.: US 11,987,649 B2
(45) Date of Patent: *May 21, 2024

(54) WET MILLING PROCESS

(71) Applicant: Novozymes A/S, Bagsvaerd (DK)

(72) Inventors: James Lavigne, Wake Forest, NC (US); Bernardo Vidal, Jr., Wake Forest, NC (US); Thomas Patrick Gibbons, Wake Forest, NC (US); Chee-Leong Soong, Raleigh, NC (US); Randall Scott Deinhammer, Wake Forest, NC (US); Zhen Long, Beijing (CN); Yi Cao, Beijing (CN); Michael John Akerman, Wake Forest, NC (US); Xinyu Shen, Wake Forest, NC (US); Yu Zhang, Beijing (CN); Brian R. Scott, West Sacramento, CA (US)

(73) Assignee: NOVOZYMES A/S, Bagsvaerd (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,638

(22) Filed: Apr. 12, 2023

(65) Prior Publication Data

US 2023/0235094 A1    Jul. 27, 2023

Related U.S. Application Data

(60) Continuation of application No. 17/060,477, filed on Oct. 1, 2020, now Pat. No. 11,649,298, which is a division of application No. 15/773,083, filed as application No. PCT/CN2016/107282 on Nov. 25, 2016, now Pat. No. 10,836,837.

(30) Foreign Application Priority Data

Nov. 25, 2016  (WO) ............... PCT/CN2016/107282

(51) Int. Cl.
*C08B 30/04*  (2006.01)
*C08B 30/02*  (2006.01)
*C08H 99/00*  (2010.01)

(52) U.S. Cl.
CPC ............ *C08B 30/044* (2013.01); *C08B 30/02* (2013.01); *C08H 99/00* (2013.01)

(58) Field of Classification Search
None
See application file for complete search history.

(56) References Cited

U.S. PATENT DOCUMENTS

| | | | |
|---|---|---|---|
| 5,066,218 A | 11/1991 | Silver | |
| 5,693,518 A | 12/1997 | Kofod et al. | |
| 6,562,340 B1 | 5/2003 | Bedford et al. | |
| 6,566,125 B2 | 5/2003 | Johnston et al. | |
| 7,666,648 B2 | 2/2010 | Foreman et al. | |
| 10,711,259 B2 | 7/2020 | Peng et al. | |
| 11,180,786 B2 | 11/2021 | Cao et al. | |
| 2008/0171360 A1 | 7/2008 | Lange et al. | |
| 2008/0274527 A1 | 11/2008 | Soerensen et al. | |
| 2009/0117630 A1 | 5/2009 | Olsen et al. | |
| 2009/0136476 A1 | 5/2009 | Soerensen et al. | |
| 2009/0148901 A1 | 6/2009 | Lopez De Leon et al. | |
| 2010/0189706 A1 | 7/2010 | Chang et al. | |
| 2011/0078830 A1 | 3/2011 | Tang et al. | |
| 2011/0086408 A1 | 4/2011 | Power et al. | |
| 2011/0111453 A1* | 5/2011 | McBrayer ............ | C12N 9/2445 435/243 |
| 2011/0131687 A1 | 6/2011 | Maranta et al. | |
| 2012/0040410 A1 | 2/2012 | Prade et al. | |
| 2014/0273119 A1 | 9/2014 | Liu et al. | |
| 2014/0287465 A1 | 9/2014 | Spodsberg et al. | |
| 2015/0315297 A1 | 11/2015 | Han et al. | |
| 2017/0335302 A1 | 11/2017 | Peng et al. | |
| 2019/0002592 A1 | 1/2019 | Cao et al. | |
| 2020/0291372 A1 | 9/2020 | Peng et al. | |
| 2021/0079368 A9 | 3/2021 | Peng et al. | |

FOREIGN PATENT DOCUMENTS

| | | |
|---|---|---|
| AU | 2011239240 | 10/2011 |
| CN | 101166830 A | 4/2008 |
| CN | 101184845 A | 5/2008 |
| CN | 101978050 A | 2/2011 |
| CN | 104812778 A | 7/2015 |
| CN | 104822838 A | 8/2015 |
| WO | 1994021785 A1 | 9/1994 |
| WO | 1996023062 A1 | 8/1996 |
| WO | 2002000731 A1 | 1/2002 |
| WO | 2002000910 A2 | 1/2002 |
| WO | 2002000911 A1 | 1/2002 |

(Continued)

OTHER PUBLICATIONS

Chica et al. Curr Opin Biotechnol. Aug. 2005;16(4):378-84. (Year: 2005).*
Singh et al. Curr Protein Pept Sci. 2017, 18, 1-11 (Year: 2017).*
Accession A0A0C3D2W4. Apr. 1, 2015 (Year: 2015).*
Laothanachareon et al., Bioresource Technol, 2015, 682-690, 198.
Berrin et al., Biotechnol Lett, 2008, 1139-1150, 30.
Fortune et al., BMC Biotechnol, 2019, 1-13, 19: 22.
Kan et al. 2014, Modern Food Science and Technology 30, 42-46.
Agger et al., Journal of Agricultural and Food Chemistry, 2010, 6141-6148, 58.
Anonymous, NCBI Reference sequence No. XP 001389998.1, 2011.
Anonymous, NCBI Reference sequence WP 003231534.1, 2015.
Anonymous, NCBI Reference sequence XP 001389996.2, 2011.
Chica et al., Current Opinion in Biotechnology, 2005, 378-384, 16(4).

(Continued)

*Primary Examiner* — Christian L Fronda
(74) *Attorney, Agent, or Firm* — David A. Fazzolare

(57) ABSTRACT

The present invention provides process for treating crop kernels, comprising the steps of a) soaking kernels in water to produce soaked kernels; b) grinding the soaked kernels; c) treating the soaked kernels in the presence of an effective amount of GH62 polypeptide having arabinofuranosidase activity or a GH43 polypeptide having arabinofuranosidase activity, wherein step c) is performed before, during or after step b).

20 Claims, No Drawings
Specification includes a Sequence Listing.

(56) References Cited

FOREIGN PATENT DOCUMENTS

| WO | 2002002644 | A1 | 1/2002 |
|---|---|---|---|
| WO | 2005059084 | A1 | 6/2005 |
| WO | 2006114095 | A1 | 11/2006 |
| WO | 2006125438 | A1 | 11/2006 |
| WO | 2009018537 | A2 | 2/2009 |
| WO | 2009073383 | A1 | 6/2009 |
| WO | 2009108941 | A2 | 9/2009 |
| WO | 2009117689 | A1 | 9/2009 |
| WO | 2011057140 | A1 | 5/2011 |
| WO | 2011153516 | A2 | 12/2011 |
| WO | 2012011130 | A2 | 1/2012 |
| WO | 2012103288 | A1 | 8/2012 |
| WO | 2013182669 | A2 | 12/2013 |
| WO | 2014082564 | A1 | 6/2014 |
| WO | 2014202716 | A1 | 12/2014 |
| WO | 2016082771 | A1 | 6/2016 |
| WO | 2017088820 | A1 | 6/2017 |

OTHER PUBLICATIONS

Couturier et al., BMC Genomics, 2012, 1-14, 13(57).
Fujii et al., 2022, Uniprot access No. A0A2H5BN17.
Futagami et al., EBI Accessh No. G7Y053, 2016.
Futagami et al., GenBank, Access, No. GAA92551, 2015.
Gao et al., Grain Distribution Technology, 2012, 36-42, 6.
Gielkens et al., FASTA Graphics, 2006.
Hashimoto et al., Journal of Bioscience and Bioengineer, 2003, 164-169, 95(2).
He et al., Metallurgical Industry Press, 2015, 211.
Huismann et al., Carbohydrate Polymers 43, 2000, 269-279, 43.
Ichikawa et al., EBI Access No. E4NJK0, 2011.
Johnston et al., Cereal Chemistry, 2004, 626-632, 81(5).
Jordan et al., Biochem. J., 2012, 241-252, 442.
Kaemper et al., 2014, Uniprot Access No. Q4P902.
Kamper et al., 2014, Uniprot Access No. Q4P6F4.
Kaur et al., Microbial Biotechnology, 2014, 419-433, 8(3).
Kubicek et al., GenBank Access No. EHK20487, 2011.
Liao et al., GenBank No. AGW24288.1, 2013.
Liu et al., UniProt Access No. S7ZW00, 2014.
Moroz et al., Acta Cryst, 2018, 490-495, F74.
Nielsen et al., UniProt Access No. A0A1V6NXM6, 2018.
Ottenheim et al., EBI Access No. A0A0S2CWJ5, 2016.
Pel et al., EBI Access No. A2QFV9, 2010.
Popper et al., Plant Physiology, 2010, 373-383, 153.
Rantanen et al., Carbohydrate Polymers, 2007, 350-359, 68.
Sakamoto et al., Appl Microbiol Biotechnol, 2011, 137-146, 90.
Sakamoto et al., UniProt Access No. B5MGR2, 2014.
Singh et al., Current Protein and Peptide Science, 2017, 1-11, 18.
Soerensen et al., EBI Access No. CS459135, 2007.
Takahashi et al., FASTA Graphics, 2013.
Wahl et al., Methods in Enzymology, 1987, 399-407, 152.
Yang et al., Appi Biochem Biotechnol, 2015, 1960-1970, 175.
Zhao et al., Food anti nutritional factor, China Agricultural University Press, 2015, 33-34.

\* cited by examiner

WET MILLING PROCESS

CROSS-REFERENCE TO RELATED APPLICATIONS

This application is a continuation of U.S. application Ser. No. 17/060,477 filed Oct. 1, 2020, now U.S. Pat. No. 11,649,298, which is a division of U.S. application Ser. No. 15/773,083 filed May 2, 2018, and issued U.S. Pat. No. 10,836,837 granted Nov. 17, 2020, which is a 35 U.S.C. 371 national application of PCT/CN2016/107282 filed Nov. 25, 2016, which claims priority or the benefit of international application no. PCT/CN2015/095621 filed Nov. 26, 2015. The content of each application is fully incorporated herein by reference.

REFERENCE TO A SEQUENCE LISTING

This application contains a Sequence Listing in computer readable form, which is incorporated herein by reference.

BACKGROUND OF THE INVENTION

Field of the Invention

The present invention relates to an improved process of treating crop kernels to provide a starch product of high quality suitable for conversion of starch into mono- and oligosaccharides, ethanol, sweeteners, etc. Further, the invention also relates to an enzyme composition comprising one or more enzyme activities suitable for the process of the invention and to the use of the composition of the invention.

Description of the Related Art

Before starch, which is an important constituent in the kernels of most crops, such as corn, wheat, rice, sorghum bean, barley or fruit hulls, can be used for conversion of starch into saccharides, such as dextrose, fructose; alcohols, such as ethanol; and sweeteners, the starch must be made available and treated in a manner to provide a high purity starch. If starch contains more than 0.5% impurities, including the proteins, it is not suitable as starting material for starch conversion processes. To provide such pure and high quality starch product starting out from the kernels of crops, the kernels are often milled, as will be described further below.

Wet milling is often used for separating corn kernels into its four basic components: starch, germ, fiber and protein.

Typically, wet milling processes comprise four basic steps. First the kernels are soaked or steeped for about 30 minutes to about 48 hours to begin breaking the starch and protein bonds. The next step in the process involves a coarse grind to break the pericarp and separate the germ from the rest of the kernel. The remaining slurry consisting of fiber, starch and protein is finely ground and screened to separate the fiber from the starch and protein. The starch is separated from the remaining slurry in hydrocyclones. The starch then can be converted to syrup or alcohol, or dried and sold as corn starch or chemically or physically modified to produce modified corn starch.

The use of enzymes has been suggested for the steeping step of wet milling processes. The commercial enzyme product Steepzyme® (available from Novozymes A/S) has been shown suitable for the first step in wet milling processes, i.e., the steeping step where corn kernels are soaked in water.

More recently, "enzymatic milling", a modified wet-milling process that uses proteases to significantly reduce the total processing time during corn wet milling and eliminates the need for sulfur dioxide as a processing agent, has been developed. Johnston et al., 2004, Cereal Chem. 81: 626-632.

U.S. Pat. No. 6,566,125 discloses a method for obtaining starch from maize involving soaking maize kernels in water to produce soaked maize kernels, grinding the soaked maize kernels to produce a ground maize slurry, and incubating the ground maize slurry with enzyme (e.g., protease).

U.S. Pat. No. 5,066,218 discloses a method of milling grain, especially corn, comprising cleaning the grain, steeping the grain in water to soften it, and then milling the grain with a cellulase enzyme.

WO 02/00731 discloses a process of treating crop kernels, comprising soaking the kernels in water for 1-12 hours, wet milling the soaked kernels and treating the kernels with one or more enzymes including an acidic protease.

WO 02/00911 discloses a process of starch gluten separation, comprising subjecting mill starch to an acidic protease.

WO 02/02644 discloses a process of washing a starch slurry obtained from the starch gluten separation step of a milling process, comprising washing the starch slurry with an aqueous solution comprising an effective amount of acidic protease.

There remains a need for improvement of processes for providing starch suitable for conversion into mono- and oligo-saccharides, ethanol, sweeteners, etc.

SUMMARY OF THE INVENTION

The invention provides a process for treating crop kernels, comprising the steps of a) soaking kernels in water to produce soaked kernels; b) grinding the soaked kernels; c) treating the soaked kernels in the presence of one or more GH62 polypeptides having arabinofuranosidase activity, wherein step c) is performed before, during or after step b).

In one embodiment, the invention provides a process for treating crop kernels, comprising the steps of a) soaking kernels in water to produce soaked kernels; b) grinding the soaked kernels; c) treating the soaked kernels in the presence of one or more GH62 polypeptides having arabinofuranosidase activity and one or more GH10 or GH11 polypeptides having xylanase activity, wherein step c) is performed before, during or after step b).

In one embodiment, the invention provides the use of a GH62 polypeptide having arabinofuranosidase activity to enhance the wet milling benefit of one or more enzymes.

The invention provides a process for treating crop kernels, comprising the steps of a) soaking kernels in water to produce soaked kernels; b) grinding the soaked kernels; c) treating the soaked kernels in the presence of one or more GH43 polypeptides having arabinofuranosidase activity, wherein step c) is performed before, during or after step b).

In one embodiment, the invention provides a process for treating crop kernels, comprising the steps of a) soaking kernels in water to produce soaked kernels; b) grinding the soaked kernels; c) treating the soaked kernels in the presence of one or more GH43 polypeptides having arabinofuranosidase activity and one or more GH10 or GH11 polypeptides having xylanase activity, wherein step c) is performed before, during or after step b).

In one embodiment, step c) mentioned above is performed during fiber washing step.

In one embodiment, the invention provides the use of a GH43 polypeptide having arabinofuranosidase activity to enhance the wet milling benefit of one or more enzymes.

Definitions

Auxiliary Activity 9 polypeptide: The term "Auxiliary Activity 9 polypeptide" or "AA9 polypeptide" means a polypeptide classified as a lytic polysaccharide monooxygenase (Quinlan et al., 2011, *Proc. Natl. Acad. Sci. USA* 208: 15079-15084; Phillips et al., 2011, *ACS Chem. Biol.* 6: 1399-1406; Lin et al., 2012, *Structure* 20: 1051-1061). AA9 polypeptides were formerly classified into the glycoside hydrolase Family 61 (GH61) according to Henrissat, 1991, *Biochem. J.* 280: 309-316, and Henrissat and Bairoch, 1996, *Biochem. J.* 316: 695-696.

AA9 polypeptides enhance the hydrolysis of a cellulosic material by an enzyme having cellulolytic activity. Cellulolytic enhancing activity can be determined by measuring the increase in reducing sugars or the increase of the total of cellobiose and glucose from the hydrolysis of a cellulosic material by cellulolytic enzyme under the following conditions: 1-50 mg of total protein/g of cellulose in pretreated corn stover (PCS), wherein total protein is comprised of 50-99.5% w/w cellulolytic enzyme protein and 0.5-50% w/w protein of an AA9 polypeptide for 1-7 days at a suitable temperature, such as 40° C.-80° C., e.g., 40° C., 45° C., 50° C., 55° C., 60° C., 65° C., 70° C., 75° C., or 80° C., and a suitable pH, such as 4-9, e.g., 4.0, 4.5, 5.0, 5.5, 6.0, 6.5, 7.0, 7.5, 8.0, 8.5, or 9.0, compared to a control hydrolysis with equal total protein loading without cellulolytic enhancing activity (1-50 mg of cellulolytic protein/g of cellulose in PCS).

AA9 polypeptide enhancing activity can be determined using a mixture of CELLUCLAST® 1.5 L (Novozymes A/S, Bagsværd, Denmark) and beta-glucosidase as the source of the cellulolytic activity, wherein the beta-glucosidase is present at a weight of at least 2-5% protein of the cellulase protein loading. In one aspect, the beta-glucosidase is an *Aspergillus oryzae* beta-glucosidase (e.g., recombinantly produced in *Aspergillus oryzae* according to WO 02/095014). In another aspect, the beta-glucosidase is an *Aspergillus fumigatus* beta-glucosidase (e.g., recombinantly produced in *Aspergillus oryzae* as described in WO 02/095014).

AA9 polypeptide enhancing activity can also be determined by incubating an AA9 polypeptide with 0.5% phosphoric acid swollen cellulose (PASC), 100 mM sodium acetate pH 5, 1 mM $MnSO_4$, 0.1% gallic acid, 0.025 mg/ml of *Aspergillus fumigatus* beta-glucosidase, and 0.01% TRITON® X-100 (4-(1,1,3,3-tetramethylbutyl)phenyl-polyethylene glycol) for 24-96 hours at 40° C. followed by determination of the glucose released from the PASC.

AA9 polypeptide enhancing activity can also be determined according to WO 2013/028928 for high temperature compositions.

AA9 polypeptides enhance the hydrolysis of a cellulosic material catalyzed by enzyme having cellulolytic activity by reducing the amount of cellulolytic enzyme required to reach the same degree of hydrolysis preferably at least 1.01-fold, e.g., at least 1.05-fold, at least 1.10-fold, at least 1.25-fold, at least 1.5-fold, at least 2-fold, at least 3-fold, at least 4-fold, at least 5-fold, at least 10-fold, or at least 20-fold.

The AA9 polypeptide can also be used in the presence of a soluble activating divalent metal cation according to WO 2008/151043 or WO 2012/122518, e.g., manganese or copper.

The AA9 polypeptide can be used in the presence of a dioxy compound, a bicylic compound, a heterocyclic compound, a nitrogen-containing compound, a quinone compound, a sulfur-containing compound, or a liquor obtained from a pretreated cellulosic or hemicellulosic material such as pretreated corn stover (WO 2012/021394, WO 2012/021395, WO 2012/021396, WO 2012/021399, WO 2012/021400, WO 2012/021401, WO 2012/021408, and WO 2012/021410).

Allelic variant: The term "allelic variant" means any of two or more alternative forms of a gene occupying the same chromosomal locus. Allelic variation arises naturally through mutation and may result in polymorphism within populations. Gene mutations can be silent (no change in the encoded polypeptide) or may encode polypeptides having altered amino acid sequences. An allelic variant of a polypeptide is a polypeptide encoded by an allelic variant of a gene.

Arabinofuranosidase: The term "arabinofuranosidase" means an alpha-L-arabinofuranoside arabinofuranohydrolase (EC 3.2.1.55) that catalyzes the hydrolysis of terminal non-reducing alpha-L-arabinofuranoside residues in alpha-L-arabinosides. The enzyme acts on alpha-L-arabinofuranosides, alpha-L-arabinans containing (1,3)- and/or (1,2)- and/or (1,5)-linkages, arabinoxylans, and arabinogalactans. Alpha-L-arabinofuranosidase is also known as arabinosidase, alpha-arabinosidase, alpha-L-arabinosidase, alpha-arabinofuranosidase, polysaccharide alpha-L-arabinofuranosidase, alpha-L-arabinofuranoside hydrolase, L-arabinosidase, or alpha-L-arabinanase. Arabinofuranosidase activity can be determined using 5 mg of medium viscosity wheat arabinoxylan (Megazyme International Ireland, Ltd., Bray, Co. Wicklow, Ireland) per ml of 100 mM sodium acetate pH 5 in a total volume of 200 µl for 30 minutes at 40° C. followed by arabinose analysis by AMINEX® HPX-87H column chromatography (Bio-Rad Laboratories, Inc., Hercules, CA, USA).

The arabinofuranosidases of the present invention have at least 50% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66 and SEQ ID NO: 69. In a preferred embodiment, the arabinofuranosidase of the present invention have at least 70% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118. In a more preferred embodiment, the arabinofuranosidase of the present invention have at least 80% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO:

42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118. In an even more preferred embodiment, the arabinofuranosidase of the present invention have at least 90% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118. In a most preferred embodiment, the arabinofuranosidase of the present invention have at least 95% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118.

Arabinoxylan-containing material: The term "Arabinoxylan-containing material" means any material containing arabinoxylan. Arabinoxylan is a hemicellulose found in both the primary and secondary cell walls of plants, including woods and cereal grains, consisting of copolymers of two pentose sugars, arabinose and xylose. The arabinoxylan chain contains a large number of 1,4-linked xylose units. Many xylose units are substituted with 2-, 3- or 2,3-substituted arabinose residues.

Examples of arabinoxylan-containing material are forage, roughage, seeds and grains (either whole or prepared by crushing, milling, etc from, e.g., corn, oats, rye, barley, wheat), trees or hard woods (such as poplar, willow, eucalyptus, palm, maple, birch), bamboo, herbaceous and/or woody energy crops, agricultural food and feed crops, animal feed products, cassava peels, cocoa pods, sugar cane, sugar beet, locust bean pulp, vegetable or fruit pomaces, wood waste, bark, shavings, sawdust, wood pulp, pulping liquor, waste paper, cardboard, construction and demolition wood waste, industrial or municipal waste water solids or sludge, manure, by-product from brewing and/or fermentation processes, wet distillers grain, dried distillers grain, spent grain, vinasse and bagasse.

Forage as defined herein also includes roughage. Forage is fresh plant material such as hay and silage from forage plants, grass and other forage plants, grass and other forage plants, seaweed, sprouted grains and legumes, or any combination thereof. Examples of forage plants are Alfalfa (Lucerne), birdsfoot trefoil, brassica (e.g., kale, rapeseed (canola), rutabaga (swede), turnip), clover (e.g., alsike clover, red clover, subterranean clover, white clover), grass (e.g., Bermuda grass, brome, false oat grass, fescue, heath grass, meadow grasses, miscanthus, orchard grass, ryegrass, switchgrass, Timothy-grass), corn (maize), hemp, millet, barley, oats, rye, sorghum, soybeans and wheat and vegetables such as beets. Crops suitable for ensilage are the ordinary grasses, clovers, alfalfa, vetches, oats, rye and maize. Forage further includes crop residues from grain production (such as corn stover; straw from wheat, barley, oat, rye and other grains); residues from vegetables like beet tops; residues from oilseed production like stems and leaves form soy beans, rapeseed and other legumes; and fractions from the refining of grains for animal or human consumption or from fuel production or other industries.

Roughage is generally dry plant material with high levels of fiber, such as fiber, bran, husks from seeds and grains and crop residues (such as stover, copra, straw, chaff, sugar beet waste).

Preferred sources of arabinoxylan-containing materials are forage, roughage, seeds and grains, sugar cane, sugar beet and wood pulp.

Beta-glucosidase: The term "beta-glucosidase" means a beta-D-glucoside glucohydrolase (E.C. 3.2.1.21) that catalyzes the hydrolysis of terminal non-reducing beta-D-glucose residues with the release of beta-D-glucose. Beta-glucosidase activity can be determined using p-nitrophenyl-beta-D-glucopyranoside as substrate according to the procedure of Venturi et al., 2002, *J. Basic Microbiol.* 42: 55-66. One unit of beta-glucosidase is defined as 1.0 μmole of p-nitrophenolate anion produced per minute at 25° C., pH 4.8 from 1 mM p-nitrophenyl-beta-D-glucopyranoside as substrate in 50 mM sodium citrate containing 0.01% TWEEN® 20.

Beta-xylosidase: The term "beta-xylosidase" means a beta-D-xyloside xylohydrolase (E.C. 3.2.1.37) that catalyzes the exo-hydrolysis of short beta (1—>4)-xylooligosaccharides to remove successive D-xylose residues from non-reducing termini. Beta-xylosidase activity can be determined using 1 mM p-nitrophenyl-beta-D-xyloside as substrate in 100 mM sodium citrate containing 0.01% TWEEN® 20 at pH 5, 40° C. One unit of beta-xylosidase is defined as 1.0 μmole of p-nitrophenolate anion produced per minute at 40° C., pH 5 from 1 mM p-nitrophenyl-beta-D-xyloside in 100 mM sodium citrate containing 0.01% TWEEN® 20.

cDNA: The term "cDNA" means a DNA molecule that can be prepared by reverse transcription from a mature, spliced, mRNA molecule obtained from a eukaryotic or prokaryotic cell. cDNA lacks intron sequences that may be present in the corresponding genomic DNA. The initial, primary RNA transcript is a precursor to mRNA that is processed through a series of steps, including splicing, before appearing as mature spliced mRNA.

Cellobiohydrolase: The term "cellobiohydrolase" means a 1,4-beta-D-glucan cellobiohydrolase (E.C. 3.2.1.91 and E.C. 3.2.1.176) that catalyzes the hydrolysis of 1,4-beta-D-glucosidic linkages in cellulose, cellooligosaccharides, or any beta-1,4-linked glucose containing polymer, releasing cellobiose from the reducing end (cellobiohydrolase I) or non-reducing end (cellobiohydrolase II) of the chain (Teeri, 1997, *Trends in Biotechnology* 15: 160-167; Teeri et al., 1998, *Biochem. Soc. Trans.* 26: 173-178). Cellobiohydrolase activity can be determined according to the procedures described by Lever et al., 1972, *Anal. Biochem.* 47: 273-279; van Tilbeurgh et al., 1982, *FEBS Letters* 149: 152-156; van Tilbeurgh and Claeyssens, 1985, *FEBS Letters* 187: 283-288; and Tomme et al., 1988, *Eur. J. Biochem.* 170: 575-581.

Cellulolytic enzyme or cellulase: The term "cellulolytic enzyme" or "cellulase" means one or more (e.g., several) enzymes that hydrolyze a cellulosic material. Such enzymes include endoglucanase(s), cellobiohydrolase(s), beta-glucosidase(s), or combinations thereof. The two basic approaches for measuring cellulolytic enzyme activity include: (1) measuring the total cellulolytic enzyme activity, and (2) measuring the individual cellulolytic enzyme activities (endoglucanases, cellobiohydrolases, and beta-glucosidases) as reviewed in Zhang et al., 2006, *Biotechnology Advances* 24: 452-481. Total cellulolytic enzyme activity can be measured using insoluble substrates, including Whatman N21 filter paper, microcrystalline cellulose, bacterial cellulose, algal cellulose, cotton, pretreated lignocellulose, etc. The most common total cellulolytic activity assay is the filter paper assay using Whatman N21 filter paper as the substrate. The assay was established by the *International Union of Pure and Applied Chemistry* (IUPAC) (Ghose, 1987, *Pure Appl. Chem.* 59: 257-68).

Cellulolytic enzyme activity can be determined by measuring the increase in production/release of sugars during hydrolysis of a cellulosic material by cellulolytic enzyme(s) under the following conditions: 1-50 mg of cellulolytic enzyme protein/g of cellulose in pretreated corn stover (PCS) (or other pretreated cellulosic material) for 3-7 days at a suitable temperature such as 40° C.-80° C., e.g., 40° C., 45° C., 50° C., 55° C., 60° C., 65° C., 70° C., 75° C., or 80° C., and a suitable pH, such as 4-9, e.g., 4.0, 4.5, 5.0, 5.5, 6.0, 6.5, 7.0, 7.5, 8.0, 8.5, or 9.0, compared to a control hydrolysis without addition of cellulolytic enzyme protein. Typical conditions are 1 ml reactions, washed or unwashed PCS, 5% insoluble solids (dry weight), 50 mM sodium acetate pH 5, 1 mM $MnSO_4$, 50° C., 55° C., or 60° C., 72 hours, sugar analysis by AMINEX® HPX-87H column chromatography (Bio-Rad Laboratories, Inc., Hercules, CA, USA).

Cellulosic material: The term "cellulosic material" means any material containing cellulose. Cellulose is a homopolymer of anyhdrocellobiose and thus a linear beta-(1-4)-D-glucan, while hemicelluloses include a variety of compounds, such as xylans, xyloglucans, arabinoxylans, and mannans in complex branched structures with a spectrum of substituents. Although generally polymorphous, cellulose is found in plant tissue primarily as an insoluble crystalline matrix of parallel glucan chains. Hemicelluloses usually hydrogen bond to cellulose, as well as to other hemicelluloses, which help stabilize the cell wall matrix.

Coding sequence: The term "coding sequence" means a polynucleotide, which directly specifies the amino acid sequence of a polypeptide. The boundaries of the coding sequence are generally determined by an open reading frame, which begins with a start codon such as ATG, GTG, or TTG and ends with a stop codon such as TAA, TAG, or TGA. The coding sequence may be a genomic DNA, cDNA, synthetic DNA, or a combination thereof.

Control sequences: The term "control sequences" means nucleic acid sequences necessary for expression of a polynucleotide encoding a mature polypeptide of the present invention. Each control sequence may be native (i.e., from the same gene) or foreign (i.e., from a different gene) to the polynucleotide encoding the polypeptide or native or foreign to each other. Such control sequences include, but are not limited to, a leader, polyadenylation sequence, propeptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the polynucleotide encoding a polypeptide.

Crop kernels: The term "crop kernels" includes kernels from, e.g., corn (maize), rice, barley, sorghum bean, fruit hulls, and wheat. Corn kernels are exemplary. A variety of corn kernels are known, including, e.g., dent corn, flint corn, pod corn, striped maize, sweet corn, waxy corn and the like. In an embodiment, the corn kernel is yellow dent corn kernel. Yellow dent corn kernel has an outer covering referred to as the "Pericarp" that protects the germ in the kernels. It resists water and water vapour and is undesirable to insects and microorganisms. The only area of the kernels not covered by the "Pericarp" is the "Tip Cap", which is the attachment point of the kernel to the cob.

Dry solids: The term "dry solids" is the total solids of a slurry in percent on a dry weight basis.

Endoglucanase: The term "endoglucanase" means a 4-(1, 3;1,4)-beta-D-glucan 4-glucanohydrolase (E.C. 3.2.1.4) that catalyzes endohydrolysis of 1,4-beta-D-glycosidic linkages in cellulose, cellulose derivatives (such as carboxymethyl cellulose and hydroxyethyl cellulose), lichenin, beta-1,4 bonds in mixed beta-1,3-1,4 glucans such as cereal beta-D-glucans or xyloglucans, and other plant material containing cellulosic components. Endoglucanase activity can be determined by measuring reduction in substrate viscosity or increase in reducing ends determined by a reducing sugar assay (Zhang et al., 2006, *Biotechnology Advances* 24: 452-481). Endoglucanase activity can also be determined using carboxymethyl cellulose (CMC) as substrate according to the procedure of Ghose, 1987, *Pure and Appl. Chem.* 59: 257-268, at pH 5, 40° C.

Expression: The term "expression" includes any step involved in the production of a polypeptide including, but not limited to, transcription, post-transcriptional modification, translation, post-translational modification, and secretion.

Expression vector: The term "expression vector" means a linear or circular DNA molecule that comprises a polynucleotide encoding a polypeptide and is operably linked to control sequences that provide for its expression.

Fragment: The term "fragment" means a polypeptide having one or more (e.g., several) amino acids absent from the amino and/or carboxyl terminus of a mature polypeptide, wherein the fragment has enzyme activity. In one aspect, a fragment contains at least 85%, e.g., at least 90% or at least 95% of the amino acid residues of the mature polypeptide of an enzyme.

Germ: The "Germ" is the only living part of the corn kernel. It contains the essential genetic information, enzymes, vitamins, and minerals for the kernel to grow into a corn plant. In yellow dent corn, about 25 percent of the germ is corn oil. The endosperm covered or surrounded by the germ comprises about 82 percent of the kernel dry weight and is the source of energy (starch) and protein for the germinating seed. There are two types of endosperm, soft and hard. In the hard endosperm, starch is packed tightly together. In the soft endosperm, the starch is loose.

Grind or grinding: The term "grinding" means any process that breaks the pericarp and opens the crop kernel.

Hemicellulolytic enzyme or hemicellulase: The term "hemicellulolytic enzyme" or "hemicellulase" means one or more (e.g., several) enzymes that hydrolyze a hemicellulosic material. See, for example, Shallom and Shoham, 2003, *Current Opinion In Microbiology* 6(3): 219-228). Hemicellulases are key components in the degradation of plant biomass. Examples of hemicellulases include, but are not limited to, an acetylmannan esterase, an acetylxylan esterase, an arabinanase, an arabinofuranosidase, a coumaric acid esterase, a feruloyl esterase, a galactosidase, a glucuronidase, a glucuronoyl esterase, a mannanase, a mannosidase, a xylanase, and a xylosidase. The substrates for these enzymes, hemicelluloses, are a heterogeneous group of branched and linear polysaccharides that are bound via hydrogen bonds to the cellulose microfibrils in the plant cell wall, crosslinking them into a robust network. Hemicelluloses are also covalently attached to lignin, forming together with cellulose a highly complex structure. The variable structure and organization of hemicelluloses require the concerted action of many enzymes for its complete degradation. The catalytic modules of hemicellulases are either glycoside hydrolases (GHs) that hydrolyze glycosidic bonds, or carbohydrate esterases (CEs), which hydrolyze ester linkages of acetate or ferulic acid side groups. These catalytic modules, based on homology of their primary sequence, can be assigned into GH and CE families. Some families, with an overall similar fold, can be further grouped into clans, marked alphabetically (e.g., GH-A). A most informative and updated classification of these and other carbohydrate active enzymes is available in the Carbohydrate-Active Enzymes (CAZy) database. Hemicellulolytic enzyme activities can be measured according to Ghose and Bisaria, 1987, *Pure & Appl. Chem.* 59: 1739-1752, at a suitable temperature such as 40° C.-80° C., e.g., 40° C., 45° C., 50° C., 55° C., 60° C., 65° C., 70° C., 75° C., or 80° C., and a suitable pH such as 4-9, e.g., 4.0, 4.5, 5.0, 5.5, 6.0, 6.5, 7.0, 7.5, 8.0, 8.5, or 9.0.

Highly branched xylan: The term "highly branched xylan" means that more than 50% of xylosyl units in the arabinoxylan backbone are substituted. This is preferably calculated from linkage analysis as performed in Huismann et al., 2000, *Carbohydrate Polymers* 42:269-279.

Host cell: The term "host cell" means any cell type that is susceptible to transformation, transfection, transduction, or the like with a nucleic acid construct or expression vector comprising a polynucleotide of the present invention. The term "host cell" encompasses any progeny of a parent cell that is not identical to the parent cell due to mutations that occur during replication.

Isolated: The term "isolated" means a substance in a form or environment that does not occur in nature. Non-limiting examples of isolated substances include (1) any non-naturally occurring substance, (2) any substance including, but not limited to, any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated (e.g., recombinant production in a host cell; multiple copies of a gene encoding the substance; and use of a stronger promoter than the promoter naturally associated with the gene encoding the substance).

Milled: The term "milled" refers to plant material which has been broken down into smaller particles, e.g., by crushing, fractionating, grinding, pulverizing, etc.

Mature polypeptide: The term "mature polypeptide" means a polypeptide in its final form following translation and any post-translational modifications, such as N-terminal processing, C-terminal truncation, glycosylation, phosphorylation, etc.

In one aspect, the mature polypeptide is amino acids 1 to 302 of SEQ ID NO: 8 and amino acids −26 to −1 of SEQ ID NO: 2 are a signal peptide. In another aspect, the mature polypeptide is amino acids 1 to 302 of SEQ ID NO: 9.

In one aspect, the mature polypeptide is amino acids 1 to 303 of SEQ ID NO: 11 and amino acids −26 to −1 of SEQ ID NO: 11 are a signal peptide. In another aspect, the mature polypeptide is amino acids 1 to 303 of SEQ ID NO: 12.

In one aspect, the mature polypeptide is amino acids 1 to 382 of SEQ ID NO: 14 and amino acids −21 to −1 of SEQ ID NO: 15 are a signal peptide. In another aspect, the mature polypeptide is amino acids 1 to 382 of SEQ ID NO: 15.

In one aspect, the mature polypeptide is amino acids 1 to 378 of SEQ ID NO: 17 and amino acids −17 to −1 of SEQ ID NO: 17 are a signal peptide. In another aspect, the mature polypeptide is amino acids 1 to 378 of SEQ ID NO: 18.

In one aspect, the mature polypeptide is amino acids 1 to 311 of SEQ ID NO: 20 and amino acids −20 to −1 of SEQ ID NO: 20 are a signal peptide. In another aspect, the mature polypeptide is amino acids 1 to 311 of SEQ ID NO: 21.

In one aspect, the mature polypeptide is amino acids 1 to 302 of SEQ ID NO: 23 and amino acids −29 to −1 of SEQ ID NO: 23 are a signal peptide. In another aspect, the mature polypeptide is amino acids 1 to 302 of SEQ ID NO: 24.

In one aspect, the mature polypeptide is amino acids 1 to 309 of SEQ ID NO: 26 and amino acids −16 to −1 of SEQ ID NO: 26 are a signal peptide. In another aspect, the mature polypeptide is amino acids 1 to 309 of SEQ ID NO: 27.

In one aspect, the mature polypeptide is amino acids 1 to 438 of SEQ ID NO: 29 and amino acids −36 to −1 of SEQ ID NO: 29 are a signal peptide. In another aspect, the mature polypeptide is amino acids 1 to 438 of SEQ ID NO: 30. In one aspect, the mature polypeptide is amino acids 1 to 446 of SEQ ID NO: 32 and amino acids −27 to −1 of SEQ ID NO: 32 are a signal peptide. In another aspect, the mature polypeptide is amino acids 1 to 446 of SEQ ID NO: 33.

In one aspect, the mature polypeptide is amino acids 1 to 438 of SEQ ID NO: 35 and amino acids −36 to −1 of SEQ ID NO: 35 are a signal peptide. In another aspect, the mature polypeptide is amino acids 1 to 438 of SEQ ID NO: 36. In one aspect, the mature polypeptide is amino acids 1 to 446 of SEQ ID NO: 38 and amino acids −27 to −1 of SEQ ID NO: 38 are a signal peptide. In another aspect, the mature polypeptide is amino acids 1 to 446 of SEQ ID NO: 39.

In one aspect, the mature polypeptide is amino acids 1 to 318 of SEQ ID NO: 41 and amino acids −18 to −1 of SEQ ID NO: 41 are a signal peptide. In another aspect, the mature polypeptide is amino acids 1 to 318 of SEQ ID NO: 42. In one aspect, the mature polypeptide is amino acids 1 to 326 of SEQ ID NO: 44 and amino acids −18 to −1 of SEQ ID NO: 44 are a signal peptide. In another aspect, the mature polypeptide is amino acids 1 to 326 of SEQ ID NO: 45.

In one aspect, the mature polypeptide is amino acids 1 to 302 of SEQ ID NO: 47 and amino acids −25 to −1 of SEQ ID NO: 47 are a signal peptide. In another aspect, the mature polypeptide is amino acids 1 to 302 of SEQ ID NO: 48. In one aspect, the mature polypeptide is amino acids 1 to 311 of SEQ ID NO: 50 and amino acids −25 to −1 of SEQ ID NO: 50 are a signal peptide. In another aspect, the mature polypeptide is amino acids 1 to 311 of SEQ ID NO: 51.

In one aspect, the mature polypeptide is amino acids 1 to 364 of SEQ ID NO: 53 and amino acids −24 to −1 of SEQ ID NO: 53 are a signal peptide. In another aspect, the mature polypeptide is amino acids 1 to 364 of SEQ ID NO: 54. In one aspect, the mature polypeptide is amino acids 1 to 373 of SEQ ID NO: 56 and amino acids −24 to −1 of SEQ ID NO: 56 are a signal peptide. In another aspect, the mature polypeptide is amino acids 1 to 373 of SEQ ID NO: 57.

In one aspect, the mature polypeptide is amino acids 1 to 436 of SEQ ID NO: 59 and amino acids −31 to −1 of SEQ ID NO: 59 are a signal peptide. In another aspect, the mature polypeptide is amino acids 1 to 436 of SEQ ID NO: 60. In one aspect, the mature polypeptide is amino acids 1 to 444 of SEQ ID NO: 62 and amino acids −27 to −1 of SEQ ID NO: 62 are a signal peptide. In another aspect, the mature polypeptide is amino acids 1 to 444 of SEQ ID NO: 63.

In one aspect, the mature polypeptide is amino acids 1 to 302 of SEQ ID NO: 65 and amino acids −19 to −1 of SEQ ID NO: 65 are a signal peptide. In another aspect, the mature polypeptide is amino acids 1 to 302 of SEQ ID NO: 66. In one aspect, the mature polypeptide is amino acids 1 to 311 of SEQ ID NO: 68 and amino acids −19 to −1 of SEQ ID NO: 68 are a signal peptide. In another aspect, the mature polypeptide is amino acids 1 to 311 of SEQ ID NO: 69.

In one aspect, the mature polypeptide is amino acids 1 to 183 of SEQ ID NO: 77 and amino acids −27 to −1 of SEQ ID NO: 77 are a signal peptide. In another aspect, the mature polypeptide is amino acids 1 to 302 of SEQ ID NO: 78. In one aspect, the mature polypeptide is amino acids 1 to 181 of SEQ ID NO: 80 and amino acids −27 to −1 of SEQ ID NO: 80 are a signal peptide. In another aspect, the mature polypeptide is amino acids 1 to 181 of SEQ ID NO: 81.

In one aspect, the mature polypeptide is amino acids 1 to 299 of SEQ ID NO: 83 and amino acids −42 to −1 of SEQ ID NO: 83 are a signal peptide. In another aspect, the mature polypeptide is amino acids 1 to 299 of SEQ ID NO: 84. In one aspect, the mature polypeptide is amino acids 1 to 307 of SEQ ID NO: 86 and amino acids −27 to −1 of SEQ ID NO: 86 are a signal peptide. In another aspect, the mature polypeptide is amino acids 1 to 307 of SEQ ID NO: 87.

In one aspect, the mature polypeptide is amino acids 1 to 306 of SEQ ID NO: 117 and amino acids −26 to −1 of SEQ ID NO: 117 are a signal peptide.

In one aspect, the mature polypeptide is amino acids 1 to 306 of SEQ ID NO: 118 and amino acids −26 to −1 of SEQ ID NO: 118 are a signal peptide.

In one aspect, the mature polypeptide is amino acids 1 to 300 of SEQ ID NO: 119 and amino acids −19 to −1 of SEQ ID NO: 119 are a signal peptide.

In one aspect, the mature polypeptide of a cellobiohydrolase I is amino acids 26 to 532 of SEQ ID NO: 96 based on the SignalP 3.0 program (Bendtsen et al., 2004, *J. Mol. Biol.* 340: 783-795) that predicts amino acids 1 to 25 of SEQ ID NO: 96 are a signal peptide. In another aspect, the mature polypeptide of a cellobiohydrolase II is amino acids 19 to 464 of SEQ ID NO: 98 based on the SignalP 3.0 program that predicts amino acids 1 to 18 of SEQ ID NO: 98 are a signal peptide. In another aspect, the mature polypeptide of a beta-glucosidase is amino acids 20 to 863 of SEQ ID NO: 100 based on the SignalP 3.0 program that predicts amino acids 1 to 19 of SEQ ID NO: 100 are a signal peptide. In another aspect, the mature polypeptide of an AA9 polypeptide is amino acids 26 to 253 of SEQ ID NO: 102 based on the SignalP 3.0 program that predicts amino acids 1 to 25 of SEQ ID NO: 102 are a signal peptide. In another aspect, the mature polypeptide of a GH10 xylanase is amino acids 21 to 405 of SEQ ID NO: 104 based on the SignalP 3.0 program that predicts amino acids 1 to 20 of SEQ ID NO: 104 are a signal peptide. In another aspect, the mature polypeptide of a GH10 xylanase is amino acids 20 to 398 of SEQ ID NO: 106 based on the SignalP 3.0 program that predicts amino acids 1 to 19 of SEQ ID NO: 106 are a signal peptide. In another aspect, the mature polypeptide of a beta-xylosidase is amino acids 22 to 796 of SEQ ID NO: 108 based on the SignalP 3.0 program that predicts amino acids 1 to 21 of SEQ ID NO: 108 are a signal peptide. In another aspect, the mature polypeptide of an endoglucanase I is amino acids 23 to 459 of SEQ ID NO: 110 based on the SignalP 3.0 program that predicts amino acids 1 to 22 of SEQ ID NO: 110 are a signal peptide. In another aspect, the mature polypeptide of an endoglucanase II is amino acids 22 to 418 of SEQ ID NO: 112 based on the SignalP 3.0 program that predicts amino acids 1 to 21 of SEQ ID NO: 112 are a signal peptide. In one aspect, the mature polypeptide of an *A. fumigatus* cellobiohydrolase I is amino acids 27 to 532 of SEQ ID NO: 114 based on the SignalP 3.0 program (Bendtsen et al., 2004, *J. Mol. Biol.* 340: 783-795) that predicts amino acids 1 to 26 of SEQ ID NO: 114 are a signal peptide. In another aspect, the mature polypeptide of an *A. fumigatus* cellobiohydrolase II is amino acids 20 to 454 of SEQ ID NO: 116 based on the SignalP 3.0 program that predicts amino acids 1 to 19 of SEQ ID NO: 116 are a signal peptide.

It is known in the art that a host cell may produce a mixture of two of more different mature polypeptides (i.e., with a different C-terminal and/or N-terminal amino acid) expressed by the same polynucleotide. It is also known in the art that different host cells process polypeptides differently, and thus, one host cell expressing a polynucleotide may produce a different mature polypeptide (e.g., having a different C-terminal and/or N-terminal amino acid) as compared to another host cell expressing the same polynucleotide.

Mature polypeptide coding sequence: The term "mature polypeptide coding sequence" means a polynucleotide that encodes a mature polypeptide. In one aspect, the mature polypeptide coding sequence is nucleotides 79 to 987 of SEQ ID NO: 10 and nucleotides 1 to 78 of SEQ ID NO: 10 encodes a signal peptide.

In one aspect, the mature polypeptide coding sequence is the joined sequence of nucleotides 49 to 70 and nucleotides 123 to 1027 of SEQ ID NO: 25 or the cDNA sequence thereof and nucleotides 1 to 48 of SEQ ID NO: 25 encode a signal peptide.

In one aspect, the mature polypeptide coding sequence is nucleotides 109 to 1422 of SEQ ID NO: 28 and nucleotides 1 to 108 of SEQ ID NO: 28 encodes a signal peptide.

In one aspect, the mature polypeptide coding sequence is nucleotides 82 to 1419 of SEQ ID NO: 31 and nucleotides 1 to 81 of SEQ ID NO: 31 encodes a signal peptide.

In one aspect, the mature polypeptide coding sequence is nucleotides 109 to 1422 of SEQ ID NO: 34 and nucleotides 1 to 108 of SEQ ID NO: 34 encodes a signal peptide.

In one aspect, the mature polypeptide coding sequence is nucleotides 82 to 1419 of SEQ ID NO: 37 and nucleotides 1 to 81 of SEQ ID NO: 37 encodes a signal peptide.

In one aspect, the mature polypeptide coding sequence is nucleotides 76 to 981 of SEQ ID NO: 46 and nucleotides 1 to 75 of SEQ ID NO: 46 encodes a signal peptide.

In one aspect, the mature polypeptide coding sequence is nucleotides 76 to 1008 of SEQ ID NO: 49 and nucleotides 1 to 75 of SEQ ID NO: 49 encodes a signal peptide.

In one aspect, the mature polypeptide coding sequence is the joined sequence of nucleotides 73 to 318, nucleotides 470 to 1298 and nucleotides 1392 to 1408 of SEQ ID NO: 52 and nucleotides 1 to 72 of SEQ ID NO: 52 encodes a signal peptide.

In one aspect, the mature polypeptide coding sequence is the joined sequence of nucleotides 73 to 318, nucleotides 470 to 1298 and nucleotides 1392 to 1435 of SEQ ID NO: 55 and nucleotides 1 to 72 of SEQ ID NO: 55 encodes a signal peptide.

In one aspect, the mature polypeptide coding sequence is nucleotides 94 to 1401 of SEQ ID NO: 58 and nucleotides 1 to 93 of SEQ ID NO: 58 encodes a signal peptide.

In one aspect, the mature polypeptide coding sequence is nucleotides 82 to 1413 of SEQ ID NO: 61 and nucleotides 1 to 81 of SEQ ID NO: 61 encodes a signal peptide.

In one aspect, the mature polypeptide coding sequence is the joined sequence of nucleotides 58 to 330, nucleotides 403 to 655, nucleotides 795 to 948 and nucleotides 1100 to 1325 of SEQ ID NO: 64 and nucleotides 1 to 57 of SEQ ID NO: 64 encodes a signal peptide.

In one aspect, the mature polypeptide coding sequence is the joined sequence of nucleotides 58 to 330, nucleotides 403 to 655, nucleotides 795 to 948 and nucleotides 1100 to 1352 of SEQ ID NO: 67 and nucleotides 1 to 57 of SEQ ID NO: 67 encodes a signal peptide.

In one aspect, the mature polypeptide coding sequence is nucleotides 127 to 1023 of SEQ ID NO: 83 and nucleotides 1 to 126 of SEQ ID NO: 83 encodes a signal peptide.

In one aspect, the mature polypeptide coding sequence of a cellobiohydrolase I is nucleotides 76 to 1727 of SEQ ID NO: 95 or the cDNA sequence thereof based on the SignalP 3.0 program (Bendtsen et al., 2004, supra) that predicts nucleotides 1 to 75 of SEQ ID NO: 95 encode a signal peptide. In another aspect, the mature polypeptide coding sequence of a cellobiohydrolase II is nucleotides 55 to 1895 of SEQ ID NO: 97 or the cDNA sequence thereof based on the SignalP 3.0 program that predicts nucleotides 1 to 54 of SEQ ID NO: 97 encode a signal peptide. In another aspect, the mature polypeptide coding sequence of a beta-glucosidase is nucleotides 58 to 3057 of SEQ ID NO: 99 or the cDNA sequence thereof based on the SignalP 3.0 program that predicts nucleotides 1 to 57 of SEQ ID NO: 99 encode a signal peptide. In another aspect, the mature polypeptide coding sequence of an AA9 polypeptide is nucleotides 76 to 832 of SEQ ID NO: 101 or the cDNA sequence thereof based on the SignalP 3.0 program that predicts nucleotides 1 to 75 of SEQ ID NO: 101 encode a signal peptide. In another aspect, the mature polypeptide coding sequence of a GH10 xylanase is nucleotides 124 to 1517 of SEQ ID NO: 103 or the cDNA sequence thereof based on the SignalP 3.0 program that predicts nucleotides 1 to 123 of SEQ ID NO: 103 encode a signal peptide. In another aspect, the mature polypeptide coding sequence of a GH10 xylanase is nucleotides 58 to 1194 of SEQ ID NO: 105 based on the SignalP 3.0 program that predicts nucleotides 1 to 57 of SEQ ID NO: 105 encode a signal peptide. In another aspect, the mature polypeptide coding sequence of a beta-xylosidase is nucleotides 64 to 2388 of SEQ ID NO: 107 based on the SignalP 3.0 program that predicts nucleotides 1 to 63 of SEQ ID NO: 107 encode a signal peptide. In another aspect, the mature polypeptide coding sequence of an endoglucanase I is nucleotides 67 to 1504 of SEQ ID NO: 109 or the cDNA sequence thereof based on the SignalP 3.0 program that predicts nucleotides 1 to 66 of SEQ ID NO: 109 encode a signal peptide. In another aspect, the mature polypeptide coding sequence of an endoglucanase II is nucleotides 64 to 1504 of SEQ ID NO: 111 based on the SignalP 3.0 program that predicts nucleotides 1 to 63 of SEQ ID NO: 111 encode a signal peptide. In one aspect, the mature polypeptide coding sequence of an *A. fumigatus* cellobiohydrolase I is nucleotides 79 to 1596 of SEQ ID NO: 113 based on the SignalP 3.0 program (Bendtsen et al., 2004, supra) that predicts nucleotides 1 to 78 of SEQ ID NO: 113 encode a signal peptide. In another aspect, the mature polypeptide coding sequence of an *A. fumigatus* cellobiohydrolase II is nucleotides 58 to 1700 of SEQ ID NO: 115 or the cDNA sequence thereof based on the SignalP 3.0 program that predicts nucleotides 1 to 57 of SEQ ID NO: 115 encode a signal peptide.

Nucleic acid construct: The term "nucleic acid construct" means a nucleic acid molecule, either single- or double-stranded, which is isolated from a naturally occurring gene or is modified to contain segments of nucleic acids in a manner that would not otherwise exist in nature or which is synthetic, which comprises one or more control sequences.

Oligosaccharide: The term "oligosaccharide" is a compound having 2 to 10 monosaccharide units.

Operably linked: The term "operably linked" means a configuration in which a control sequence is placed at an appropriate position relative to the coding sequence of a polynucleotide such that the control sequence directs expression of the coding sequence.

Protease: The term "proteolytic enzyme" or "protease" means one or more (e.g., several) enzymes that break down the amide bond of a protein by hydrolysis of the peptide bonds that link amino acids together in a polypeptide chain. A protease may include, e.g., a metalloprotease, a trypsin-like serine protease, a subtilisin-like serine protease, and aspartic protease.

Sequence Identity: The relatedness between two amino acid sequences or between two nucleotide sequences is described by the parameter "sequence identity".

For purposes of the present invention, the degree of sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 3.0.0 or later. Version 6.1.0 was used. The optional parameters used are gap open penalty of 10, gap extension penalty of 0.5, and the EBLOSUM62 (EMBOSS version of BLOSUM62) substitution matrix. The output of Needle labelled "longest identity" (obtained using the -nobrief option) is used as the percent identity and is calculated as follows:

(Identical Residues×100)/(Length of Alignment−
Total Number of Gaps in Alignment)

For purposes of the present invention, the degree of sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 3.0.0 or later. Version 6.1.0 was used. The optional parameters used are gap open penalty of 10, gap extension penalty of 0.5, and the EDNAFULL (EMBOSS version of NCBI NUC4.4) substitution matrix. The output of Needle labelled "longest identity" (obtained using the -nobrief option) is used as the percent identity and is calculated as follows: (Identical Deoxyribonucleotides×100)/(Length of Alignment−Total Number of Gaps in Alignment)

Starch: The term "starch" means any material comprised of complex polysaccharides of plants, composed of glucose units that occurs widely in plant tissues in the form of storage granules, consisting of amylose and amylopectin, and represented as $(C_6H_{10}O_5)_n$, where n is any number.

Steep or steeping: The term "steeping" means soaking the crop kernel with water and optionally $SO_2$.

Stringency conditions: The different stringency conditions are defined as follows.

The term "very low stringency conditions" means for probes of at least 100 nucleotides in length, prehybridization and hybridization at 42° C. in 5×SSPE, 0.3% SDS, 200 micrograms/ml sheared and denatured salmon sperm DNA, and 25% formamide, following standard Southern blotting procedures for 12 to 24 hours. The carrier material is finally washed three times each for 15 minutes using 2.0×SSC, 0.2% SDS at 60° C.

The term "low stringency conditions" means for probes of at least 100 nucleotides in length, prehybridization and hybridization at 42° C. in 5×SSPE, 0.3% SDS, 200 micrograms/ml sheared and denatured salmon sperm DNA, and 25% formamide, following standard Southern blotting procedures for 12 to 24 hours. The carrier material is finally washed three times each for 15 minutes using 1.0×SSC, 0.2% SDS at 60° C.

The term "medium stringency conditions" means for probes of at least 100 nucleotides in length, prehybridization and hybridization at 42° C. in 5×SSPE, 0.3% SDS, 200 micrograms/ml sheared and denatured salmon sperm DNA, and 35% formamide, following standard Southern blotting procedures for 12 to 24 hours. The carrier material is finally washed three times each for 15 minutes using 1.0×SSC, 0.2% SDS at 65° C.

The term "medium-high stringency conditions" means for probes of at least 100 nucleotides in length, prehybridization and hybridization at 42° C. in 5×SSPE, 0.3% SDS, 200 micrograms/ml sheared and denatured salmon sperm DNA, and 35% formamide, following standard Southern blotting procedures for 12 to 24 hours. The carrier material is finally washed three times each for 15 minutes using 1.0×SSC, 0.2% SDS at 70° C.

The term "high stringency conditions" means for probes of at least 100 nucleotides in length, prehybridization and hybridization at 42° C. in 5×SSPE, 0.3% SDS, 200 micrograms/ml sheared and denatured salmon sperm DNA, and 50% formamide, following standard Southern blotting procedures for 12 to 24 hours. The carrier material is finally washed three times each for 15 minutes using 0.5×SSC, 0.2% SDS at 70° C.

The term "very high stringency conditions" means for probes of at least 100 nucleotides in length, prehybridization and hybridization at 42° C. in 5×SSPE, 0.3% SDS, 200 micrograms/ml sheared and denatured salmon sperm DNA, and 50% formamide, following standard Southern blotting procedures for 12 to 24 hours. The carrier material is finally washed three times each for 15 minutes using 0.5×SSC, 0.2% SDS at 75° C.

Subsequence: The term "subsequence" means a polynucleotide having one or more (e.g., several) nucleotides absent from the 5' and/or 3' end of a mature polypeptide coding sequence; wherein the subsequence encodes a fragment having arabinofuranosidase or xylanase activity.

Substantially pure polypeptide: The term "substantially pure polypeptide" means a preparation that contains at most 10%, at most 8%, at most 6%, at most 5%, at most 4%, at most 3%, at most 2%, at most 1%, and at most 0.5% by weight of other polypeptide material with which it is natively or recombinantly associated. Preferably, the polypeptide is at least 92% pure, e.g., at least 94% pure, at least 95% pure, at least 96% pure, at least 97% pure, at least 98% pure, at least 99%, at least 99.5% pure, and 100% pure by weight of the total polypeptide material present in the preparation. The polypeptides of the present invention are preferably in a substantially pure form. This can be accomplished, for example, by preparing the polypeptide by well-known recombinant methods or by classical purification methods.

Variant: The term "variant" means a polypeptide having xylanase or arabinofuranosidase activity comprising an alteration, i.e., a substitution, insertion, and/or deletion of one or more (several) amino acid residues at one or more (several) positions. A substitution means a replacement of an amino acid occupying a position with a different amino acid; a deletion means removal of an amino acid occupying a position; and an insertion means adding 1-3 amino acids adjacent to an amino acid occupying a position.

Wet milling benefit: The term "wet milling benefit" means one or more of improved starch yield and/or purity, improved gluten quality and/or yield, improved fiber, gluten, or steep water filtration, dewatering and evaporation, easier germ separation and/or better post-saccharification filtration, and process energy savings thereof.

Xylan degrading activity or xylanolytic activity: The term "xylan degrading activity" or "xylanolytic activity" means a biological activity that hydrolyzes xylan-containing material. The two basic approaches for measuring xylanolytic activity include: (1) measuring the total xylanolytic activity, and (2) measuring the individual xylanolytic activities (e.g., endoxylanases, beta-xylosidases, arabinofuranosidases, alpha-glucuronidases, acetylxylan esterases, feruloyl esterases, and alpha-glucuronyl esterases). Recent progress in assays of xylanolytic enzymes was summarized in several publications including Biely and Puchard, 2006, *Journal of the Science of Food and Agriculture* 86(11): 1636-1647; Spanikova and Biely, 2006, *FEBS Letters* 580(19): 4597-4601; Herrmann et al., 1997, *Biochemical Journal* 321: 375-381.

Total xylan degrading activity can be measured by determining the reducing sugars formed from various types of xylan, including, for example, oat spelt, beechwood, and larchwood xylans, or by photometric determination of dyed xylan fragments released from various covalently dyed xylans. A common total xylanolytic activity assay is based on production of reducing sugars from polymeric 4-O-methyl glucuronoxylan as described in Bailey et al., 1992, Interlaboratory testing of methods for assay of xylanase activity, *Journal of Biotechnology* 23(3): 257-270. Xylanase activity can also be determined with 0.2% AZCL-arabinoxylan as substrate in 0.01% TRITON® X-100 and 200 mM sodium phosphate pH 6 at 37° C. One unit of xylanase activity is defined as 1.0 μmole of azurine produced per minute at 37° C., pH 6 from 0.2% AZCL-arabinoxylan as substrate in 200 mM sodium phosphate pH 6.

Xylan degrading activity can be determined by measuring the increase in hydrolysis of birchwood xylan (Sigma Chemical Co., Inc., St. Louis, MO, USA) by xylan-degrading enzyme(s) under the following typical conditions: 1 ml reactions, 5 mg/ml substrate (total solids), 5 mg of xylanolytic protein/g of substrate, 50 mM sodium acetate pH 5, 50° C., 24 hours, sugar analysis using p-hydroxybenzoic acid hydrazide (PHBAH) assay as described by Lever, 1972, *Anal. Biochem.* 47: 273-279.

Xylanase: The term "xylanase" means a 1,4-beta-D-xylan-xylohydrolase (E.C. 3.2.1.8) that catalyses the endohydrolysis of 1,4-beta-D-xylosidic linkages in xylans. Xylanase activity can be determined with 0.2% AZCL-arabinoxylan as substrate in 0.01% TRITON® X-100 and 200 mM sodium phosphate pH 6 at 37° C. One unit of xylanase activity is defined as 1.0 μmole of azurine produced per minute at 37° C., pH 6 from 0.2% AZCL-arabinoxylan as substrate in 200 mM sodium phosphate pH 6.

Nomenclature

For purposes of the present invention, the nomenclature [Y/F] means that the amino acid at this position may be a tyrosine (Try, Y) or a phenylalanine (Phe, F). Likewise the nomenclature [V/G/A/I] means that the amino acid at this position may be a valine (Val, V), glycine (Gly, G), alanine (Ala, A) or isoleucine (Ile, I), and so forth for other combinations as described herein. Unless otherwise limited further, the amino acid X is defined such that it may be any of the 20 natural amino acids.

DETAILED DESCRIPTION OF THE INVENTION

Accordingly, it is an object of the invention to provide improved processes of treating crop kernels to provide starch of high quality.

In one embodiment, the enzyme compositions useful in the processes of the invention provide benefits including, improving starch yield and/or purity, improving gluten quality and/or yield, improving fiber, gluten, or steep water filtration, dewatering and evaporation, easier germ separation and/or better post-saccharification filtration, and process energy savings thereof.

Moreover, the present inventors have surprisingly found that the enzymes useful according to the invention provide reduction in fiber mass and lower protein content of the fiber due to better separation of both starch and protein fractions from the fiber fraction. Separating starch and gluten from fiber is valuable to the industry because fiber is the least valuable product of the wet milling process, and higher purity starch and protein is desirable.

Surprisingly, the present inventors have discovered that replacing some of the protease activity in an enzyme composition can provide an improvement over an otherwise similar composition containing predominantly protease activity alone. This can provide a benefit to the industry, e.g., on the basis of cost and ease of use.

The Milling Process

The kernels are milled in order to open up the structure and to allow further processing and to separate the kernels into the four main constituents: starch, germ, fiber and protein.

In one embodiment, a wet milling process is used. Wet milling gives a very good separation of germ and meal (starch granules and protein) and is often applied at locations where there is a parallel production of syrups.

The inventors of the present invention have surprisingly found that the quality of the starch final product may be improved by treating crop kernels in the processes as described herein.

The processes of the invention result in comparison to traditional processes in a higher starch quality, in that the final starch product is more pure and/or a higher yield is obtained and/or less process time is used. Another advantage may be that the amount of chemicals, such as SO2 and NaHSO3, which need to be used, may be reduced or even fully removed.

Wet Milling

Starch is formed within plant cells as tiny granules insoluble in water. When put in cold water, the starch granules may absorb a small amount of the liquid and swell. At temperatures up to about 50° C. to 75° C. the swelling may be reversible. However, with higher temperatures an irreversible swelling called "gelatinization" begins. Granular starch to be processed according to the present invention may be a crude starch-containing material comprising (e.g., milled) whole grains including non-starch fractions such as germ residues and fibers. The raw material, such as whole grains, may be reduced in particle size, e.g., by wet milling, in order to open up the structure and allowing for further processing. Wet milling gives a good separation of germ and meal (starch granules and protein) and is often applied at locations where the starch hydrolyzate is used in the production of, e.g., syrups.

In an embodiment the particle size is reduced to between 0.05-3.0 mm, preferably 0.1-0.5 mm, or so that at least 30%, preferably at least 50%, more preferably at least 70%, even more preferably at least 90% of the starch-containing material fits through a sieve with a 0.05-3.0 mm screen, preferably 0.1-0.5 mm screen.

More particularly, degradation of the kernels of corn and other crop kernels into starch suitable for conversion of starch into mono- and oligo-saccharides, ethanol, sweeteners, etc. consists essentially of four steps:
1. Steeping and germ separation,
2. Fiber washing and drying,
3. Starch gluten separation, and
4. Starch washing.

1. Steeping and Germ Separation

Corn kernels are softened by soaking in water for between about 30 minutes to about 48 hours, preferably 30 minutes to about 15 hours, such as about 1 hour to about 6 hours at a temperature of about 50° C., such as between about 45° C. to 60° C. During steeping, the kernels absorb water, increasing their moisture levels from 15 percent to 45 percent and more than doubling in size. The optional addition of, e.g., 0.1 percent sulfur dioxide ($SO_2$) and/or $NaHSO_3$ to the water prevents excessive bacteria growth in the warm environment. As the corn swells and softens, the mild acidity of the steepwater begins to loosen the gluten bonds within the corn and release the starch. After the corn kernels are steeped they are cracked open to release the germ. The germ contains the valuable corn oil. The germ is separated from the heavier density mixture of starch, hulls and fiber essentially by "floating" the germ segment free of the other substances under closely controlled conditions. This method serves to eliminate any adverse effect of traces of corn oil in later processing steps.

In an embodiment of the invention the kernels are soaked in water for 2-10 hours, preferably about 3-5 hours at a temperature in the range between 40 and 60° C., preferably around 50° C.

In one embodiment, 0.01-1%, preferably 0.05-0.3%, especially 0.1% $SO_2$ and/or NaHSO3 may be added during soaking.

2. Fiber Washing and Drying

To get maximum starch recovery, while keeping any fiber in the final product to an absolute minimum, it is necessary to wash the free starch from the fiber during processing. The fiber is collected, slurried and screened to reclaim any residual starch or protein.

3. Starch Gluten Separation

The starch-gluten suspension from the fiber-washing step, called mill starch, is separated into starch and gluten. Gluten has a low density compared to starch. By passing mill starch through a centrifuge, the gluten is readily spun out.

4. Starch Washing

The starch slurry from the starch separation step contains some insoluble protein and much of solubles. They have to be removed before a top quality starch (high purity starch) can be made. The starch, with just one or two percent protein remaining, is diluted, washed 8 to 14 times, re-diluted and washed again in hydroclones to remove the last trace of protein and produce high quality starch, typically more than 99.5% pure.

Products

Wet milling can be used to produce, without limitation, corn steep liquor, corn gluten feed, germ, corn oil, corn gluten meal, corn starch, modified corn starch, syrups such as corn syrup, and corn ethanol.

Polypeptides Having Arabinofuranosidase Activity

Preferred embodiments of the aspect of the invention relating to the GH62 polypeptide having arabinofuranosidase activity are disclosed herein below. Additional details of preferred GH62 polypeptides having arabinofuranosidase activity are found in PCT/CN2015/071015 filed 19 Jan. 2015.

In an embodiment, the GH62 polypeptide having arabinofuranosidase activity has a sequence identity to the mature polypeptide of SEQ ID NO: 8 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 9 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 11 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 12 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 14 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 15 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 17 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has sequence identity to SEQ ID NO: 18 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 20 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 21 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 23 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 24 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 26 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 27 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 29 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 30 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 35 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 36 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 41 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide has arabinofuranosidase activity having a sequence identity to SEQ ID NO: 42 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 47 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide has arabinofuranosidase activity having a sequence identity to SEQ ID NO: 48 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 53 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 54 of at least 80% of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 59 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 60 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 65 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 66 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 117 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 118 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

Sources of Polypeptides

A polypeptide having arabinofuranosidase or xylanase activity of the present invention may be obtained from microorganisms of any genus. For purposes of the present invention, the term "obtained from" as used herein in connection with a given source shall mean that the polypeptide encoded by a polynucleotide is produced by the source or by a strain in which the polynucleotide from the source has been inserted. In one aspect, the polypeptide obtained from a given source is secreted extracellularly.

The polypeptide may be a fungal polypeptide. In one embodiment, the polypeptide is from a fungus of the order Eurotiales, or from the family Aspergillaceae, or from the genus *Penicillium* or from the species *Penicillium aurantiogriseum, Penicillium oxalicum* or *Penicillium capsulatum*.

In one embodiment, the polypeptide is from a fungus of the order Eurotiales, or from the family Aspergillaceae, or from the genus *Aspergillus* or from the species *Aspergillus clavatus* or *Aspergillus wentii* or *Aspergillus niger*.

In one embodiment, the polypeptide is from a fungus of the order Eurotiales, or from the family Aspergillaceae, or from the genus Neosartorya or from the species Neosartorya *fischeri*.

In one embodiment, the polypeptide is from a fungus of the order Eurotiales, or from the family Trichocomaceae, or from the genus *Talaromyces* or from the species *Talaromyces pinophilus*.

In one embodiment, the polypeptide is from a fungus of the order Ustilaginales, or from the family Ustilaginaceae, or from the genus *Ustilago* or from the species *Ustilago maydis*.

In one embodiment, the polypeptide is from a fungus of the phylum Ascomycota, or from the genus *Acrophialophora* or from the species *Acrophialophora fusispora*.

The polypeptide may be a bacterial polypeptide. In one embodiment, the polypeptide is from a bacterium of the order Actinomycetales, or from the family Streptomycetaceae, or from the genus *Streptomyces* or from the species *Streptomyces nitrosporeus* or *Streptomyces beijiangensis*.

In one embodiment, the polypeptide is from a bacterium of the order Actinomycetales, or from the family Streptosporangiaceae, or from the genus Streptosporangium or from the species Streptosporangium sp-60756.

It will be understood that for the aforementioned species, the invention encompasses both the perfect and imperfect states, and other taxonomic equivalents, e.g., anamorphs, regardless of the species name by which they are known. Those skilled in the art will readily recognize the identity of appropriate equivalents.

Strains of these species are readily accessible to the public in a number of culture collections, such as the American Type Culture Collection (ATCC), Deutsche Sammlung von Mikroorganismen and Zellkulturen GmbH (DSMZ), Centraalbureau Voor Schimmelcultures (CBS), and *Agricultural Research* Service Patent Culture Collection, Northern Regional Research Center (NRRL).

The polypeptide may be identified and obtained from other sources including microorganisms isolated from nature (e.g., soil, composts, water, etc.) or DNA samples obtained directly from natural materials (e.g., soil, composts, water, etc.) using the above-mentioned probes. Techniques for isolating microorganisms and DNA directly from natural habitats are well known in the art. A polynucleotide encoding the polypeptide may then be obtained by similarly screening a genomic DNA or cDNA library of another microorganism or mixed DNA sample. Once a polynucleotide encoding a polypeptide has been detected with the probe(s), the polynucleotide can be isolated or cloned by utilizing techniques that are known to those of ordinary skill in the art (see, e.g., Sambrook et al., 1989, supra).

Enzyme Compositions

Preferably, the compositions are enriched in the polypeptides useful according to the invention. The term "enriched" indicates that the enzymatic activity of the composition has been increased, e.g., with an enrichment factor of at least 1.1, such as at least 1.2, at least 1.3, at least 1.4, at least 1.5, at least 2.0, at least 3.0, at least 4.0, at least 5.0, at least 10. In an embodiment, the composition comprises the polypeptides of the first aspect of the invention and one or more formulating agents, as described in the 'formulating agent' section below.

The compositions may comprise a polypeptide of the present invention as the major enzymatic component, e.g., a mono-component composition. Such a composition may further comprise a formulating agent, as described in the 'formulating agent' section below. Alternatively, the compositions may comprise multiple enzymatic activities, such as one or more (e.g., several) enzymes selected from the group consisting of phytase, xylanase, galactanase, alpha-galactosidase, protease, phospholipase, glucoronidase, lysophospholipase, amylase, beta-glucanase, arabinofuranosidase, beta-xylosidase, endo-1,4-beta-xylanase acetyl xylan esterase, feruloyl esterase, cellulase, cellobiohydrolase, beta-glycosidase, pullulanase, or any mixture thereof. Additional cellulolytic activities are particularly contemplated, as further outlined below.

Where arabinofuranosidase and xylanase activity are contemplated, it is at present contemplated that the xylanase is used in one or more of the following amounts (dosage ranges): 0.01-200; 0.05-100; 0.1-50; 0.2-20; 0.1-1; 0.2-2; 0.5-5; or 1-10 wherein all these ranges are mg xylanase protein per kg substrate (ppm). It is at present contemplated that the arabinofuranosidase is administered in one or more of the following amounts (dosage ranges): 0.01-200; 0.05-100; 0.1-50; 0.2-20; 0.1-1; 0.2-2; 0.5-5; or 1-10 wherein all these ranges are mg arabinofuranosidase protein per kg substrate (ppm). It is further contemplated that the ratio of the GH10 or 11 xylanase to GH62 arabinofuranosidase is in the range of 100:1 to 1:100 xylanase: arabinofuranosidase such as the ranges 50:1 to 1:50, 50:1 to 1:10, 25:1 to 1:5, 10:1 to 1:2 or such as 10:1 to 1:50, 5:1 to 1:25, 2:1 to 1:10 xylanase: arabinofuranosidase.

Formulating Agent

The enzyme of the invention may be formulated as a liquid or a solid. For a liquid formulation, the formulating agent may comprise a polyol (such as, e.g., glycerol, ethylene glycol or propylene glycol), a salt (such as, e.g., sodium chloride, sodium benzoate, potassium sorbate) or a sugar or sugar derivative (such as, e.g., dextrin, glucose, sucrose, and sorbitol). Thus, in one embodiment, the composition is a liquid composition comprising the polypeptide of the invention and one or more formulating agents selected from the list consisting of glycerol, ethylene glycol, 1,2-propylene glycol, 1,3-propylene glycol, sodium chloride, sodium benzoate, potassium sorbate, dextrin, glucose, sucrose, and sorbitol.

For a solid formulation, the formulation may be for example as a granule, spray dried powder or agglomerate. The formulating agent may comprise a salt (organic or inorganic zinc, sodium, potassium or calcium salts such as, e.g., such as calcium acetate, calcium benzoate, calcium carbonate, calcium chloride, calcium citrate, calcium sorbate, calcium sulfate, potassium acetate, potassium benzoate, potassium carbonate, potassium chloride, potassium citrate, potassium sorbate, potassium sulfate, sodium acetate, sodium benzoate, sodium carbonate, sodium chloride, sodium citrate, sodium sulfate, zinc acetate, zinc benzoate, zinc carbonate, zinc chloride, zinc citrate, zinc sorbate, zinc sulfate), starch or a sugar or sugar derivative (such as, e.g., sucrose, dextrin, glucose, lactose, sorbitol).

In an embodiment, the solid composition is in granulated form. The granule may have a matrix structure where the components are mixed homogeneously. However, the granule typically comprises a core particle and one or more coatings, which typically are salt and/or wax coatings. The core particle can either be a homogeneous blend of xylanase of the invention optionally combined with one or more additional enzymes and optionally together with one or more salts or an inert particle with the xylanase of the invention optionally combined with one or more additional enzymes applied onto it.

In an embodiment, the material of the core particles are selected from the group consisting of inorganic salts (such as calcium acetate, calcium benzoate, calcium carbonate, calcium chloride, calcium citrate, calcium sorbate, calcium sulfate, potassium acetate, potassium benzoate, potassium carbonate, potassium chloride, potassium citrate, potassium sorbate, potassium sulfate, sodium acetate, sodium benzoate, sodium carbonate, sodium chloride, sodium citrate, sodium sulfate, zinc acetate, zinc benzoate, zinc carbonate, zinc chloride, zinc citrate, zinc sorbate, zinc sulfate), starch or a sugar or sugar derivative (such as, e.g., sucrose, dextrin, glucose, lactose, sorbitol), sugar or sugar derivative (such as, e.g., sucrose, dextrin, glucose, lactose, sorbitol), small organic molecules, starch, flour, cellulose and minerals.

The salt coating is typically at least 1 μm thick and can either be one particular salt or a mixture of salts, such as $Na_2SO_4$, $K_2SO_4$, $MgSO_4$ and/or sodium citrate. Other examples are those described in, e.g., WO 2008/017659, WO 2006/034710, WO 97/05245, WO 98/54980, WO 98/55599, WO 00/70034 or polymer coating such as described in WO 01/00042.

In another embodiment, the composition is a solid composition comprising the xylanase of the invention and one or more formulating agents selected from the list consisting of sodium chloride, sodium benzoate, potassium sorbate, sodium sulfate, potassium sulfate, magnesium sulfate, sodium thiosulfate, calcium carbonate, sodium citrate, dextrin, glucose, sucrose, sorbitol, lactose, starch and cellulose. In a preferred embodiment, the formulating agent is selected from one or more of the following compounds: sodium sulfate, dextrin, cellulose, sodium thiosulfate and calcium carbonate. In a preferred embodiment, the solid composition is in granulated form. In an embodiment, the solid composition is in granulated form and comprises a core particle, an enzyme layer comprising the xylanase of the invention and a salt coating.

In a further embodiment, the formulating agent is selected from one or more of the following compounds: glycerol, ethylene glycol, 1,2-propylene glycol or 1,3-propylene glycol, sodium chloride, sodium benzoate, potassium sorbate, sodium sulfate, potassium sulfate, magnesium sulfate, sodium thiosulfate, calcium carbonate, sodium citrate, dextrin, glucose, sucrose, sorbitol, lactose, starch and cellulose. In a preferred embodiment, the formulating agent is selected from one or more of the following compounds: 1,2-propylene glycol, 1,3-propylene glycol, sodium sulfate, dextrin, cellulose, sodium thiosulfate and calcium carbonate.

Plant Based Material from the Sub-Family Panicoideae

In one embodiment, the plant based material from the sub-family Panicoideae is from the tribe Andropogoneae such as the rank *Andropogon* or *Andropterum* or *Apluda* or *Apocopis* or *Arthraxon* or *Bothriochloa* or *Capillipedium* or *Chionachne* or *Chrysopogon* or *Coelorachis* or *Coix* or *Cymbopogon* or *Dichanthium* or *Diheteropogon* or *Dimeria* or *Elionurus* or *Eremochloa* or *Euclasta* or *Eulalia* or *Germainia* or *Hemarthria* or *Heteropholis* or *Heteropogon* or *Hyparrhenia* or *Hyperthelia* or *Imperata* or *Ischaemum* or *Iseilema* or *Kerriochloa* or *Microstegium* or *Miscanthidium* or *Miscanthus* or *Mnesithea* or *Ophiuros* or *Oxyrhachis* or *Phacelurus* or *Pholiurus* or *Pogonatherum* or *Polytoca* or *Polytrias* or *Pseudopogonatherum* or *Pseudosorghum* or *Rhytachne* or *Rottboellia* or *Saccharum* or *Sarga* or *Schizachyrium* or *Sehima* or *Sorghastrum* or *Sorghum* or *Spodiopogon* or *Thaumastochloa* or *Thelepogon* or *Themeda* or *Trachypogon* or *Triarrhena* or *Tripsacum* or *Urelytrum* or *Vetiveria* or *Vossia* or *Xerochloa* or *Zea*.

In a preferred embodiment, the plant based material from the sub-family Panicoideae is from the rank *Zea*, such as the species *Zea diploperennis, Zea luxurians, Zea mays, Zea nicaraguensis* or *Zea perennis*.

In a preferred embodiment, the plant based material from the sub-family Panicoideae is from the rank Sorghum, such as the species *Sorghum amplum, Sorghum angustum, Sorghum arundinaceum, Sorghum australiense, Sorghum bicolor, Sorghum brachypodum, Sorghum bulbosum, Sorghum ecarinatum, Sorghum exstans, Sorghum grande, Sorghum halepense*, Sorghum hybrid cultivar, *Sorghum interjectum, Sorghum intrans, Sorghum laxiflorum, Sorghum leiocladum, Sorghum macrospermum, Sorghum matarankense, Sorghum nitidum, Sorghum plumosum, Sorghum propinquum, Sorghum purpureosericeum, Sorghum stipoideum, Sorghum sudanense, Sorghum timorense, Sorghum versicolor*, Sorghum sp. 'Silk' or Sorghum sp. as defined in WO 2007/002267.

In another embodiment, the plant based material from the sub-family Panicoideae is from the tribe Paniceae such as the rank *Acritochaete, Acroceras, Alexfloydia, Alloteropsis, Amphicarpum, Ancistrachne, Anthephora, Brachiaria, Calyptochloa, Cenchrus, Chaetium, Chaetopoa, Chamaeraphis, Chlorocalymma, Cleistochloa, Cyphochlaena, Cyrtococcum, Dichanthelium, Digitaria, Dissochondrus, Echinochloa, Entolasia, Eriochloa, Homopholis, Hygrochloa, Hylebates, Ixophorus, Lasiacis, Leucophrys, Louisiella, Megaloprotachne, Megathyrsus, Melinis, Microcalamus, Moorochloa, Neurachne, Odontelytrum, Oplismenus, Ottochloa, Panicum, Paractaenum, Paraneurachne, Paratheria, Parodiophyllochloa, Paspalidium, Pennisetum, Plagiosetum, Poecilostachys, Pseudechinolaena, Pseudochaetochloa, Pseudoraphis, Rupichloa, Sacciolepis, Scutachne, Setaria, Setariopsis, Snowdenia, Spinifex, Stenotaphrum, Stereochlaena, Thrasya, Thuarea, Thyridolepis, Tricholaena*, unclassified *Paniceae, Uranthoecium, Urochloa, Walwhalleya, Whiteochloa, Yakirra, Yvesia, Zuloagaea* or *Zygochloa*.

In a preferred embodiment, the plant based material from the sub-family Panicoideae is from the rank *Panicum*, such as the species *Panicum adenophorum, Panicum* aff. *aquaticum* JKT-2012, *Panicum amarum, Panicum antidotale, Panicum aquaticum, Panicum arctum, Panicum arundinariae, Panicum atrosanguineum, Panicum auricomum, Panicum auritum, Panicum bartlettii, Panicum bergii, Panicum bisulcatum, Panicum boliviense, Panicum brazzavillense, Panicum brevifolium, Panicum caaguazuense, Panicum campestre, Panicum capillare, Panicum cayennense, Panicum cayoense, Panicum cervicatum, Panicum chloroleucum, Panicum claytonii, Panicum coloratum, Panicum cyanescens, Panicum decompositum, Panicum deustum, Panicum dichotomiflorum, Panicum dinklagei, Panicum distichophyllum, Panicum dregeanum, Panicum elephantipes, Panicum fauriei, Panicum flexile, Panicum fluviicola, Panicum gouinii, Panicum gracilicaule, Panicum granuliferum, Panicum guatemalense, Panicum hallii, Panicum heterostachyum, Panicum hirticaule, Panicum hirtum, Panicum hylaeicum, Panicum incumbens, Panicum infestum, Panicum italicum, Panicum laetum, Panicum laevinode, Panicum lanipes, Panicum larcomianum, Panicum longipedicellatum, Panicum machrisianum, Panicum malacotrichum, Panicum margaritiferum, Panicum micranthum, Panicum miliaceum, Panicum milioides, Panicum millegrana, Panicum mystasipum, Panicum natalense, Panicum nephelophilum, Panicum nervosum, Panicum notatum, Panicum olyroides, Panicum paludosum, Panicum pansum, Panicum pantrichum, Panicum parvifolium, Panicum parviglume, Panicum pedersenii, Panicum penicillatum, Panicum petersonii, Panicum phragmitoides, Panicum piauiense, Panicum pilosum, Panicum pleianthum, Panicum polycomum, Panicum polygonatum, Panicum pseudisachne, Panicum pygmaeum, Panicum pyrularium, Panicum queenslandicum, Panicum racemosum, Panicum repens, Panicum rhizogonum, Panicum rigidulum, Panicum rivale, Panicum rude, Panicum rudgei, Panicum schinzii, Panicum schwackeanum, Panicum sellowii, Panicum seminudum, Panicum stapfianum, Panicum stenodes, Panicum stramineum, Panicum subalbidum, Panicum subtiramulosum, Panicum sumatrense, Panicum tenellum, Panicum tenuifolium, Panicum trichanthum, Panicum trichidiachne, Panicum trichoides, Panicum tricholaenoides, Panicum tuerckheimii, Panicum turgidum, Panicum urvilleanum, Panicum validum, Panicum venezuelae, Panicum verrucosum, Panicum virgatum, Panicum wettsteinii, Panicum* sp., *Panicum* sp. Christin 16-200, *Panicum* sp. ELS-2011, *Panicum* sp. EM389 or *Panicum* sp. Forest 761.

In a further embodiment, the plant based material from the sub-family Panicoideae is maize (*Zea*), corn (*Zea*), sorghum (Sorghum), switchgrass (*Panicum virgatum*), millet (*Panicum miliaceum*), pearl millet (*Cenchrus violaceus* also called *Pennisetum glaucum*), foxtail millet (*Setaria italica* also called *Panicum italicum*) or in a processed form such as milled corn, milled maize, defatted maize, defatted destarched maize, milled sorghum, milled switchgrass, milled millet, milled foxtail millet, milled pearl millet, or any combination thereof.

In an embodiment, the plant based material from the sub-family Panicoideae is from the seed of the plant. In a preferred embodiment, the plant based material from the sub-family Panicoideae is from the seed of maize (*Zea*), corn (*Zea*), sorghum (Sorghum), switchgrass (*Panicum virgatum*), millet (*Panicum miliaceum*), pearl millet (*Cenchrus violaceus* also called *Pennisetum glaucum*), foxtail millet (*Setaria italica* also called *Panicum italicum*) or wherein the seed has been processed such as milled corn, milled maize, defatted maize, defatted destarched maize, milled sorghum, milled switchgrass, milled millet, milled foxtail millet, milled pearl millet, or any combination thereof.

Additional Enzymes

In an embodiment, enzymatic activities aside from or in addition to polypeptides having arabinofuranosidase activity useful according to the invention are contemplated. In particular, protease and additional cellulolytic activities are contemplated.

In an embodiment the invention comprises the use of a GH62 polypeptide having arabinofuranosidase activity and a GH10 xylanase.

In an embodiment the invention comprises the use of a GH62 polypeptide having arabinofuranosidase activity and a GH11 xylanase.

In an embodiment the invention comprises the use of a GH43 polypeptide having arabinofuranosidase activity and a GH10 xylanase.

In an embodiment the invention comprises the use of a GH43 polypeptide having arabinofuranosidase activity and a GH11 xylanase.

Proteases

The protease may be any protease. Suitable proteases include microbial proteases, such as fungal and bacterial proteases. Preferred proteases are acidic proteases, i.e., proteases characterized by the ability to hydrolyze proteins under acidic conditions below pH 7. Preferred proteases are acidic endoproteases. An acid fungal protease is preferred, but also other proteases can be used.

The acid fungal protease may be derived from *Aspergillus, Candida, Coriolus, Endothia, Enthomophtra, Irpex, Mucor, Penicillium, Rhizopus, Sclerotium*, and *Torulopsis*. In particular, the protease may be derived from *Aspergillus aculeatus* (WO 95/02044), *Aspergillus awamori* (Hayashida et al., 1977, *Agric. Biol. Chem.* 42(5), 927-933), *Aspergillus niger* (see, e.g., Koaze et al., 1964, *Agr. Biol. Chem. Japan* 28: 216), *Aspergillus saitoi* (see, e.g., Yoshida, 1954, *J. Agr. Chem. Soc. Japan* 28: 66), or *Aspergillus oryzae*, such as the pepA protease; and acidic proteases from *Mucor miehei* or *Mucor pusillus*.

In an embodiment the acidic protease is a protease complex from *A. oryzae* sold under the tradename Flavourzyme® (from Novozymes A/S) or an aspartic protease from *Rhizomucor miehei* or Spezyme® FAN or GC 106 from Genencor Int.

In a preferred embodiment the acidic protease is an aspartic protease, such as an aspartic protease derived from a strain of *Aspergillus*, in particular, *A. aculeatus*, especially *A. aculeatus* CBD 101.43.

Preferred acidic proteases are aspartic proteases, which retain activity in the presence of an inhibitor selected from the group consisting of pepstatin, Pefabloc, PMSF, or EDTA. Protease I derived from *A. aculeatus* CBS 101.43 is such an acidic protease.

In a preferred embodiment the process of the invention is carried out in the presence of the acidic Protease I derived from *A. aculeatus* CBS 101.43 in an effective amount.

In another embodiment the protease is derived from a strain of the genus *Aspergillus*, such as a strain of *Aspergillus aculeatus*, such as *Aspergillus aculeatus* CBS 101.43, such as the one disclosed in WO 95/02044, or a protease having at least 80%, such as at least 85%, such as at least 90%, preferably at least 95%, such as at least 96%, such as 97%, such as at least 98%, such as at least 99% identity to protease of WO 95/02044. In one aspect, the protease differs by up to 10 amino acids, e.g., 1, 2, 3, 4, 5, 6, 7, 8, 9, or 10, from the mature polypeptide of WO 95/02044. In another embodiment, the present invention relates to variants of the mature polypeptide of WO 95/02044 comprising a substitution, deletion, and/or insertion at one or more (e.g., several) positions. In an embodiment, the number of amino acid substitutions, deletions and/or insertions introduced into the mature polypeptide of WO 95/02044 is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

The protease may be a neutral or alkaline protease, such as a protease derived from a strain of *Bacillus*. A particular protease is derived from *Bacillus amyloliquefaciens* and has the sequence obtainable at Swissprot as Accession No. P06832. The proteases may have at least 90% sequence identity to the amino acid sequence disclosed in the Swissprot Database, Accession No. P06832 such as at least 92%, at least 95%, at least 96%, at least 97%, at least 98%, or particularly at least 99% identity.

The protease may have at least 90% sequence identity to the amino acid sequence disclosed as sequence 1 in WO 2003/048353 such as at 92%, at least 95%, at least 96%, at least 97%, at least 98%, or particularly at least 99% identity.

The protease may be a papain-like protease selected from the group consisting of proteases within EC 3.4.22.* (cysteine protease), such as EC 3.4.22.2 (papain), EC 3.4.22.6 (chymopapain), EC 3.4.22.7 (asclepain), EC 3.4.22.14 (actinidain), EC 3.4.22.15 (cathepsin L), EC 3.4.22.25 (glycyl endopeptidase) and EC 3.4.22.30 (caricain).

In an embodiment, the protease is a protease preparation derived from a strain of *Aspergillus*, such as *Aspergillus oryzae*. In another embodiment the protease is derived from a strain of *Rhizomucor*, preferably *Rhizomucor miehei*. In another embodiment the protease is a protease preparation, preferably a mixture of a proteolytic preparation derived from a strain of *Aspergillus*, such as *Aspergillus oryzae*, and a protease derived from a strain of *Rhizomucor*, preferably *Rhizomucor miehei*.

Aspartic acid proteases are described in, for example, Handbook of Proteolytic Enzymes, Edited by A. J. Barrett, N. D. Rawlings and J. F. Woessner, Academic Press, San Diego, 1998, Chapter 270. Examples of aspartic acid proteases include, e.g., those disclosed in Berka et al., 1990, *Gene* 96: 313; Berka et al., 1993, *Gene* 125: 195-198; and Gomi et al., 1993, *Biosci. Biotech. Biochem.* 57: 1095-1100, which are hereby incorporated by reference.

The protease also may be a metalloprotease, which is defined as a protease selected from the group consisting of:
 (a) proteases belonging to EC 3.4.24 (metalloendopeptidases); preferably EC 3.4.24.39 (acid metallo proteinases);
 (b) metalloproteases belonging to the M group of the above Handbook;
 (c) metalloproteases not yet assigned to clans (designation: Clan MX), or belonging to either one of clans MA, MB, MC, MD, ME, MF, MG, MH (as defined at pp. 989-991 of the above Handbook);
 (d) other families of metalloproteases (as defined at pp. 1448-1452 of the above Handbook);
 (e) metalloproteases with a HEXXH motif;
 (f) metalloproteases with an HEFTH motif;

(g) metalloproteases belonging to either one of families M3, M26, M27, M32, M34, M35, M36, M41, M43, or M47 (as defined at pp. 1448-1452 of the above Handbook);
(h) metalloproteases belonging to the M28E family; and
(i) metalloproteases belonging to family M35 (as defined at pp. 1492-1495 of the above Handbook).

In other particular embodiments, metalloproteases are hydrolases in which the nucleophilic attack on a peptide bond is mediated by a water molecule, which is activated by a divalent metal cation. Examples of divalent cations are zinc, cobalt or manganese. The metal ion may be held in place by amino acid ligands. The number of ligands may be five, four, three, two, one or zero. In a particular embodiment, the number is two or three, preferably three.

There are no limitations on the origin of the metalloprotease used in a process of the invention. In an embodiment the metalloprotease is classified as EC 3.4.24, preferably EC 3.4.24.39. In one embodiment, the metalloprotease is an acid-stable metalloprotease, e.g., a fungal acid-stable metalloprotease, such as a metalloprotease derived from a strain of the genus *Thermoascus*, preferably a strain of *Thermoascus aurantiacus*, especially *Thermoascus aurantiacus* CGMCC No. 0670 (classified as EC 3.4.24.39). In another embodiment, the metalloprotease is derived from a strain of the genus *Aspergillus*, preferably a strain of *Aspergillus oryzae*.

In one embodiment the metalloprotease has a degree of sequence identity to amino acids −159 to 177, or preferably amino acids+1 to 177 (the mature polypeptide) of Sequence Number 1 of WO 2010/008841 (a *Thermoascus aurantiacus* metalloprotease) of at least 80%, at least 82%, at least 85%, at least 90%, at least 95%, or at least 97%; and which have metalloprotease activity.

The *Thermoascus aurantiacus* metalloprotease is a preferred example of a metalloprotease suitable for use in a process of the invention. Another metalloprotease is derived from *Aspergillus oryzae* and comprises Sequence Number 11 disclosed in WO 2003/048353, or amino acids 23-353; 23-374; 23-397; 1-353; 1-374; 1-397; 177-353; 177-374; or 177-397 thereof, and Sequence Number 10 disclosed in WO 2003/048353.

Another metalloprotease suitable for use in a process of the invention is the *Aspergillus oryzae* metalloprotease comprising Sequence Number 5 of WO 2010/008841, or a metalloprotease is an isolated polypeptide which has a degree of identity to Sequence Number 5 of at least about 80%, at least 82%, at least 85%, at least 90%, at least 95%, or at least 97%; and which have metalloprotease activity. In particular embodiments, the metalloprotease consists of the amino acid sequence of Sequence Number 5.

In a particular embodiment, a metalloprotease has an amino acid sequence that differs by forty, thirty-five, thirty, twenty-five, twenty, or by fifteen amino acids from amino acids −159 to 177, or +1 to 177 of the amino acid sequences of the *Thermoascus aurantiacus* or *Aspergillus oryzae* metalloprotease.

In another embodiment, a metalloprotease has an amino acid sequence that differs by ten, or by nine, or by eight, or by seven, or by six, or by five amino acids from amino acids −159 to 177, or +1 to 177 of the amino acid sequences of these metalloproteases, e.g., by four, by three, by two, or by one amino acid.

In particular embodiments, the metalloprotease a) comprises or b) consists of
i) the amino acid sequence of amino acids −159 to 177, or +1 to 177 of Sequence Number 1 of WO 2010/008841;
ii) the amino acid sequence of amino acids 23-353, 23-374, 23-397, 1-353, 1-374, 1-397, 177-353, 177-374, or 177-397 of Sequence Number 3 of WO 2010/008841;
iii) the amino acid sequence of Sequence Number 5 of WO 2010/008841; or allelic variants, or fragments, of the sequences of i), ii), and iii) that have protease activity.

A fragment of amino acids −159 to 177, or +1 to 177 of Sequence Number 1 of WO 2010/008841 or of amino acids 23-353, 23-374, 23-397, 1-353, 1-374, 1-397, 177-353, 177-374, or 177-397 of Sequence Number 3 of WO 2010/008841; is a polypeptide having one or more amino acids deleted from the amino and/or carboxyl terminus of these amino acid sequences. In one embodiment a fragment contains at least 75 amino acid residues, or at least 100 amino acid residues, or at least 125 amino acid residues, or at least 150 amino acid residues, or at least 160 amino acid residues, or at least 165 amino acid residues, or at least 170 amino acid residues, or at least 175 amino acid residues.

In another embodiment, the metalloprotease is combined with another protease, such as a fungal protease, preferably an acid fungal protease.

In another embodiment, the protease is selected from the group consisting of:
(a) proteases belonging to the EC 3.4.21. enzyme group; and/or
(b) proteases belonging to the EC 3.4.14. enzyme group; and/or
(c) Serine proteases of the peptidase family S53 that comprises two different types of peptidases: tripeptidyl aminopeptidases (exo-type) and endo-peptidases; as described in 1993, *Biochem. J.* 290:205-218 and in MEROPS protease database, release, 9.4 (31 Jan. 2011) (www.merops.ac.uk). The database is described in Rawlings, Barrett and Bateman, 2010, "MEROPS: the peptidase database", *Nucl. Acids Res.* 38: D227-D233. See also PCT/CN2013/087861 filed 26 Nov. 2013.

Commercially available products include ALCALASE®, ESPERASE™, FLAVOURZYME™, NEUTRASE®, RENNILASE®, NOVOZYM™ FM 2.0 L, and iZyme BA (available from Novozymes A/S, Denmark) and GC106™ and SPEZYME™ FAN from Genencor International, Inc., USA.

The protease may be present in an amount of 0.0001-1 mg enzyme protein per g dry solids (DS) kernels, preferably 0.001 to 0.1 mg enzyme protein per g DS kernels.

In an embodiment, the protease is an acidic protease added in an amount of 1-20,000 HUT/100 g DS kernels, such as 1-10,000 HUT/100 g DS kernels, preferably 300-8,000 HUT/100 g DS kernels, especially 3,000-6,000 HUT/100 g DS kernels, or 4,000-20,000 HUT/100 g DS kernels acidic protease, preferably 5,000-10,000 HUT/100 g, especially from 6,000-16,500 HUT/100 g DS kernels.

Cellulolytic Compositions

In further embodiments, the invention relates to use of combinations with cellulolytic compositions.

Exemplary cellulolytic compositions are as described in e.g., WO 2015/081139 and PCT/US2015/034179.

In an embodiment the cellulolytic composition is derived from a strain of *Trichoderma*, such as a strain of *Trichoderma reesei*; a strain of *Humicola*, such as a strain of *Humicola insolens*, and/or a strain of *Chrysosporium*, such as a strain of *Chrysosporium lucknowense*.

In a preferred embodiment the cellulolytic composition is derived from a strain of *Trichoderma reesei*.

The cellulolytic composition may comprise one or more of the following polypeptides, including enzymes: GH61 polypeptide having cellulolytic enhancing activity, beta-glucosidase, beta-xylosidase, CBHI and CBHII, endoglucanase, xylanase, or a mixture of two, three, or four thereof.

In an embodiment the cellulolytic composition comprises a GH61 polypeptide having cellulolytic enhancing activity and a beta-glucosidase.

In an embodiment the cellulolytic composition comprises a GH61 polypeptide having cellulolytic enhancing activity and a beta-xylosidase.

In an embodiment, the cellulolytic composition comprises a GH61 polypeptide having cellulolytic enhancing activity and an endoglucanase.

In an embodiment, the cellulolytic composition comprises a GH61 polypeptide having cellulolytic enhancing activity and a xylanase.

In an embodiment, the cellulolytic composition comprises a GH61 polypeptide having cellulolytic enhancing activity, an endoglucanase, and a xylanase.

In an embodiment the cellulolytic composition comprises a GH61 polypeptide having cellulolytic enhancing activity, a beta-glucosidase, and a beta-xylosidase. In an embodiment the cellulolytic composition comprises a GH61 polypeptide having cellulolytic enhancing activity, a beta-glucosidase, and an endoglucanase. In an embodiment the cellulolytic composition comprises a GH61 polypeptide having cellulolytic enhancing activity, a beta-glucosidase, and a xylanase.

In an embodiment the cellulolytic composition comprises a GH61 polypeptide having cellulolytic enhancing activity, a beta-xylosidase, and an endoglucanase. In an embodiment the cellulolytic composition comprises a GH61 polypeptide having cellulolytic enhancing activity, a beta-xylosidase, and a xylanase.

In an embodiment the cellulolytic composition comprises a GH61 polypeptide having cellulolytic enhancing activity, a beta-glucosidase, a beta-xylosidase, and an endoglucanase. In an embodiment the cellulolytic composition comprises a GH61 polypeptide having cellulolytic enhancing activity, a beta-glucosidase, a beta-xylosidase, and a xylanase. In an embodiment the cellulolytic composition comprises a GH61 polypeptide having cellulolytic enhancing activity, a beta-glucosidase, an endoglucanase, and a xylanase.

In an embodiment the cellulolytic composition comprises a GH61 polypeptide having cellulolytic enhancing activity, a beta-xylosidase, an endoglucanase, and a xylanase.

In an embodiment the cellulolytic composition comprises a GH61 polypeptide having cellulolytic enhancing activity, a beta-glucosidase, a beta-xylosidase, an endoglucanase, and a xylanase.

In an embodiment the endoglucanase is an endoglucanase I.

In an embodiment the endoglucanase is an endoglucanase II.

In an embodiment, the cellulolytic composition comprises a GH61 polypeptide having cellulolytic enhancing activity, an endoglucanase I, and a xylanase.

In an embodiment, the cellulolytic composition comprises a GH61 polypeptide having cellulolytic enhancing activity, an endoglucanase II, and a xylanase.

In another embodiment the cellulolytic composition comprises a GH61 polypeptide having cellulolytic enhancing activity, a beta-glucosidase, and a CBHI.

In another embodiment the cellulolytic composition comprises a GH61 polypeptide having cellulolytic enhancing activity, a beta-glucosidase, a CBHI and a CBHII.

The cellulolytic composition may further comprise one or more enzymes selected from the group consisting of an esterase, an expansin, a laccase, a ligninolytic enzyme, a pectinase, a peroxidase, a protease, a swollenin, and a phytase.

Xylanase (GH10 and GH11 Polypeptides)

Exemplary embodiments relating to the GH10 or GH11 polypeptide having xylanase activity are disclosed herein below, alternatively referred to as Family 10 xylanase and Family 11 xylanase, respectively.

In an embodiment, the GH10 polypeptide having xylanase activity such as the xylanase from *Aspergillus aculeatus* (Xyl II) as disclosed in WO 1994/021785 as SEQ ID NO: 5 and disclosed herein as SEQ ID NO: 70.

In an embodiment, the GH10 polypeptide having xylanase activity has a sequence identity to SEQ ID NO: 70 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity such as the xylanase from *Clostridium acetobutylicum* as disclosed in *J. Bacteriol.* 183(16):4823 (2001) as Swissprot:Q97TP5 and disclosed herein as SEQ ID NO: 71.

In an embodiment, the GH10 polypeptide having xylanase activity has a sequence identity to SEQ ID NO: 71 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity such as the xylanase from *Aspergillus aculeatus* as disclosed as SEQ ID NO: 8 in WO 2005/059084 and disclosed herein as SEQ ID NO: 72.

In an embodiment, the GH10 polypeptide having xylanase activity has a sequence identity to SEQ ID NO: 72 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Thermomyces lanuginosus* as disclosed as SEQ ID NO: 2 in WO 96/23062 and disclosed herein as SEQ ID NO: 73.

In an embodiment, the GH10 polypeptide having xylanase activity has a sequence identity to SEQ ID NO: 73 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Dictyoglomus thermophilum* as disclosed as SEQ ID NO: 305 in WO 2011/057140 and disclosed herein as SEQ ID NO: 74.

In an embodiment, GH10 polypeptide having xylanase activity has a sequence identity to SEQ ID NO: 74 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Paenibacillus pabuli* as disclosed as SEQ ID NO: 2 in WO 2005/079585 and disclosed herein as SEQ ID NO: 75.

In an embodiment, the GH10 polypeptide having xylanase activity has a sequence identity to SEQ ID NO: 75 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Geobacillus stearothermophilus* as disclosed herein as SEQ ID NO: 78. In an embodiment, the composition comprises a GH10 polypeptide having xylanase activity having a sequence identity to the mature polypeptide of SEQ ID NO: 77 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity has a sequence identity to SEQ ID NO: 78 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Streptomyces beijiangensis* as disclosed herein as SEQ ID NO: 84. In an embodiment, the composition comprises a GH10 polypeptide having xylanase activity having a sequence identity to the mature polypeptide of SEQ ID NO: 83 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity has a sequence identity to SEQ ID NO: 84 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Fusarium oxysporum* called FoxXyn6 as disclosed as SEQ ID NO: 2 in WO 2014/019220 and as disclosed herein as SEQ ID NO: 88.

In an embodiment, the composition comprises a GH10 polypeptide having xylanase activity having a sequence identity to SEQ ID NO: 88 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Fusarium oxysporum* called AclXyn5 as disclosed as SEQ ID NO: 7 in WO 2014/020143 and as disclosed herein as SEQ ID NO: 89.

In an embodiment, the GH10 polypeptide having xylanase activity has a sequence identity to SEQ ID NO: 89 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity is the xylanase from *Corynascus* such as *Corynascus thermophilus*, from *Scytalidium* such as *Scytalidium thermophilum*, from *Penicillium* such as *Penicillium oxalicum* as disclosed in WO 2013/075642, or a GH11 polypeptide having xylanase activity having a sequence identity of at least at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to any of these.

In an embodiment, the GH10 polypeptide having xylanase activity includes the xylanase from *Talaromyces leycettanus* as disclosed in WO 2013/019827 and disclosed herein as SEQ ID NO: 104. In an embodiment, the GH10 polypeptide having xylanase activity has a sequence identity to SEQ ID NO: 104 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity includes the xylanase from *Trichophaea saccata* as disclosed in WO 2011/057083 and disclosed herein as SEQ ID NO: 106. In an embodiment, the GH10 polypeptide having xylanase activity has a sequence identity to SEQ ID NO: 106 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In one embodiment, the cellulolytic composition comprises a xylanase. In a preferred aspect, the xylanase is a Family 10 xylanase.

Examples of xylanases useful in the processes of the present invention include, but are not limited to, xylanases from *Aspergillus aculeatus* (GeneSeqP:AAR63790; WO 94/21785), *Aspergillus fumigatus* (WO 2006/078256), *Penicillium pinophilum* (WO 2011/041405), *Penicillium* sp. (WO 2010/126772), *Thielavia terrestris* NRRL 8126 (WO 2009/079210), and *Trichophaea saccata* GH10 (WO 2011/057083).

In one embodiment the GH10 xylanase is derived from the genus *Aspergillus*, such as a strain of *Aspergillus aculeatus*, such as the one described in WO 94/021785 as Sequence Number 5 (referred to as Xyl II; or a GH10 xylanase having at least 80%, such as at least 85%, such as at least 90%, preferably at least 95%, such as at least 96%, such as 97%, such as at least 98%, such as at least 99% identity to Sequence Number 5 in WO 94/21785. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one embodiment the GH10 xylanase is derived from the genus *Aspergillus*, such as a strain of *Aspergillus fumigatus*, such as described in WO 2006/078256 as Xyl III, or a GH10 xylanase having at least 80%, such as at least 85%, such as at least 90%, preferably at least 95%, such as at least 96%, such as 97%, such as at least 98%, such as at least 99% identity to Xyl III in WO 2006/078256. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In an embodiment, the GH10 polypeptide having xylanase activity such as the xylanase from *Aspergillus niger* as disclosed herein as SEQ ID NO: 119.

In an embodiment, the GH10 polypeptide having xylanase activity has a sequence identity to SEQ ID NO: 119 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

AA9 (GH61) Polypeptide Having Cellulolytic Enhancing Activity

The cellulolytic composition may in one embodiment comprise one or more AA9 (GH61) polypeptide having cellulolytic enhancing activity.

In one aspect, the AA9 (GH61) polypeptide is any AA9 polypeptide having cellulolytic enhancing activity. Examples of AA9 polypeptides include, but are not limited to, AA9 polypeptides from *Thielavia terrestris* (WO 2005/074647, WO 2008/148131, and WO 2011/035027), *Thermoascus aurantiacus* (WO 2005/074656 and WO 2010/065830), *Trichoderma reesei* (WO 2007/089290 and WO 2012/149344), *Myceliophthora thermophila* (WO 2009/085935, WO 2009/085859, WO 2009/085864, WO 2009/085868, WO 2009/033071, WO 2012/027374, and WO 2012/068236), *Aspergillus fumigatus* (WO 2010/138754), *Penicillium pinophilum* (WO 2011/005867), *Thermoascus* sp. (WO 2011/039319), *Penicillium* sp. (*emersonii*) (WO 2011/041397 and WO 2012/000892), *Thermoascus crustaceous* (WO 2011/041504), *Aspergillus aculeatus* (WO 2012/125925), *Thermomyces lanuginosus* (WO 2012/113340, WO 2012/129699, WO 2012/130964, and WO 2012/129699), *Aurantiporus alborubescens* (WO 2012/122477), *Trichophaea saccata* (WO 2012/122477), *Penicillium thomii* (WO 2012/122477), *Talaromyces stipitatus* (WO 2012/135659), *Humicola insolens* (WO 2012/146171), *Malbranchea cinnamomea* (WO 2012/101206), *Talaromyces leycettanus* (WO 2012/101206), and *Chaetomium thermophilum* (WO 2012/101206), *Talaromyces emersonii* (WO 2012/000892), *Trametes versicolor* (WO 2012/092676 and WO 2012/093149), and *Talaromyces thermophilus* (WO 2012/129697 and WO 2012/130950); which are incorporated herein by reference in their entireties.

In another aspect, the AA9 polypeptide having cellulolytic enhancing activity is selected from the group consisting of: (i) an AA9 polypeptide having cellulolytic enhancing activity comprising or consisting of the mature polypeptide of SEQ ID NO: 102; (ii) an AA9 polypeptide having cellulolytic enhancing activity comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 102; (iii) an AA9 polypeptide having cellulolytic enhancing activity encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 101; and (iv) an AA9 polypeptide having cellulolytic enhancing activity encoded by a polynucleotide that hybridizes under at least high stringency conditions, e.g., very high stringency conditions, with the mature polypeptide coding sequence of SEQ ID NO: 101 or the full-length complement thereof.

In another aspect, the *Penicillium* sp. (*emersonii*) AA9 polypeptide having cellulolytic enhancing activity or a homolog thereof is selected from the group consisting of: (i) an AA9 polypeptide having cellulolytic enhancing activity comprising or consisting of the mature polypeptide of SEQ ID NO: 102; (ii) an AA9 polypeptide having cellulolytic enhancing activity comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 102; (iii) an AA9 polypeptide having cellulolytic enhancing activity encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 101; and (iv) an AA9 polypeptide having cellulolytic enhancing activity encoded by a polynucleotide that hybridizes under at least high stringency conditions, e.g., very high stringency conditions, with the mature polypeptide coding sequence of SEQ ID NO: 101 or the full-length complement thereof.

In one embodiment GH61 polypeptide having cellulolytic enhancing activity, is derived from the genus *Thermoascus*, such as a strain of *Thermoascus aurantiacus*, such as the one described in WO 2005/074656 as Sequence Number 2; or a GH61 polypeptide having cellulolytic enhancing activity having at least 80%, such as at least 85%, such as at least 90%, preferably at least 95%, such as at least 96%, such as 97%, such as at least 98%, such as at least 99% identity to Sequence Number 2 in WO 2005/074656. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one embodiment, the GH61 polypeptide having cellulolytic enhancing activity, is derived from a strain derived from *Penicillium*, such as a strain of *Penicillium emersonii*, such as the one disclosed in WO 2011/041397, or a GH61 polypeptide having cellulolytic enhancing activity having at least 80%, such as at least 85%, such as at least 90%, preferably at least 95%, such as at least 96%, such as 97%, such as at least 98%, such as at least 99% identity to Sequence Number 2 in WO 2011/041397. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one embodiment the GH61 polypeptide having cellulolytic enhancing activity is derived from the genus *Thielavia*, such as a strain of *Thielavia terrestris*, such as the one described in WO 2005/074647 as Sequence Number 7 or Sequence Number 8; or one derived from a strain of *Aspergillus*, such as a strain of *Aspergillus fumigatus*, such as the one described in WO 2010/138754 as Sequence Number 2, or a GH61 polypeptide having cellulolytic enhancing activity having at least 80%, such as at least 85%, such as at least 90%, preferably at least 95%, such as at least 96%, such as 97%, such as at least 98%, such as at least 99% identity to any of these.

Endoglucanase

In one embodiment, the cellulolytic composition comprises an endoglucanase, such as an endoglucanase I or endoglucanase II.

Examples of bacterial endoglucanases that can be used in the processes of the present invention, include, but are not limited to, an *Acidothermus cellulolyticus* endoglucanase (WO 91/05039; WO 93/15186; U.S. Pat. No. 5,275,944; WO 96/02551; U.S. Pat. No. 5,536,655, WO 00/70031, WO 2005/093050); *Thermobifida fusca* endoglucanase III (WO 05/093050); and *Thermobifida fusca* endoglucanase V (WO 2005/093050).

Examples of fungal endoglucanases that can be used in the present invention, include, but are not limited to, a *Trichoderma reesei* endoglucanase I (Penttila et al., 1986, *Gene* 45: 253-263, *Trichoderma reesei* Cel7B endoglucanase I (GENBANK™ accession no. M15665), *Trichoderma reesei* endoglucanase II (Saloheimo, et al., 1988, *Gene* 63:11-22), *Trichoderma reesei* Cel5A endoglucanase II (GENBANK™ accession no. M19373), *Trichoderma reesei* endoglucanase III (Okada et al., 1988, *Appl. Environ. Microbiol.* 64: 555-563, GENBANK™ accession no. AB003694), *Trichoderma reesei* endoglucanase V (Saloheimo et al., 1994, *Molecular Microbiology* 13: 219-228, GENBANK™ accession no. Z33381), *Aspergillus aculeatus* endoglucanase (Ooi et al., 1990, *Nucleic Acids Research* 18: 5884), *Aspergillus kawachii* endoglucanase (Sakamoto et al., 1995, *Current Genetics* 27: 435-439), *Erwinia* carotovara endoglucanase (Saarilahti et al., 1990, *Gene* 90: 9-14), *Fusarium oxysporum* endoglucanase (GENBANK™ accession no. L29381), *Humicola grisea* var. thermoidea endoglucanase (GENBANK™ accession no. AB003107), *Melanocarpus albomyces* endoglucanase (GENBANK™ accession no. MAL515703), *Neurospora crassa* endoglucanase (GENBANK™ accession no. XM_324477), *Humicola insolens* endoglucanase V, *Myceliophthora thermophila* CBS 117.65 endoglucanase, basidiomycete CBS 495.95 endoglucanase, basidiomycete CBS 494.95 endoglucanase, *Thielavia terrestris* NRRL 8126 CEL6B endoglucanase, *Thielavia terrestris* NRRL 8126 CEL6C endoglucanase, *Thielavia terrestris* NRRL 8126 CEL7C endoglucanase, *Thielavia terrestris* NRRL 8126 CEL7E endoglucanase, *Thielavia terrestris* NRRL 8126 CEL7F endoglucanase, *Cladorrhinum foecundissimum* ATCC 62373 CEL7A endoglucanase, and *Trichoderma reesei* strain No. VTT-D-80133 endoglucanase (GENBANK™ accession no. M15665).

In one embodiment, the endoglucanase is an endoglucanase II, such as one derived from *Trichoderma*, such as a strain of *Trichoderma reesei*, such as the one described in WO 2011/057140 as Sequence Number 22; or an endoglucanase having at least 80%, such as at least 85%, such as at least 90%, preferably at least 95%, such as at least 96%, such as 97%, such as at least 98%, such as at least 99% identity to Sequence Number 22 in WO 2011/057140. In one aspect, the protease differs by up to 10 amino acids, e.g., 1, 2, 3, 4, 5, 6, 7, 8, 9, or 10, from the mature polypeptide 3. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one aspect, the endoglucanase I is selected from the group consisting of: (i) an endoglucanase I comprising or consisting of the mature polypeptide of SEQ ID NO: 110; (ii) an endoglucanase I comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 110; (iii) an endoglucanase I encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 109; and (iv) an endoglucanase I encoded by a polynucleotide that hybridizes under at least high stringency conditions, e.g., very high stringency conditions, with the mature polypeptide coding sequence of SEQ ID NO: 109 or the full-length complement thereof.

In another aspect, the endoglucanase II is selected from the group consisting of: (i) an endoglucanase II comprising or consisting of the mature polypeptide of SEQ ID NO: 112;

(ii) an endoglucanase II comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 112; (iii) an endoglucanase II encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 111; and (iv) an endoglucanase II encoded by a polynucleotide that hybridizes under at least high stringency conditions, e.g., very high stringency conditions, with the mature polypeptide coding sequence of SEQ ID NO: 111 or the full-length complement thereof.

Beta-Xylosidase

Examples of beta-xylosidases useful in the processes of the present invention include, but are not limited to, beta-xylosidases from *Neurospora crassa* (SwissProt accession number Q7SOW4), *Trichoderma reesei* (UniProtKB/TrEMBL accession number Q92458), and *Talaromyces emersonii* (SwissProt accession number Q8X212).

In one embodiment the beta-xylosidase is derived from the genus *Aspergillus*, such as a strain of *Aspergillus fumigatus*, such as the one described in WO 2011/057140 as Sequence Number 206, or a beta-xylosidase having at least 80%, such as at least 85%, such as at least 90%, preferably at least 95%, such as at least 96%, such as 97%, such as at least 98%, such as at least 99% identity to Sequence Number 206 in WO 2011/057140. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide of SEQ ID NO: 6 comprising a substitution, deletion, and/or insertion at one or more (e.g., several) positions. In an embodiment, the number of amino acid substitutions, deletions and/or insertions introduced into the mature polypeptide of SEQ ID NO: 6 is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one embodiment the beta-xylosidase is derived from a strain of the genus *Aspergillus*, such as a strain of *Aspergillus fumigatus*, such as the one disclosed in U.S. provisional 61/526,833 or PCT/US12/052163 (Examples 16 and 17), or derived from a strain of *Trichoderma*, such as a strain of *Trichoderma reesei*, such as the mature polypeptide of Sequence Number 58 in WO 2011/057140 or a beta-xylosidase having at least 80%, such as at least 85%, such as at least 90%, preferably at least 95%, such as at least 96%, such as 97%, such as at least 98%, such as at least 99% identity thereto.

In another aspect, the *Talaromyces emersonii* beta-xylosidase or a homolog thereof is selected from the group consisting of: (i) a beta-xylosidase comprising or consisting of the mature polypeptide of SEQ ID NO: 108; (ii) a beta-xylosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 108; (iii) a beta-xylosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 107; and (iv) a beta-xylosidase encoded by a polynucleotide that hybridizes under at least high stringency conditions, e.g., very high stringency conditions, with the mature polypeptide coding sequence of SEQ ID NO: 107 or the full-length complement thereof.

Beta-Glucosidase

The cellulolytic composition may in one embodiment comprise one or more beta-glucosidase. The beta-glucosidase may in one embodiment be one derived from a strain of the genus *Aspergillus*, such as *Aspergillus oryzae*, such as the one disclosed in WO 2002/095014 or the fusion protein having beta-glucosidase activity disclosed in WO 2008/057637, or *Aspergillus fumigatus*, such as the one disclosed in WO 2005/047499 or an *Aspergillus fumigatus* beta-glucosidase variant, such as disclosed in PCT application WO 2012/044915, such as the one with the following substitutions: F100D, S283G, N456E, F512Y.

In one embodiment the beta-glucosidase is derived from the genus *Aspergillus*, such as a strain of *Aspergillus fumigatus*, such as the one described in WO 2005/047499, or a beta-glucosidase having at least 80%, such as at least 85%, such as at least 90%, preferably at least 95%, such as at least 96%, such as 97%, such as at least 98%, such as at least 99% identity thereto.

In one embodiment the beta-glucosidase is derived from the genus *Aspergillus*, such as a strain of *Aspergillus fumigatus*, such as the one described in WO 2012/044915, or a beta-xylosidase having at least 80%, such as at least 85%, such as at least 90%, preferably at least 95%, such as at least 96%, such as 97%, such as at least 98%, such as at least 99% identity thereto.

In another aspect, the *Aspergillus fumigatus* beta-glucosidase or a homolog thereof is selected from the group consisting of: (i) a beta-glucosidase comprising or consisting of the mature polypeptide of SEQ ID NO: 100; (ii) a beta-glucosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 100; (iii) a beta-glucosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 99; and (iv) a beta-glucosidase encoded by a polynucleotide that hybridizes under at least high stringency conditions, e.g., very high stringency conditions, with the mature polypeptide coding sequence of SEQ ID NO: 99 or the full-length complement thereof.

Cellobiohydrolase I

The cellulolytic composition may in one embodiment may comprise one or more CBH I (cellobiohydrolase I). In one embodiment the cellulolytic composition comprises a cellobiohydrolase I (CBHI), such as one derived from a strain of the genus *Aspergillus*, such as a strain of *Aspergillus fumigatus*, such as the Cel7A CBHI disclosed in Sequence Number 2 in WO 2011/057140, or a strain of the genus *Trichoderma*, such as a strain of *Trichoderma reesei*.

In one embodiment the cellobiohydrolyase I is derived from the genus *Aspergillus*, such as a strain of *Aspergillus fumigatus*, such as the one described in WO 2011/057140, or a CBHI having at least 80%, such as at least 85%, such as at least 90%, preferably at least 95%, such as at least 96%, such as 97%, such as at least 98%, such as at least 99% identity thereto.

In one aspect, the *Aspergillus fumigatus* cellobiohydrolase I or a homolog thereof is selected from the group consisting of: (i) a cellobiohydrolase I comprising or consisting of the mature polypeptide of SEQ ID NO: 114; (ii) a cellobiohydrolase I comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 114; (iii) a cellobiohydrolase I encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 113; and (iv) a cellobiohydrolase I encoded by a polynucleotide that hybridizes under at least high stringency conditions, e.g., very high stringency conditions, with the mature polypeptide coding sequence of SEQ ID NO: 113 or the full-length complement thereof.

Cellobiohydrolase II

The cellulolytic composition may in one embodiment comprise one or more CBH II (cellobiohydrolase II). In one embodiment the cellobiohydrolase II (CBHII), such as one derived from a strain of the genus *Aspergillus*, such as a strain of *Aspergillus fumigatus*, or a strain of the genus *Trichoderma*, such as *Trichoderma reesei*, or a strain of the genus *Thielavia*, such as a strain of *Thielavia terrestris*, such as cellobiohydrolase II CEL6A from *Thielavia terrestris*.

In one embodiment the cellobiohydrolyase II is derived from the genus *Aspergillus*, such as a strain of *Aspergillus fumigatus*, such as the one described in WO 2011/057140, or a CBHII having at least 80%, such as at least 85%, such as at least 90%, preferably at least 95%, such as at least 96%, such as 97%, such as at least 98%, such as at least 99% identity thereto.

In another aspect, the *Aspergillus fumigatus* cellobiohydrolase II or a homolog thereof is selected from the group consisting of: (i) a cellobiohydrolase II comprising or consisting of the mature polypeptide of SEQ ID NO: 116; (ii) a cellobiohydrolase II comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 116; (iii) a cellobiohydrolase II encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 115; and (iv) a cellobiohydrolase II encoded by a polynucleotide that hybridizes under at least high stringency conditions, e.g., very high stringency conditions, with the mature polypeptide coding sequence of SEQ ID NO: 115 or the full-length complement thereof.

Exemplary Cellulolytic Compositions

In particular, according to an embodiment, the present invention relates to use of enzyme compositions, comprising: (A) (i) a cellobiohydrolase I, (ii) a cellobiohydrolase II, and (iii) at least one enzyme selected from the group consisting of a beta-glucosidase or a variant thereof, an AA9 polypeptide having cellulolytic enhancing activity, a GH10 xylanase, and a beta-xylosidase; (B) (i) a GH10 xylanase and (ii) a beta-xylosidase; or (C) (i) a cellobiohydrolase I, (ii) a cellobiohydrolase II, (iii) a GH10 xylanase, and (iv) a beta-xylosidase; wherein the cellobiohydrolase I is selected from the group consisting of: (i) a cellobiohydrolase I comprising or consisting of the mature polypeptide of SEQ ID NO: 96; (ii) a cellobiohydrolase I comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 96; (iii) a cellobiohydrolase I encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 95; and (iv) a cellobiohydrolase I encoded by a polynucleotide that hybridizes under at least high stringency conditions, e.g., very high stringency conditions, with the mature polypeptide coding sequence of SEQ ID NO: 95 or the full-length complement thereof;

the cellobiohydrolase II is selected from the group consisting of: (i) a cellobiohydrolase II comprising or consisting of the mature polypeptide of SEQ ID NO: 98; (ii) a cellobiohydrolase II comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 98; (iii) a cellobiohydrolase II encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 97; and (iv) a cellobiohydrolase II encoded by a polynucleotide that hybridizes under at least high stringency conditions, e.g., very high stringency conditions, with the mature polypeptide coding sequence of SEQ ID NO: 97 or the full-length complement thereof;

the beta-glucosidase is selected from the group consisting of: (i) a beta-glucosidase comprising or consisting of the mature polypeptide of SEQ ID NO: 100; (ii) a beta-glucosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 100; (iii) a beta-glucosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 99; and (iv) a beta-glucosidase encoded by a polynucleotide that hybridizes under at least high stringency conditions, e.g., very high stringency conditions, with the mature polypeptide coding sequence of SEQ ID NO: 99 or the full-length complement thereof;

the xylanase is selected from the group consisting of: (i) a xylanase comprising or consisting of the mature polypeptide of SEQ ID NO: 104 or the mature polypeptide of SEQ ID NO: 106; (ii) a xylanase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 104 or the mature polypeptide of SEQ ID NO: 106; (iii) a xylanase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 103 or the mature polypeptide coding sequence of SEQ ID NO: 105; and (iv) a xylanase encoded by a polynucleotide that hybridizes under at least high stringency conditions, e.g., very high stringency conditions, with the mature polypeptide coding sequence of SEQ ID NO: 103 or the mature polypeptide coding sequence of SEQ ID NO: 105; or the full-length complement thereof; and the beta-xylosidase is selected from the group consisting of: (i) a beta-xylosidase comprising or consisting of the mature polypeptide of SEQ ID NO: 108; (ii) a beta-xylosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 108; (iii) a beta-xylosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 107; and (iv) a beta-xylosidase encoded by a polynucleotide that hybridizes under at least high stringency conditions, e.g., very high stringency conditions, with the mature polypeptide coding sequence of SEQ ID NO: 107 or the full-length complement thereof.

In particular, according to an embodiment, the present invention relates to the use of enzyme compositions, comprising: (A) (i) an *Aspergillus fumigatus* cellobiohydrolase I; (ii) an *Aspergillus fumigatus* cellobiohydrolase II; (iii) an *Aspergillus fumigatus* beta-glucosidase or variant thereof; (iv) a *Penicillium* sp. AA9 polypeptide having cellulolytic enhancing activity; (v) a *Trichophaea saccata* GH10 xylanase; and (vi) a *Talaromyces emersonii* beta-xylosidase; or homologs thereof; (B) (i) an *Aspergillus fumigatus* cellobiohydrolase I; (ii) an *Aspergillus fumigatus* cellobiohydrolase II; (iii) a *Trichophaea saccata* GH10 xylanase; and (iv) a *Talaromyces emersonii* beta-xylosidase; or homologs thereof; or (C) (i) a *Trichophaea saccata* GH10 xylanase; and (ii) a *Talaromyces emersonii* beta-xylosidase; or homologs thereof.

In one embodiment, the amount of cellobiohydrolase I in an enzyme composition of the present invention is 5% to 60% of the total protein of the enzyme composition, e.g., 7.5% to 55%, 10% to 50%, 12.5% to 45%, 15% to 40%, 17.5% to 35%, and 20% to 30% of the total protein of the enzyme composition.

In another embodiment, the amount of cellobiohydrolase II in an enzyme composition of the present invention is 2.0-40% of the total protein of the enzyme composition, e.g., 3.0% to 35%, 4.0% to 30%, 5% to 25%, 6% to 20%, 7% to 15%, and 7.5% to 12% of the total protein of the enzyme composition.

In another embodiment, the amount of beta-glucosidase in an enzyme composition of the present invention is 0% to 30% of the total protein of the enzyme composition, e.g., 1% to 27.5%, 1.5% to 25%, 2% to 22.5%, 3% to 20%, 4% to 19%, % 4.5 to 18%, 5% to 17%, and 6% to 16% of the total protein of the enzyme composition.

In another embodiment, the amount of AA9 polypeptide in an enzyme composition of the present invention is 0% to 50% of the total protein of the enzyme composition, e.g., 2.5% to 45%, 5% to 40%, 7.5% to 35%, 10% to 30%, 12.5% to 25%, and 15% to 25% of the total protein of the enzyme composition.

In another embodiment, the amount of xylanase in an enzyme composition of the present invention is 0% to 30% of the total protein of the enzyme composition, e.g., 0.5% to 30%, 1.0% to 27.5%, 1.5% to 25%, 2% to 22.5%, 2.5% to 20%, 3% to 19%, 3.5% to 18%, and 4% to 17% of the total protein of the enzyme composition.

In another embodiment, the amount of beta-xylosidase in an enzyme composition of the present invention is 0% to 50% of the total protein of the enzyme composition, e.g., 0.5% to 30%, 1.0% to 27.5%, 1.5% to 25%, 2% to 22.5%, 2.5% to 20%, 3% to 19%, 3.5% to 18%, and 4% to 17% of the total protein of the enzyme composition.

In another embodiment, the amount of endoglucanase I in an enzyme composition of the present invention is 0.5% to 30% of the total protein of the enzyme composition, e.g., 1.0% to 25%, 2% to 20%, 4% to 25%, 5% to 20%, 16% to 15%, and 7% to 12% of the total protein of the enzyme composition.

In another embodiment, the amount of endoglucanase II in an enzyme composition of the present invention is 0.5% to 30% of the total protein of the enzyme composition, e.g., 1.0% to 25%, 2% to 20%, 4% to 25%, 5% to 20%, 16% to 15%, and 7% to 12% of the total protein of the enzyme composition.

As mentioned above the cellulolytic composition may comprise a number of different polypeptides, such as enzymes.

In an embodiment, the cellulolytic composition comprises a *Trichoderma reesei* cellulase preparation containing *Aspergillus oryzae* beta-glucosidase fusion protein (WO 2008/057637) and *Thermoascus aurantiacus* GH61A polypeptide (WO 2005/074656).

In an embodiment, the cellulolytic composition comprises a blend of an *Aspergillus aculeatus* GH10 xylanase (WO 94/021785) and a *Trichoderma reesei* cellulase preparation containing *Aspergillus fumigatus* beta-glucosidase (WO 2005/047499) and *Thermoascus aurantiacus* GH61A polypeptide (WO 2005/074656).

In an embodiment, the cellulolytic composition comprises a blend of an *Aspergillus fumigatus* GH10 xylanase (WO 2006/078256) and *Aspergillus fumigatus* beta-xylosidase (WO 2011/057140) with a *Trichoderma reesei* cellulase preparation containing *Aspergillus fumigatus* cellobiohydrolase I (WO 2011/057140), *Aspergillus fumigatus* cellobiohydrolase II (WO 2011/057140), *Aspergillus fumigatus* beta-glucosidase variant (WO 2012/044915), and *Penicillium* sp. (*emersonii*) GH61 polypeptide (WO 2011/041397).

In an embodiment the cellulolytic composition comprises a *Trichoderma reesei* cellulolytic enzyme composition, further comprising *Thermoascus aurantiacus* GH61A polypeptide having cellulolytic enhancing activity (WO 2005/074656) and *Aspergillus oryzae* beta-glucosidase fusion protein (WO 2008/057637).

In another embodiment the cellulolytic composition comprises a *Trichoderma reesei* cellulolytic enzyme composition, further comprising *Thermoascus aurantiacus* GH61A polypeptide having cellulolytic enhancing activity (Sequence Number 2 in WO 2005/074656) and *Aspergillus fumigatus* beta-glucosidase (Sequence Number 2 of WO 2005/047499).

In another embodiment the cellulolytic composition comprises a *Trichoderma reesei* cellulolytic enzyme composition, further comprising *Penicillium emersonii* GH61A polypeptide having cellulolytic enhancing activity disclosed in WO 2011/041397, *Aspergillus fumigatus* beta-glucosidase (Sequence Number 2 of WO 2005/047499) or a variant thereof with the following substitutions: F100D, S283G, N456E, F512Y.

In an embodiment, the cellulolytic composition comprises *Aspergillus aculeatus* Family 10 xylanase and cellulolytic composition derived from *Trichoderma reesei* RutC30.

In an embodiment, the cellulolytic composition comprises *Aspergillus aculeatus* Family 10 xylanase.

In an embodiment, the cellulolytic composition is derived from *Trichoderma reesei* RutC30.

In an embodiment, the cellulolytic composition comprises a blend of a *Trichophaea saccata* GH10 xylanase (WO 2011/057083) and *Talaromyces emersonii* beta-xylosidase with a *Trichoderma reesei* cellulase preparation containing *Aspergillus fumigatus* cellobiohydrolase I (WO 2011/057140), *Aspergillus fumigatus* cellobiohydrolase II (WO 2011/057140), *Aspergillus fumigatus* beta-glucosidase variant (WO 2012/044915), and *Penicillium* sp. (*emersonii*) GH61 polypeptide (WO 2011/041397).

In an embodiment, the cellulolytic composition comprises a *Trichoderma reesei* cellulase preparation containing *Trichophaea saccata* GH10 xylanase (WO 2011/057083) and *Talaromyces emersonii* beta-xylosidase.

In an embodiment, the celluloytic composition comprises a *Talaromyces leycettanus* GH10 xylanase (WO 2013/019827).

In an embodiment, the cellulolytic composition comprises a *Trichophaea saccata* GH10 xylanase (WO 2011/057083).

In an embodiment, the celluloytic composition is as described in PCT/US2015/034179.

The enzyme composition of the present invention may be in any form suitable for use, such as, for example, a crude fermentation broth with or without cells removed, a cell lysate with or without cellular debris, a semi-purified or purified enzyme composition, or a host cell, e.g., *Trichoderma* host cell, as a source of the enzymes.

The enzyme composition may be a dry powder or granulate, a non-dusting granulate, a liquid, a stabilized liquid, or a stabilized protected enzyme. Liquid enzyme compositions may, for instance, be stabilized by adding stabilizers such as a sugar, a sugar alcohol or another polyol, and/or lactic acid or another organic acid according to established processes.

According to the invention an effective amount of one or more of the following activities may also be present or added during treatment of the kernels: acetylxylan esterase, pentosanase, pectinase, arabinanase, arabinofurasidase, xyloglucanase, phytase activity.

It is believed that after the division of the kernels into finer particles the enzyme(s) can act more directly and thus more efficiently on cell wall and protein matrix of the kernels. Thereby the starch is washed out more easily in the subsequent steps.

Enzymatic Amount

Enzymes may be added in an effective amount, which can be adjusted according to the practitioner and particular process needs. In general, enzyme may be present in an amount of 0.0001-1 mg enzyme protein per g dry solids (DS) kernels, such as 0.001-0.1 mg enzyme protein per g DS kernels. In particular embodiments, the enzyme may be present in an amount of, e.g., 1 µg, 2.5 µg, 5 µg, 10 µg, 20 µg, 25 µg, 30 µg, 35 µg, 40 µg, 45 µg, 50 µg, 75 µg, 100 µg, 125 µg, 150 µg, 175 µg, 200 µg, 225 µg, 250 µg, 275 µg, 300 µg, 325 µg, 350 µg, 375 µg, 400 µg, 450 µg, 500 µg, 550 µg, 600 µg, 650 µg, 700 µg, 750 µg, 800 µg, 850 µg, 900 µg, 950 µg, 1000 µg enzyme protein per g DS kernels.

The present invention is further described by the following examples that should not be construed as limiting the scope of the invention.

EXAMPLES

Materials and Methods
Enzymes

GH62 Arabinofuranosidase A: GH62 arabinofuranosidase from *Penicillium capsulatum* (WO 2006/125438).

GH62 Arabinofuranosidase B: GH62 arabinofuranosidase from *Penicillium oxalicum* (SEQ ID NO: 24).

GH62 Arabinofuranosidase C: GH62 arabinofuranosidase from *Talaromyces pinophilus* (SEQ ID NO: 27).

GH62 Arabinofuranosidase D: GH62 arabinofuranosidase derived from *Aspergillus niger* (SEQ ID NO: 117).

GH62 Arabinofuranosidase E: GH62 arabinofuranosidase derived from *Aspergillus niger* (SEQ ID NO: 118).

Enzymes having arabinofuranosidase activity are useful alone or in combination with, e.g., any of Celluclast, Cellulase A, Cellulase B, Cellulase C, Cellulase D, Cellulase E, Cellulase F, Cellulase G, Cellulase H, Cellulase J, Cellulase K, Cellulase L, Cellulase M, GH10 Xylanase A, Protease A, Protease B, Protease C and/or Protease D.

Celluclast: Cellulase derived from Celluclast 1.5 L, commercial product available in Novozymes A/S.

Cellulase A: A blend of an *Aspergillus aculeatus* GH10 xylanase (WO 94/021785) and a *Trichoderma reesei* cellulase preparation containing *Aspergillus fumigatus* beta-glucosidase (WO 2005/047499) and *Thermoascus aurantiacus* GH61A polypeptide (WO 2005/074656).

Cellulase B: A *Trichoderma reesei* cellulase preparation containing *Aspergillus oryzae* beta-glucosidase fusion protein (WO 2008/057637) and *Thermoascus aurantiacus* GH61A polypeptide (WO 2005/074656).

Cellulase C: A blend of an *Aspergillus fumigatus* GH10 xylanase (WO 2006/078256) and *Aspergillus fumigatus* beta-xylosidase (WO 2011/057140) with a *Trichoderma reesei* cellulase preparation containing *Aspergillus fumigatus* cellobiohydrolase I (WO 2011/057140), *Aspergillus fumigatus* cellobiohydrolase II (WO 2011/057140), *Aspergillus fumigatus* beta-glucosidase variant (WO 2012/044915), and *Penicillium* sp. (*emersonii*) GH61 polypeptide (WO 2011/041397).

Cellulase D: *Aspergillus aculeatus* GH10 xylanase (WO 94/21785).

Cellulase E: A *Trichoderma reesei* cellulase preparation containing *Aspergillus aculeatus* GH10 xylanase (WO 94/21785).

Cellulase F: A *Trichoderma reesei* cellulase preparation containing *Aspergillus fumigatus* GH10 xylanase (WO 2006/078256) and *Aspergillus fumigatus* beta-xylosidase (WO 2011/057140).

Cellulase G: A cellulolytic enzyme composition containing *Aspergillus aculeatus* Family 10 xylanase (WO 94/21785) and cellulolytic enzyme composition derived from *Trichoderma reesei* RutC30.

Cellulase H: A cellulolytic composition derived from *Trichoderma reesei* RutC30.

Cellulase J: A blend of a *Trichophaea saccata* GH10 xylanase (WO 2011/057083) and *Talaromyces emersonii* beta-xylosidase with a *Trichoderma reesei* cellulase preparation containing *Aspergillus fumigatus* cellobiohydrolase I (WO 2011/057140), *Aspergillus fumigatus* cellobiohydrolase II (WO 2011/057140), *Aspergillus fumigatus* beta-glucosidase variant (WO 2012/044915), and *Penicillium* sp. (*emersonii*) GH61 polypeptide (WO 2011/041397).

Cellulase K: A *Trichoderma reesei* cellulase preparation containing *Trichophaea saccata* GH10 xylanase (WO 2011/057083) and *Talaromyces emersonii* beta-xylosidase.

Cellulase L: A *Trichoderma reesei* cellulase preparation containing a GH10 xylanase of SEQ ID NO: 104.

Cellulase M: A *Trichoderma reesei* cellulase preparation containing a GH10 xylanase of SEQ ID NO: 106.

Cellulase N: A *Trichoderma reesei* cellulase preparation containing a cellobiohydrolase I of SEQ ID NO: 96, a cellobiohydrolase II of SEQ ID NO: 98, a GH10 xylanase of SEQ ID NO: 104, and a beta-xylosidase of SEQ ID NO: 108.

Cellulase P: A *Trichoderma reesei* cellulase preparation containing a cellobiohydrolase I of SEQ ID NO: 96, a cellobiohydrolase II of SEQ ID NO: 98, a beta-glucosidase variant of SEQ ID NO: 100, and a AA9 (GH61) of SEQ ID NO: 102.

Cellulase Q: A *Trichoderma reesei* cellulase preparation containing a cellobiohydrolase I of SEQ ID NO: 96, a cellobiohydrolase II of SEQ ID NO: 98, and a AA9 (GH61) of SEQ ID NO: 102.

GH10 Xylanase A: GH10 xylanase derived from *Aspergillus niger* (SEQ ID NO: 119).

Protease I: Acidic protease from *Aspergillus aculeatus*, CBS 101.43 disclosed in WO 95/02044.

Protease A: *Aspergillus oryzae* aspergillopepsin A, disclosed in Gene 125(2): 195-198 (30 Mar. 1993).

Protease B: A metalloprotease from *Thermoascus aurantiacus* (AP025) having the mature acid sequence shown as amino acids 1-177 SEQ ID NO: 2 in WO 2003/048353.

Protease C: *Rhizomucor miehei* derived aspartic endopeptidase produced in *Aspergillus oryzae* (Novoren™) available from Novozymes A/S, Denmark.

Protease D: S53 protease 3 from *Meripilus giganteus* disclosed in WO 2014/037438 (SEQ ID NO: 6).

Methods

Determination of protease HUT activity:

1 HUT is the amount of enzyme which, at 40° C. and pH 4.7 over 30 minutes forms a hydrolysate from digesting denatured hemoglobin equivalent in absorbancy at 275 nm to a solution of 1.10 µg/ml tyrosine in 0.006 N HCl which absorbancy is 0.0084. The denatured hemoglobin substrate is digested by the enzyme in a 0.5 M acetate buffer at the given conditions. Undigested hemoglobin is precipitated with trichloroacetic acid and the absorbance at 275 nm is measured of the hydrolysate in the supernatant.

Xylose Assay

A xylose standard curve from 0 to 125 µg xylose/mL was prepared from a stock solution of 2.5 mg xylose/mL (prepared by dissolving 0.125 g xylose in 50 mL de-ionised water). Assay principle. The interconversion of the α- and β-anomeric forms of D-xylose is catalysed by xylose mutarotase (XMR) using the D-xylose assay kit from Megazyme International Ireland. The ß-D-xylose is oxidised by NAD+ to D-xylonic acid in the presence of ß-xylose dehydrogenase (ß-XDH) at pH 7.5. The amount of NADH formed in this reaction is stoichiometric with the amount of D-xylose and is measured by the increase in absorbance at 340 nm.

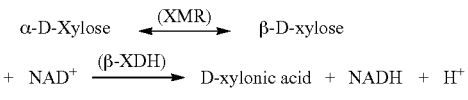

Example 1

The 10-g fiber assay generally includes incubating wet fiber samples obtained from wet-milling plant, in the presence of enzymes, at conditions relevant to the process (pH 3.5 to 4, temperature around 52° C.) and over a time period of between 1 to 4 hours. After incubation the fiber is transferred and pressed over a screen (typically 100 microns or smaller), where the filtrates consisting mainly of the separated starch and gluten are then collected. A number of washes are done over the screen, and the washings are collected together with the initial filtrate. The collected filtrates are then passed over a funnel filter (glass filter with 0.45 micron opening) to further separate the insoluble solids (starch and gluten) from the rest of the filtrates (mostly dissolved solids). These retained insoluble solids are washed and then oven dried to dryness. The insoluble dry mass is weighed and then analyzed for starch content.

10-g fiber assay is performed at pH 3.8, incubating at 52° C. for 1 hour at dose of 30 ug EP/g corn. Blends of GH62 Arabinofuranosidase B+Cellulase L, GH62 Arabinofuranosidase B+Cellulase M, GH62 Arabinofuranosidase C+Cellulase L, and GH62 Arabinofuranosidase C+Cellulase M are utilized. Release of starch+gluten (dry substance) from corn fiber at dose of 30 ug/g corn is measured.

More particularly according to an exemplary 10-g fiber assay, the below equipment and reagents are used to analyze pressed corn fiber sample (sourced from wet-milling plant), which is stored frozen and thawed prior to use, according to the steps in the table:

150 µm Opening Sieves and Catch pan (Retsch GmbH)
250 ml Erlenmeyer Flask with caps
150 ml Bottles
Glass Micro filter Paper (Whatman 150 mm-Diameter)
Vacuum Filtration apparatus
Small aluminum pans
2000 ml plastic beaker
600 ml glass beaker
Funnel
Moisture analyzer
Glass vials and caps for HPLC system
HPLC system
0.45 µm pore size polypropylene syringe filters (Whatman)
3 ml plastic syringes
Oven (Capable to heat to 105° C.)
Ice bath
Analytical balance
Rubber Spatula
0.4 M HCl
1 M Sodium Acetate buffer (pH 4)
1 M Acetic Acid
1 M pH 7 Sodium Acetate

| Step | Action |
|---|---|
| 1 | Determine moisture of~1 g corn fiber using the Moisture balance Collect the DS% |
| 2 | Weigh out items and record initial weights of Flasks, Bottles, Small Aluminum pans, Glass Micro Filter paper |
| 3 | Determine the amount of fiber that needs to be weighed out for each replicate to obtain a dry solids of 5 grams |
| 4 | After adding the fiber into the flask, store them into the cold room until ready for use Fiber can last about 2-3 days in the cold room |
| 6 | Add 98 ml of water to each flask of fiber to achieve desired % DS |
| 7 | Add 2 ml of buffer (1M pH 4.0 Sodium Acetate) to adjust pH to 4.0 (the final buffer concentration is 0.02M) |
| 8 | Add enzyme into the flask |
| 9 | Place flask into Incubator (New Brunswick Scientific/Innova 42) and set at 150 RPM @50° C. for 4 hours |
| 10 | After the incubation place the flask into ice bath to slow enzyme activity Let flask sit in the ice bath for a minimum of 5 minutes |
| 11 | For each sample flask, pour out the content onto the 150 µm sieve with catch pan below |
| 12 | Measure about~200 ml of tap water into a beaker and pour into the flask to rinse any remaining fiber, then pour the rinse water back into the beaker |
| 13 | Using the spatula, press the fiber against the screen to release water and insolubles into the catching pan. |
| 14 | Once a majority of the water has been pressed out, place the fiber back in the beaker containing the 200 ml of rinse water in Step 12 |
| 15 | Stir the fiber in the beaker with the spatula, then pour onto the 150 µm sieve Considered 1$^{st}$ Wash |
| 16 | Measure out~200 ml of water into the rinse beaker |
| 17 | Press the fiber again with spatula until majority of water has been pressed out, then dump fiber back into the rinse beaker |
| 18 | Remove the sieve pan and pour the liquid from the catching pan into 1 Liter Plastic Bottle Give a gentle swirl to the pan before pouring to get the sediments to go into the bottle |
| 19 | Repeat Steps 15 to 18 two more times (for a total of 3 wash steps) At the end of the 3$^{rd}$ wash, the fiber may be discarded unless saved for additional analysis. |
| 20 | Take the 1 L bottles containing the sieve-throughs to the Manifold Vacuum Filtration setup |
| 25 | After rinsing the filter funnels with tap water, place the preweighed glass filter paper into the funnel and spray DI water to keep filter in place |
| 27 | Turn on the vacuum, then pour the entire bottle content gradually into the funnel |
| 28 | As the samples are filtering, fill the emptied bottle with~200 ml of DI water and pour into the filter with the rest of sample Turn the Vacuum off once the solution is filter through then add the DI water to the funnel and turn the Vacuum back on |
| 29 | Once the solution is finish before the filter dry out Turn off the vacuum and pour the water into the funnel and turn the vacuum back on |
| 30 | This is removing the remaining solvents in the bottle and also rinsing the filter keeping the insoluble |

| Step | Action |
|---|---|
| 32 | To remove the filters use a metal spatula to lift the edge of filters up and to scrape any remaining insolubles off the sides. |
| 33 | Take the filter and fold twice and place them into the pre-weighed pan |
| 34 | Remember to weigh the pan now with the Filter paper |
| 35 | Place the pan into the 105° C. oven overnight to dry |
| 36 | Weigh out the pan with the dry filtered matter. This weight is used to calculate insoluble solids yield. |
| 37 | Remove the filter from the pan taking care that no filtered solids are lost, then cut each into strips and further into small squares to go into the glass bottle Make sure that you cut the filters into smaller pieces so that they can be remove once finish |
| 38 | Measure out 50 ml of 0.4M of HCL into each bottle Let the filter paper sit in the solution for at least 2 hours; No more than 24 hours |
| 39 | Place into the autoclave for Residual Starch procedure Autoclave needs to be set @230° F. for 80 minutes |
| 40 | Once autoclave is done let the bottle cool down before touching |
| 41 | Filter the solution into HPLC vials and send them off to be analyzed for glucose. |

NOTE:
The glucose concentrations are used to calculate the amount of starch in the insoluble solids

Example 2

10-g fiber assay is performed at pH 4.0, incubating at 52° C. for 4 hours at doses of 35 ug EP/g corn, using a blend of Cellulase K, Cellulase L, or Cellulase N, in further combination with Protease D and GH62 Arabinofuranosidase C. Blend consists of 10% (w/w) Protease D, 10% (w/w) of GH62 Arabinofuranosidase C, and the remaining 80% (w/w) from Cellulase K/Cellulase L/Cellulase N. For comparison, a blend containing Cellulase K and GH62 Arabinofuranosidase C only (no GH62) was included. Release of starch+gluten (dry substance) from corn fiber at the specified doses below was measured.

| Treatments | Dose (ug enzyme protein/g corn) | Starch + Gluten Recovered |
|---|---|---|
| No Enzyme | 0 | 15.1% |
| Cellulase K + Protease D | 35 | 18.7% |
| Cellulase K + Protease D | 70 | 19.4% |
| Cellulase K + Protease D + GH62 Arabinofuranosidase C | 35 | 20.8% |
| Cellulase N + Protease D + GH62 Arabinofuranosidase C | 35 | 20.4% |
| Cellulase L + Protease D + GH62 Arabinofuranosidase C | 35 | 20.6% |

Example 3

10-g fiber assay is performed at pH 4.0, incubating at 52° C. for 4 hours at doses of 35 ug EP/g corn or 50 ug EP/g corn or 70 ug EP/g corn, using a blend of either Cellulase L or Cellulase N, in combination with Protease D and GH62 Arabinofuranosidase B. Blend consists of 10% (w/w) Protease D, 10% (w/w) of GH62 Arabinofuranosidase B, and the remaining 80% (w/w) from either Cellulase L or Cellulase N. For comparison, a blend containing no GH62 was included. Release of starch+gluten (dry substance) from corn fiber at the specified doses below was measured.

| Treatments | Dose (ug enzyme protein/g corn) | Starch + Gluten Recovered |
|---|---|---|
| Cellulase N + Protease D | 70 | 21.9% |
| Cellulase N + Protease D + GH62 Arabinofuranosidase B | 35 | 20.9% |
| Cellulase N + Protease D + GH62 Arabinofuranosidase B | 50 | 22.0% |
| Cellulase N + Protease D + GH62 Arabinofuranosidase B | 70 | 24.9% |
| Cellulase L + Protease D + GH62 Arabinofuranosidase B | 35 | 20.9% |
| Cellulase L + Protease D + GH62 Arabinofuranosidase B | 50 | 23.2% |

Example 4

The 10-g fiber assay generally includes incubating wet fiber samples obtained from wet-milling plant, in the presence of enzymes, at conditions relevant to the process (pH 3.5 to 4, Temp around 52° C.) and over a time period of between 1 to 4 hours. After incubation the fiber is transferred and pressed over a screen (typically 100 microns or smaller), where the filtrates consisting mainly of the separated starch and gluten are then collected. A number of washes are done over the screen, and the washings are collected together with the initial filtrate. The collected filtrates are then passed over a funnel filter (glass filter with 0.45 micron opening) to further separate the insoluble solids (starch and gluten) from the rest of the filtrates (mostly dissolved solids). These retained insoluble solids are washed and then oven dried to dryness. The insoluble dry mass is weighed and then analyzed for starch content.

10-g fiber assay is performed at pH 4.0, incubating at 52° C. for 4 hours at a dose of 35 ug EP/g corn, using a blend of Cellulase N, with or without inclusion of GH62 Arabinofuranosidase B, and with or without Protease D. Blend consists of 10% (w/w) Protease D when included, 10% (w/w) of GH62 Arabinofuranosidase B when included, and the remaining amount (80, 90 or 100% (w/w)) of Cellulase N. Release of starch+gluten (dry substance) from corn fiber was measured.

| Treatments | Starch + Gluten Recovered |
|---|---|
| No Enzyme | 9.81% |
| Cellulase N | 13.3% |

-continued

| Treatments | Starch + Gluten Recovered |
|---|---|
| Cellulase N + Protease D | 13.5% |
| Cellulase N + GH62 Arabinofuranosidase B | 20.5% |
| Cellulase N + Protease D + GH62 Arabinofuranosidase B | 19.2% |

Example 5

10-g fiber assay is performed at pH 3.8, incubating at 52° C. for 1 hour at dose of 35 ug EP/g corn, using a blend including Celluclast and GH10 Xylanase A, in combination with either GH62 Arabinofuranosidase D or GH62 Arabinofuranosidase E. Blend consists of 5% (w/w) GH62 Arabinofuranosidase D or GH62 Arabinofuranosidase E, 15% (w/w) of GH10 Xylanase A, and the remaining 80% (w/w) from Celluclast. For comparison, blend containing Celluclast and GH10 Xylanase D only (no GH62) was included. Release of starch+gluten (dry substance) from corn fiber at the specified doses below was measured.

| Treatments | Dose (ug enzyme protein/g corn) | Starch + Gluten Recovered |
|---|---|---|
| No Enzyme | 0 | 6.55% |
| Celluclast + GH10 Xylanase A | 35 | 8.90% |
| Celluclast + GH10 Xylanase A | 33.25 | 8.90% |
| Celluclast + GH10 Xylanase A + GH62 Arabinofuranosidase D | 35 | 10.57% |
| Celluclast + GH10 Xylanase A + GH62 Arabinofuranosidase E | 35 | 10.73% |

Therefore, the addition of GH62 Arabinofuranosidase D and GH62 Arabinofuranosidase E on top of Celluclast+GH10 Xylanase A can significantly increase the yield of starch+gluten in corn wet-milling process.

Example 6

A full-scale industrial trial was conducted in a wet-mill facility milling 1400 MT of corn per day. The trial was conducted over a span of months, which can be roughly divided into a pre-enzyme baseline (Baseline 1), Blend 1 phase, post-Blend 1 baseline (Baseline 2), and Blend 2 phase. The enzymes that were tested and the relevant dose used are given in Table 1 below. The enzymes were directly added into the fiber washing stage, after the 3rd grind step.

TABLE 1

| Enzyme Blend | Enzyme | Dose (kg prod/MT corn) | Total enzyme protein (mg protein/kg corn) |
|---|---|---|---|
| 1 | Cellulase F | 0.5 | 105 |
| 2 | A Trichoderma reesei cellulase preparation containing a GH10 xylanase of SEQ ID NO: 104 and a GH62 arabinofuranosidase of SEQ ID NO: 27 | 0.1 | 24 |

The main difference in composition between the two enzyme blends used in the trial was the addition of a GH62 arabinofuranosidase, and the source organism of the xylanase (Family GH10) used differed between these two blends.

Table 1 shows the difference in dose between these blends during the trial. Blend 1 was dosed four-folds higher in total enzyme proteins compared with Blend 2. Tables 2 and 3 below show the effect of enzyme addition in the process compared with their baselines, both in terms of fiber composition and the actual yields realized. These yield numbers and fiber composition were averaged over a two weeks' worth data where the conditions were relatively stable, and the overall residence time in the fiber wash was consistently around 80-90 minutes.

The combination of 4× lower dose and better performance of Blend 2 as judged from the higher reduction in starch in fiber (10 versus 6 percentage points difference) strongly points to the boosting effect of the GH62 in the blend. Both showed about the same reduction in protein and moisture in the fiber. As for realized yields, the better performance of Blend 2 is again shown by the higher starch yields realized (a difference of about 1 percentage points in starch yield). Gluten reduction between these enzymes was about the same (0.2 to 0.3 percentage points difference from baseline, with Blend 2 probably slightly better). This was shown as well when normalized to the protein content of the incoming corn (total recovery seems slightly better with Blend 2.

TABLE 2

Fiber Composition

| Fiber Stream Composition | Baseline 1 | Blend 1 | Baseline 2 (Post-Blend 1) | Blend 2 |
|---|---|---|---|---|
| Total starch (%) | 25.85 | 19.25 | 25.5 | 15.5 |
| Protein (%) | 11.44 | 10.35 | 11.2 | 10.7 |
| Moisture (%) | 61.5 | 56.95 | 62.2 | 57.3 |

TABLE 3

Realized Yields/Energy Reduction

| Plant Metrics | Baseline | Blend 1 | Blend 2 |
|---|---|---|---|
| Starch Yield (%) | 70.3 | 70.9 | 72.1 |
| Gluten Yield (%) | 4.9 | 5.1 | 5.2 |
| Total Recovery Protein | 39% | 41% | 42% |
| Fiber dryer energy use (KWh/tn fiber) | 824 | 700 | 620 |

What is claimed is:

1. A process for treating crop kernels, comprising:
   a) soaking kernels in water to produce soaked kernels;
   b) grinding the soaked kernels to form ground kernels;
   c) separating the germ from the ground kernels to produce a slurry comprising fiber, starch and protein; and
   d) treating the slurry in a fiber washing step to separate fiber from the starch and protein in the presence of an effective amount of a polypeptide having arabinofuranosidase activity, wherein the polypeptide having arabinofuranosidase activity comprises an amino acid sequence having at least 80% sequence identity to SEQ ID NO: 27.

2. The process of claim 1, wherein step d) further comprises treating the slurry in the presence of a protease.

3. The process of claim 1, wherein step d) further comprises treating the slurry in the presence of a cellulolytic enzyme.

4. The process of claim 1, wherein step d) further comprises treating the slurry in the presence of an enzyme selected from the group consisting of an endoglucanase, a xylanase, a cellobiohydrolase I, a cellobiohydrolase II, a GH61, or a combination thereof.

5. The process of claim 1, wherein the kernels are soaked in water for about 2-10 hours.

6. The process of claim 1, wherein the soaking is carried out at a temperature between about 40° C. and about 60° C.

7. The process of claim 1, wherein the soaking is carried out at an acidic pH.

8. The process of claim 1, wherein the soaking is performed in the presence of between 0.01-1% $SO_2$ and/or $NaHSO_3$.

9. The process of claim 1, wherein the crop kernels are from corn (maize), rice, barley, sorghum bean, or fruit hulls, or wheat.

10. The process of claim 1, wherein step d) further comprises treating the slurry in the presence of a GH10 xylanase or a GH11 xylanase.

11. The process of claim 10, wherein the GH10 xylanase is a *Talaromyces, Trichophaea,* or *Aspergillus* GH10 xylanase.

12. The process of claim 1, further treating the slurry in the presence of a GH10 xylanase, an endoglucanase, a cellobiohydrolase I, a cellobiohydrolase II, and a GH61.

13. The process of claim 1, further comprising separating the starch from the protein.

14. The process of claim 13, further comprising washing the starch to produce a pure starch.

15. The process of claim 14, further comprising converting the starch to syrup or alcohol.

16. The process of claim 1, wherein the polypeptide having arabinofuranosidase activity comprises an amino acid sequence having at least 85% sequence identity to SEQ ID NO: 27.

17. The process of claim 1, wherein the polypeptide having arabinofuranosidase activity comprises an amino acid sequence having at least 90% sequence identity to SEQ ID NO: 27.

18. The process of claim 1, wherein the polypeptide having arabinofuranosidase activity comprises an amino acid sequence having at least 95% sequence identity to SEQ ID NO: 27.

19. The process of claim 1, wherein the polypeptide having arabinofuranosidase activity comprises an amino acid sequence having at least 99% sequence identity to SEQ ID NO: 27.

20. The process of claim 1, wherein the polypeptide having arabinofuranosidase activity comprises the amino acid sequence of SEQ ID NO: 27.

* * * * *

SEQUENCE LISTING

Sequence total quantity: 119
SEQ ID NO: 1        moltype = AA  length = 9

```
                        FEATURE           Location/Qualifiers
                        REGION            1..9
                                          note = Conserved motif:
                                          [H/Y][L/M]F[F/S][A/C/H/S/T/V][A/D/G/N/R]D[D/E/N]G
                        SITE              1
                                          note = misc_feature - The amino acid in position 1 of the
                                          conserved motif can be histidine (His, H) or tyrosine
                                          (Tyr, Y).
                        SITE              2
                                          note = misc_feature - The amino acid in position 2 of the
                                          conserved motif is either leucine (Leu, L) or methionine
                                          (Met, M).
                        SITE              4
                                          note = misc_feature - The amino acid in position 4 of the
                                          conserved motif is either phenylalanine (Phy, F) or serine
                                          (Ser, S).
                        SITE              5
                                          note = misc_feature - The amino acid in position 5 of the
                                          conserved motif is either alanine (Ala, A), cysteine (Cys,
                                          C), histidine (His, H), serine (Ser, S), threonine (Thr,
                                          T) or valine (Val, V).
                        SITE              6
                                          note = misc_feature - The amino acid in position 6 of the
                                          conserved motif is either alanine (Ala, A), aspartic acid
                                          (Asp, D), glycine (Gly, G), asparagine (Asn, N) or
                                          arginine (Arg, R).
                        SITE              8
                                          note = misc_feature - The amino acid in position 8 of the
                                          conserved motif is either aspartic acid (Asp, D), glutamic
                                          acid (Glu, E) or asparagine (Asn, N).
                        source            1..9
                                          mol_type = protein
                                          organism = synthetic construct
SEQUENCE: 1
HXFXXXDXG                                                                                         9

SEQ ID NO: 2            moltype = AA   length = 9
FEATURE                 Location/Qualifiers
REGION                  1..9
                        note = Conserved motif: [H/Y]LF[F/S][A/S/V][A/D/G]DNG
SITE                    1
                        note = misc_feature - The amino acid in position 1 of the
                        conserved motif is either histidine (His, H) or tyrosine
                        (Tyr, Y).
SITE                    4
                        note = misc_feature - The amino acid in position 4 of the
                        conserved motif is either phenylalanine (Phy, F) or serine
                        (Ser, S).
SITE                    5
                        note = misc_feature - The amino acid in position 5 of the
                        conserved motif is either Alanine (Ala, A), Serine (Ser,
                        S) or Valine (Val, V).
SITE                    6
                        note = misc_feature - The amino acid in position 6 of the
                        conserved motif is either Alanine (Ala, A), aspartic acid
                        (Asp, D) or Glycine (Gly, G).
source                  1..9
                        mol_type = protein
                        organism = synthetic construct
SEQUENCE: 2
XLFXXXDNG                                                                                         9

SEQ ID NO: 3            moltype = AA   length = 9
FEATURE                 Location/Qualifiers
REGION                  1..9
                        note = Conserved motif: YLFF[A/V][A/G]DNG
SITE                    5
                        note = misc_feature - The amino acid in position 5 of the
                        conserved motif is either Alanine (Ala, A) or Valine (Val,
                        V).
SITE                    6
                        note = misc_feature - The amino acid in position 6 of the
                        conserved motif is either Alanine (Ala, A) or Glycine
                        (Gly, G).
source                  1..9
                        mol_type = protein
                        organism = synthetic construct
SEQUENCE: 3
YLFFXXDNG                                                                                         9
```

```
SEQ ID NO: 4              moltype = AA   length = 9
FEATURE                   Location/Qualifiers
REGION                    1..9
                          note = Conserved motif: YLFFAGDNG
source                    1..9
                          mol_type = protein
                          organism = synthetic construct
SEQUENCE: 4
YLFFAGDNG                                                                   9

SEQ ID NO: 5              moltype = AA   length = 9
FEATURE                   Location/Qualifiers
REGION                    1..9
                          note = Conserved motif: [H/Y]LFSSDDNG
SITE                      1
                          note = misc_feature - The amino acid in position 1 of the
                           conserved motif is either histidine (His, H) or tyrosine
                           (Tyr, Y).
source                    1..9
                          mol_type = protein
                          organism = synthetic construct
SEQUENCE: 5
XLFSSDDNG                                                                   9

SEQ ID NO: 6              moltype = AA   length = 9
FEATURE                   Location/Qualifiers
REGION                    1..9
                          note = Conserved motif: YLFSSDDNG
source                    1..9
                          mol_type = protein
                          organism = synthetic construct
SEQUENCE: 6
YLFSSDDNG                                                                   9

SEQ ID NO: 7              moltype = DNA   length = 987
FEATURE                   Location/Qualifiers
sig_peptide               1..78
mat_peptide               79..984
source                    1..987
                          mol_type = other DNA
                          organism = Penicillium capsulatum
CDS                       1..984
SEQUENCE: 7
atgagattct tccaagcgaa agctggcctg atatcatcag ggataacttt gctcgcgtca          60
gtgccagtag tcatcgccaa ttgcgccctt ccatcgacat atagctggac atcaactagc        120
gctttagcga atcccaagcc cgggtggaca gcaatgcaag attttaccaa tgtggtcttc        180
aataacaggc atgtcgtcta tgcatctacc accgacacag gtgggaacta cggcgcaatg        240
agcttcggtg tctttcggtt ttggcctggc atggcatctg cgagccaaaa cgcattgagc        300
tttgcagccg tcgcacccac cttgttctac tttcagccaa aagtatatg ggttctggcc         360
tatcaatggg gctctagcac gtttacctac cgaacatgca gtgatcccac caatgcctat        420
ggatggtcat cggagcaagc cctttttctct gggaaagtta ccggctcgag cactggcgcc       480
attgatcaga cacttatcgg tgacgccacg catatgtatc ttttctttgc cggagacaat        540
ggcaaaatat atcgctctag catgcccatc agcaatttcc ctggaaactt ggaacagtg         600
tcagaggtgg tactaagtga cactcagaat aatctatttg aggcggtcca agtgtacact        660
gtgaaaggtc aaaaccagta cctgatgatc gttgaggcaa ttggatcaga agggcggtat        720
ttccgttcat tcactgccag cagtcttggt ggtttgtgga ctgcccaggc agcaagcgag        780
actaagccct tgctggtaa agccaatagc ggtgcaacct ggaccaacga catcagtcac         840
ggcgatttgg ttcgttccaa ccctgaccaa acaatgacga tcgatccatg caacctgcaa        900
ttcctctacc agggacgaaa tcctggcgca agtggcaact acaataccct tccgtggagg        960
ccgggtgtgc tcactttgaa taattaa                                            987

SEQ ID NO: 8              moltype = AA   length = 328
FEATURE                   Location/Qualifiers
source                    1..328
                          mol_type = protein
                          organism = Penicillium capsulatum
SEQUENCE: 8
MRFFQAKAGL ISSGITLLAS VPVVIANCAL PSTYSWTSTS ALANPKPGWT AIKDFTNVVF          60
NNRHVVYAST TDTSGNYGAM SFGVFSDWPG MASASQNALS FAAVAPTLFY FQPKSIWVLA        120
YQWGSSTFTY RTSSDPTNAY GWSSEQALFS GKVTGSSTGA IDQTLIGDAT HMYLFFAGDN        180
GKIYRSSMPI SNFPGNFGTV SEVVLSDTQN NLFEAVQVYT VKGQNQYLMI VEAIGSEGRY        240
FRSFTASSLG GLWTAQAASE TKPFAGKANS GATWTNDISH GDLVRSNPDQ TMTIDPCNLQ        300
FLYQGRNPGA SGNYNTLPWR PGVLTLNN                                           328

SEQ ID NO: 9              moltype = AA   length = 302
FEATURE                   Location/Qualifiers
source                    1..302
                          mol_type = protein
```

```
                            organism = Penicillium capsulatum
SEQUENCE: 9
NCALPSTYSW   TSTSALANPK   PGWTAIKDFT   NVVFNNRHVV   YASTTDTSGN   YGAMSFGVFS    60
DWPGMASASQ   NALSFAAVAP   TLFYFQPKSI   WVLAYQWGSS   TFTYRTSSDP   TNAYGWSSEQ   120
ALFSGKVTGS   STGAIDQTLI   GDATHMYLFF   AGDNGKIYRS   SMPISNFPGN   FGTVSEVVLS   180
DTQNNLFEAV   QVYTVKGQNQ   YLMIVEAIGS   EGRYFRSFTA   SSLGGLWTAQ   AASETKPFAG   240
KANSGATWTN   DISHGDLVRS   NPDQTMTIDP   CNLQFLYQGR   NPGASGNYNT   LPWRPGVLTL   300
NN                                                                           302

SEQ ID NO: 10           moltype = DNA   length = 990
FEATURE                 Location/Qualifiers
sig_peptide             1..78
mat_peptide             79..987
source                  1..990
                        mol_type = other DNA
                        organism = Penicillium aurantiogriseum
CDS                     1..987
SEQUENCE: 10
atgaaattct ccaaggcaaa agctggcctg gtgtcatctg gcatgctgtt gctcgcatca    60
gtaccagttg ccgtcgccga ctgcgcgctt ccatcaactt atacttggac atcaactggc   120
gctctagcga atccaaagtc cggatggacc gcaatcaagg atttcaccaa cgttgttgtt   180
aacaataagc atctcgtata tgcatcaacc accgacgtca gtgggaacta cggcgcgatg   240
aacttcggtc cctttttcgga ttggtctggc atggcaactg cgagtcaaat caaaacgagc   300
tttaacgctg ttgcgcccac tttgttctac ttccagccaa aggacatttg ggtcatagcc   360
taccaatggg gctcaagcac gtttacctat cgaacatcaa gtgatcctac aatgccaat    420
ggatggtcat cggagcaagc cctttttttcc gggaagatca ccgccccgcc tgctgctatt   480
gatcagaccg ttatcggtga ctctacgcac atgtaccttt tcttcgctgg ggacaatggc   540
aagatctatc gcagcagcat gtctatcgac aagttccctg gaaacttcgg aacaagttcg   600
gaaatagtac tgagtggcgc taggaacgac ctgttcgaag cagttcaagt gtacactgtt   660
aagggtcaga acaagtacct tatgcttgtc gaagcaattg gagcacaagg gcagcggtat   720
ttccgttcat tcgtctccag cagtctcggc ggtaagtggg aaccgcaggc agcaagcgag   780
agcaagccct cgccggaaaa agccaatgtc ggtgcaacct ggaccaagga cttcagtcac   840
ggtgatttgg ttcgaaccaa ccctgaccaa acaatgaccg tcgatccatg caacctgcaa   900
ctcctctacc agggacggga tcccaccgcc accagtagta actacaatac cataccgtgg   960
cagccccgcc ttctcaccct gaagaagtaa                                    990

SEQ ID NO: 11           moltype = AA   length = 329
FEATURE                 Location/Qualifiers
source                  1..329
                        mol_type = protein
                        organism = Penicillium aurantiogriseum
SEQUENCE: 11
MKFSKAKAGL   VSSGMLLLAS   VPVAVADCAL   PSTYTWTSTG   ALANPKSGWT   AIKDFTNVVV    60
NNKHLVYAST   TDASGNYGAM   NFGPFSDWSG   MATASQIKTS   FNAVAPTLFY   FQPKDIWVIA   120
YQWGSSTFTY   RTSSDPTNAN   GWSSEQALFS   GKITAPDAAI   DQTVIGDSTH   MYLFFAGDNG   180
KIYRSSMSID   KFPGNFGTSS   EIVLSGARND   LFEAVQVYTV   KGQNKYLMLV   EAIGAQGQRY   240
FRSFVSSSLG   GKWEPQAASE   SKPFAGKANV   GATWTKDFSH   GDLVRTNPDQ   TMTVDPCNLQ   300
LLYQGRDPTA   TSSNYNTIPW   QPAVLTLKK                                          329

SEQ ID NO: 12           moltype = AA   length = 303
FEATURE                 Location/Qualifiers
source                  1..303
                        mol_type = protein
                        organism = Penicillium aurantiogriseum
SEQUENCE: 12
DCALPSTYTW   TSTGALANPK   SGWTAIKDFT   NVVVNNKHLV   YASTTDASGN   YGAMNFGPFS    60
DWSGMATASQ   IKTSFNAVAP   TLFYFQPKDI   WVIAYQWGSS   TFTYRTSSDP   TNANGWSSEQ   120
ALFSGKITAP   DAAIDQTVIG   DSTHMYLFFA   GDNGKIYRSS   MSIDKFPGNF   GTSSEIVLSG   180
ARNDLFEAVQ   VYTVKGQNKY   LMLVEAIGAQ   GQRYFRSFVS   SSLGGKWEPQ   AASESKPFAG   240
KANVGATWTK   DFSHGDLVRT   NPDQTMTVDP   CNLQLLYQGR   DPTATSSNYN   TIPWQPAVLT   300
LKK                                                                          303

SEQ ID NO: 13           moltype = DNA   length = 1212
FEATURE                 Location/Qualifiers
misc_feature            1..1212
                        note = codon optimised DNA sequence
sig_peptide             1..63
mat_peptide             64..1209
source                  1..1212
                        mol_type = other DNA
                        organism = synthetic construct
CDS                     1..1209
SEQUENCE: 13
atgatcttgt cggcgaagat gctcggagcg attctcttgg agttggccct cacagcagca    60
gcgcagcaga ctctctacgg ccagtgtgga ggcaacggct ggacaggacc cacccagtgt   120
gtgtcgggag cctgttgtca gatccagaac ccctggtatt cgcagtgtct ccctggctcc   180
tgttcccccct ccaccacttt gacacgggtc acaacaaccg caacatccac tgcatccaca   240
gccacttccg gcacaggagg ctccttgccc tcgtccttca gtggtcgtc gtccggaccc    300
ttggtcgacc ctaagaacga cggtcgaggc atcgcagcgt tgaaagatcc gtcgatcgtc   360
```

```
gaggtcgatg gcacatatca cgtgttcgca tcgactgcaa cttcggcagg ctacaacatg    420
gtgtatttca acttcaccga tttcaaccag gcaaacaacg cacccttctt ctatttggac    480
aaatcgccta ttggctcggg ataccgagcc gcacccagg tcttcttctt caagccccag    540
aacttgtggt acctcgtcta ccagaacggc aacgcagcct actcgaccaa caaagatatc    600
tccaacctg caggctggtc cgcacccaag acattctact cgtcgcagcc ctcgatcatc    660
acagagaaca tcggtaacgg ttactgggtc gatatgtggg tcatctgtga ttccggcaac    720
tgtcactgt tctcgtccga cgataacggc catttgtacc gctcgcagac gacgttggcg    780
aacttccccca acggtatgac caacacagtg atcgcgatgc aggactcgaa ccccaacaac    840
ttgttcgagg catccaacgt ctaccatgtg ggaggcggta agtatctcct cattgtcgag    900
gccatcggct ccggaggcga ccgatacttc cggtcgtgga cgtcgacgtc cctcactggt    960
acctggactg cactcgcagc atcggaatcg aaccctttcg caggtgccaa gaacgtggcc   1020
ttctccggca acgtctggac caaatccatc tcgcacggag agatgatccg agaccaggtg   1080
gatcagacct tgacaatctc cccgtgtaag ctcaggtact tgtaccaggg cgtcgatccg   1140
gcagcaaccg gtaactacaa ctcgttgccg tggaagctcg cgctcctcac gcagacgaac   1200
tcggcatgtt ga                                                        1212

SEQ ID NO: 14          moltype = AA   length = 403
FEATURE                Location/Qualifiers
REGION                 1..403
                       note = Synthetic Construct
source                 1..403
                       mol_type = protein
                       organism = synthetic construct
SEQUENCE: 14
MILSAKMLGA ILLELALTAA AQQTLYGQCG GNGWTGPTQC VSGACCQIQN PWYSQCLPGS     60
CSPSTTLTRV TTTATSTAST ATSGTGGSLP SSFKWSSSGP LVDPKNDGRG IAALKDPSIV    120
EVDGTYHVFA STATSAGYNM VYFNFTDFNQ ANNAPFFYLD KSPIGSGYRA APQVFFFKPQ    180
NLWYLVYQNG NAAYSTNKDI SNPAGWSAPK TFYSSQPSII TENIGNGYWV DMWVICDSAN    240
CHLFSSDDNG HLYRSQTTLA NFPNGMTNTV IAMQDSNPNN LFEASNVYHV GGKYLLIVE     300
AIGSGGDRYF RSWTSTSLTG TWTALAASES NPFAGAKNVA FSGNVWTKSI SHGEMIRDQV    360
DQTLTISPCK LRYLYQGVDP AATGNYNSLP WKLALLTQTN SAC                     403

SEQ ID NO: 15          moltype = AA   length = 382
FEATURE                Location/Qualifiers
source                 1..382
                       mol_type = protein
                       organism = Aspergillus clavatus
SEQUENCE: 15
QQTLYGQCGG NGWTGPTQCV SGACCQIQNP WYSQCLPGSC SPSTTLTRVT TTATSTASTA     60
TSGTGGSLPS SFKWSSSGPL VDPKNDGRGI AALKDPSIVE VDGTYHVFAS TATSAGYNMV    120
YFNFTDFNQA NNAPFFYLDK SPIGSGYRAA PQVFFFKPQN LWYLVYQNGN AAYSTNKDIS    180
NPAGWSAPKT FYSSQPSIIT ENIGNGYWVD MWVICDSANC HLFSSDDNGH LYRSQTTLAN    240
FPNGMTNTVI AMQDSNPNNL FEASNVYHVG GGKYLLIVEA IGSGGDRYFR SWTSTSLTGT    300
WTALAASESN PFAGAKNVAF SGNVWTKSIS HGEMIRDQVD QTLTISPCKL RYLYQGVDPA    360
ATGNYNSLPW KLALLTQTNS AC                                            382

SEQ ID NO: 16          moltype = DNA   length = 1188
FEATURE                Location/Qualifiers
misc_feature           1..1188
                       note = codon optimised DNA sequence
sig_peptide            1..51
mat_peptide            52..1185
source                 1..1188
                       mol_type = other DNA
                       organism = synthetic construct
CDS                    1..1185
SEQUENCE: 16
atgaaggcga tcggagcgac cctcctcgga ttggccctcg cggtgcaggc acagcagccg     60
ctctatgcac agtgtggagg caacggatgg accggttcga cgcagtgtgt ggcaggtgcc    120
tgttgttcgt ccattaacgc ctggtactat cagtgttttgt ccggaaactg tatgccctcg    180
acaacgatga cgacaaccgc aactaggacc acatcgacct ccacgtccgg acccacgggc    240
tccttgcctc cttccttcaa gtggtcctcg accaacgccc tcgtgggtcc taagaacgat    300
ggccgaaacc tcgcaggtat caaagatccg tccatcatcg aagtggacgg cacataccat    360
gtgttcgcct cgacagcgca ggcctccggc tataacttcg tctacttcaa cttcaccgac    420
ttcaaccagg caggtaacgc acccttcttc tacttggatc agtcgggcat ggcacaggt    480
tatcgggcag cacccaggt gttctacttc cagcctcagc agttgtggta cctcatcttc    540
cagaacggaa acgcagcata tcgaccaac aaggatatct ccaaccctgc aggttggtcc    600
gcaccgaaaa acttcttctc ctcggtcccct tccattatca ggaacaact cggtaacggc    660
tactgggtcg atatgtgggt catctgtgac tcgtccaact gttacttgtt tcctccgaca    720
gacaacggcc atctctaccg atcccagacg acgttgtcga acttcccaa cggcatgggt    780
aacaccgtca tcgccctctc ggattccaac cccaacaact tgttcgaggc ctcgaacgtc    840
taccgggtgg gcaacgagta cctcctcatc gtcgaggcaa tcggttccga tggaaacagg    900
tatttccgct cgtggacagc accgtcgctc acaggtacgt ggacaggcct cgcaaacaca    960
gaagccgcct ccttcgcag gtggaacaac gtcgtgttct ccggcacggc ctgactaag   1020
tcgatctcgc acggcgagat ggtgcgatcc caggtcgacc agacgatgac aatttcgccg   1080
tgtaagttga ggtacttgta tcagggcttg tcgcccactg caacaggcga ctataactcc   1140
ttgccctgga gttggcccct cctcacccag acaaaactcgg catgttag                1188

SEQ ID NO: 17          moltype = AA   length = 395
```

```
FEATURE                 Location/Qualifiers
REGION                  1..395
                        note = Synthetic Construct
source                  1..395
                        mol_type = protein
                        organism = synthetic construct
SEQUENCE: 17
MKAIGATLLG LALAVQAQQP LYAQCGGNGW TGSTQCVAGA CCSSINAWYY QCLSGNCMPS    60
TTMTTTATRT TSTSTSGPTG SLPPSFKWSS TNALVGPKND GRNLAGIKDP SIIEVDGTYH   120
VFASTAQASG YNLVYFNFTD FNQAGNAPFF YLDQSGIGTG YRAAPQVFYF QPQQLWYLIF   180
QNGNAAYSTN KDISNPAGWS APKNFFSSVP SIITQNIGNG YWVDMWVICD SSNCYLFSSD   240
DNGHLYRSQT TLSNFPNGMG NTVIALSDSN PNNLFEASNV YRVGNEYLLI VEAIGSDGNR   300
YFRSWTAPSL TGTWTGLANT EANPFARWNN VVFSGTAWTK SISHGEMVRS QVDQTMTISP   360
CKLRYLYQGL SPTATGDYNS LPWKLALLTQ TNSAC                              395

SEQ ID NO: 18           moltype = AA   length = 378
FEATURE                 Location/Qualifiers
source                  1..378
                        mol_type = protein
                        organism = Neosartorya fischeri
SEQUENCE: 18
QQPLYAQCGG NGWTGSTQCV AGACCSSINA WYYQCLSGNC MPSTTMTTTA TRTTSTSTSG    60
PTGSLPPSFK WSSTNALVGP KNDGRNLAGI KDPSIIEVDG TYHVFASTAQ ASGYNLVYFN   120
FTDFNQAGNA PFFYLDQSGI GTGYRAAPQV FYFQPQQLWY LIFQNGNAAY STNKDISNPA   180
GWSAPKNFFS SVPSIITQNI GNGYWVDMWV ICDSSNCYLF SSDDNGHLYR SQTTLSNFPN   240
GMGNTVIALS DSNPNNLFEA SNVYRVGNEY LLIVEAIGSD GNRYFRSWTA PSLTGTWTGL   300
ANTEANPFAR WNNVVFSGTA WTKSISHGEM VRSQVDQTMT ISPCKLRYLY QGLSPTATGD   360
YNSLPWKLAL LTQTNSAC                                                 378

SEQ ID NO: 19           moltype = DNA   length = 996
FEATURE                 Location/Qualifiers
misc_feature            1..996
                        note = codon optimised DNA sequence
sig_peptide             1..60
mat_peptide             61..993
source                  1..996
                        mol_type = other DNA
                        organism = synthetic construct
CDS                     1..993
SEQUENCE: 19
atgaaattgt cctgtgcatt cgtcgcagtg gcagcattgg tggcgaccgc agtggaggcc    60
aaccccgaga ccgaacgaag gcggtcctgt gcgctcccta caacatatcg gtggacgtcc   120
tcggcaccgc tcgcccagcc caaggatggc tgggtctcaa tgaaagattt cactcatgtc   180
ccgtacaacg gacagcactt ggtgtatgca tcctaccatg attcgaccaa gtatggatcc   240
atggcattct ccccccttca agcactggca gatatggcga cagcaaccca gacgggaatg   300
acacaggcag ccgtggcacc gacggtgttc tacttcacac ccaaaaagct ctggttcttg   360
gtgtcccagt ggggttcggc acccttcaca taccggactc ggcagattc ggcacagga    420
aacggctggt cggcacccca gcccctcttc acgggcaaag tggcagattc ggcacagga   480
ccgatcgatc agacagtgat cgcggatgac cggaaggtct acttgttctt cgtcgcagac   540
aacggaaagg tgtaccgcac atccatggca attggagact ccctgccaa cttcggcaca   600
gcctccgagg tgattttgtc ggatacccag gcaaagttgt tcgaagcagt ccaggtctac   660
accgtggcag gtcagaacca gtacctcatg atcgtggagg cccagggtac aacggaagg   720
tacttccggt ccttcactgc aaactcgttg gatggagagt ggaaggtgca ggcaggctcg   780
gagtccgcac ctttcgcagg caaggccaac tcggagcgt cctggaccaa cgatgtctcc   840
cacggtgatc tcattaggtc caacccggat cagacaatga ccatcgatcc ttgtcgcctc   900
cagctcctct accagggacg cgacaagaac aaggtcccgt cgtcctatga tttggcaccg   960
tatcgccctg gcctcctcac cttgtatggc ctctag                            996

SEQ ID NO: 20           moltype = AA   length = 331
FEATURE                 Location/Qualifiers
REGION                  1..331
                        note = Synthetic Construct
source                  1..331
                        mol_type = protein
                        organism = synthetic construct
SEQUENCE: 20
MKLSCAFVAV AALVATAVEA NPETERRRSC ALPTTYRWTS SAPLAQPKDG WVSLKDFTHV    60
PYNGQHLVYA SYHDSTKYGS MAFSPFKHWA DMATATQTVM TQAAVAPTVF YPTPKKLWFL   120
VSQWGSAPFT YRTSTDPTKV NGWSAPQPLF TGKVADSGTG PIDQTVIADD RKVYLFFVAD   180
NGKVYRTSMA IGDFPANFGT ASEVILSDTQ AKLFEAVQVY TVAGQNQYLM IVEAQGTNGR   240
YFRSFTANSL DGEWKVQAGS ESAPPAGKAN SGASWTNDVS HGDLIRSNPD QTMTIDPCRL   300
QLLYQGRDKN KVPSSYDLAP YRPGLLTLYG L                                  331

SEQ ID NO: 21           moltype = AA   length = 311
FEATURE                 Location/Qualifiers
source                  1..311
                        mol_type = protein
                        organism = Ustilago maydis
SEQUENCE: 21
```

```
NPETERRRSC ALPTTYRWTS SAPLAQPKDG WVSLKDFTHV PYNGQHLVYA SYHDSTKYGS    60
MAFSPFKHWA DMATATQTGM TQAAVAPTVF YFTPKKLWFL VSQWGSAPFT YRTSTDPTKV   120
NGWSAPQPLF TGKVADSGTG PIDQTVIADD RKVYLFFVAD NGKVYRTSMA IGDFPANFGT   180
ASEVILSDTQ AKLFEAVQVY TVAGQNQYLM IVEAQGTNGR YFRSFTANSL DGEWKVQAGS   240
ESAPFAGKAN SGASWTNDVS HGDLIRSNPD QTMTIDPCRL QLLYQGRDKN KVPSSYDLAP   300
YRPGLLTLYG L                                                        311

SEQ ID NO: 22           moltype = DNA  length = 996
FEATURE                 Location/Qualifiers
sig_peptide             1..87
mat_peptide             88..993
source                  1..996
                        mol_type = other DNA
                        organism = Penicillium oxalicum
CDS                     1..993
SEQUENCE: 22
atgcgttccc ctatctctaa cctcgacctg tggtcgtctt tcactgtgct tctcgcatcg    60
gctggtaccc ttgcgagtgc cgcgtgcccc gtcccctccc agggtcaata ccgctggtct   120
tccaccggtg ccctggctca gcctcagcac ggctggactt ccatcaagga cttcaccaac   180
gttgtctaca acggcaagca ccttgtctac gcctccgtgg ccgactccaa gggcaactac   240
cactccatga acttcggtct cttcagtgac tggtcccaga tggcctccgc cagccagaac   300
cccatgaact tcaacgctgt cgccccgact ctgttcttct tcgctcccaa gaacgtctgg   360
gttctcgcct accagtgggg cgccaacgcc ttctcctacc gtacctccaa cgaccccgcc   420
aatgccaatg gatggtcgtc tgagcaccca ctgttcaccg gaaagatcgc caacagcggt   480
accggcccca tcgaccagac cctgatcggt gacaaccaga acatgtacct gttcttcgcc   540
ggtgataacg gcaagatcta ccggtccagc atgcccctca acaacttccc cggatccttc   600
ggcggtgcct ccgaggtcat cctgagcgac accaccgcca acctcttcga ggccgtccag   660
gtctacaagg ttgccggtga gaacaagtat ctcatgatcg tcgaggccat gggtgcccac   720
ggccgctact tccgctcctt cactgccacc agcctcaacg gcaagtggac cctcaacgct   780
ggctccgagg gtgctccctt cgccggcaag gccaacgcag gtgctggctg gaccaacgac   840
atcagccacg gtgaccctcgt ccgtaccaac cctgaccaga ccatgaccgt cgacatgtgc   900
aacctccagt tcctgtacca gggcgtgac cccaacgcca accccaccta caacgctctg   960
ccttaccgcc ccggtgttct cacccctgaag cactag                            996

SEQ ID NO: 23           moltype = AA  length = 331
FEATURE                 Location/Qualifiers
source                  1..331
                        mol_type = protein
                        organism = Penicillium oxalicum
SEQUENCE: 23
MRSPISNLDL WSSFTVLLAS AGTLASAACP VPSQGQYRWS STGALAQPQH GWTSIKDFTN    60
VVYNGKHLVY ASVADSKGNY HSMNFGLFSD WSQMASASQN PMNFNAVAPT LFFFAPKNVW   120
VLAYQWGANA FSYRTSNDPA NANGWSSEHP LFTGKIANSG TGPIDQTLIG DNQNMYLFFA   180
GDNGKIYRSS MPLNNFPGSF GGASEVILSD TTANLFEAVQ VYKVAGENKY LMIVEAMGAH   240
GRYFRSFTAT SLNGKWTLNA GSEGAPFAGK ANSGAGWTND ISHGDLVRTN PDQTMTVDMC   300
NLQFLYQGRD PNANPTYNAL PYRPGVLTLK H                                  331

SEQ ID NO: 24           moltype = AA  length = 302
FEATURE                 Location/Qualifiers
source                  1..302
                        mol_type = protein
                        organism = Penicillium oxalicum
SEQUENCE: 24
PVPSQGQYRW SSTGALAQPQ HGWTSIKDFT NVVYNGKHLV YASVADSKGN YHSMNFGLFS    60
DWSQMASASQ NPMNFNAVAP TLFFFAPKNV WVLAYQWGAN AFSYRTSNDP ANANGWSSEH   120
PLFTGKIANS GTGPIDQTLI GDNQNMYLFF AGDNGKIYRS SMPLNNFPGS FGGASEVILS   180
DTTANLFEAV QVYKVAGENK YLMIVEAMGA HGRYFRSFTA TSLNGKWTLN AGSEGAPFAG   240
KANSGAGWTN DISHGDLVRT NPDQTMTVDM CNLQFLYQGR DPNANPTYNA LPYRPGVLTL   300
KH                                                                  302

SEQ ID NO: 25           moltype = DNA  length = 1030
FEATURE                 Location/Qualifiers
sig_peptide             1..48
mat_peptide             49..1027
source                  1..1030
                        mol_type = other DNA
                        organism = Talaromyces pinophilus
CDS                     1..70
CDS                     123..1027
SEQUENCE: 25
atgcatttcc tcgccgcgtt gctcgcggtt ctgccacttg tatctgggtc tccagtaccc    60
gagaaacgat gtaagttgta tccacctgaa cagtgaaagc tggacggtat tgacaatcac   120
agccggatgc gcacttccct ctacgtacaa gtggacatcc actggcccgc tggcaagccc   180
caagtcgggt ttggttgctc tgagagacta tagccatgtc atctacaacg gccaacatct   240
cgtatacgga tcgaccgcca acacagctgg cagctatggt tccatgaact ttggcctgtt   300
tcggactgg tctgagatgt catctgccag ccaaaacacg atgagcactg cgccgtcgc    360
tcccacgatc ttctactttg caccaaagag tgtctggatc cttgcctatc aatgggtcc    420
atatgcgttt cctacagga cttctaccga tccttccaat gccaatggct ggtcatcgcc   480
acagcctctt ttcacgggaa ctatttccgg ctccagtacc ggtgtcatcg atcagacagt   540
```

```
tattggcgat agcgaaaaca tgtatctctt ctttgctgga gataatggcc atatttaccg    600
tgctagcatg cccattggag actttcctgg aagtttcggc tcagcatcga cgattgtcct    660
cagcgactcg actaacaact tgtttcgagg ggtagaggtc tacaccgtcg agggtcaaaa    720
tcaataccto atgattgtcg aggcaattgg tgccaatgga cgttatttcc gctccttcac    780
agctagtagt ctgggaggca catggacggc gcaggcttca accgagtcca acccattcgc    840
tggcaaggct aacagtggcg ccacctggac caacgacatc agcagcggcg atttggtccg    900
tactaatccc gatcagacac agacgatcga tgcctgcaat ctacaattcc tctatcaagg    960
acgatccacc agctccggcg gcgactacaa ccttcttcct taccagcctg gtctgttgac   1020
acttgcttag                                                          1030

SEQ ID NO: 26          moltype = AA   length = 325
FEATURE                Location/Qualifiers
source                 1..325
                       mol_type = protein
                       organism = Talaromyces pinophilus
SEQUENCE: 26
MHFLAALLAV LPLVSGSPVP EKRSGCALPS TYKWTSTGPL ASPKSGLVAL RDYSHVIYNG    60
QHLVYGSTAN TAGSYGSMNF GLFSDWSEMS SASQNTMSTG AVAPTIFYFA PKSVWILAYQ   120
WGPYAFSYRT STDPSNANGW SSPQPLFTGT ISGSSTGVID QTVIGDSENM YLFFAGDNGH   180
IYRASMPIGD FPGSFGSAST IVLSDSTNNL FEAVEVYTVE GQNQYLMIVE AIGANGRYFR   240
SFTASSLGGT WTAQASTESN PFAGKANSGA TWTNDISSGD LVRTNPDQTQ TIDACNLQFL   300
YQGRSTSSGG DYNLLPYQPG LLTLA                                         325

SEQ ID NO: 27          moltype = AA   length = 309
FEATURE                Location/Qualifiers
source                 1..309
                       mol_type = protein
                       organism = Talaromyces pinophilus
SEQUENCE: 27
SPVPEKRSGC ALPSTYKWTS TGPLASPKSG LVALRDYSHV IYNGQHLVYG STANTAGSYG    60
SMNFGLFSDW SEMSSASQNT MSTGAVAPTI FYFAPKSVWI LAYQWGPYAF SYRTSTDPSN   120
ANGWSSPQPL FTGTISGSST GVIDQTVIGD SENMYLFFAG DNGHIYRASM PIGDFPGSFG   180
SASTIVLSDS TNNLFEAVEV YTVEGQNQYL MIVEAIGANG RYFRSFTASS LGGTWTAQAS   240
TESNPFAGKA NSGATWTNDI SSGDLVRTNP DQTQTIDACN LQFLYQGRST SSGGDYNLLP   300
YQPGLLTLA                                                           309

SEQ ID NO: 28          moltype = DNA   length = 1425
FEATURE                Location/Qualifiers
sig_peptide            1..108
mat_peptide            109..1422
source                 1..1425
                       mol_type = other DNA
                       organism = Streptomyces nitrosporeus
CDS                    1..1422
SEQUENCE: 28
atgtacagag gaagtctcag ccgcgggcgc acgcccgcgg tgctcgccgc cgcggtcgcg    60
gtcctggcgg cgctggcggc gatgcttgtc gccaccccgg cccaggcggc cgccagcggc   120
gccctgcgcg gtgccggttc gggccggtgc gtcgacgtga cgggcggcga acggaccgac   180
ggcactaccc tccagctcta cgactgctgg ggcgggacca accagcagtg gacgtcgacg   240
gacagcggcc agctgaccgt gtacggcgac aagtgcctgg acgttccggg ccacgccacc   300
acaccggta ccagggtgca gatctggggc tgctccggcg gtgcgaacca gcagtggcgg   360
gtgaactccg acggcacggt cgtcggcgtg agtccgggc tgtgcctgga ggccgcgggc   420
gccggtacgg ccaacggcac agcggtccag ctctggacgt gcaacggcgg cagcaaccag   480
aagtggaccg gtctgcccgc gacgccgccg acggacggca cgtgttccct tccgtcggcg   540
taccgggtgga cgtctacggg cgtgctggcg cagccggcga cgggtgggcc ccggtgaag   600
gacttcacca ccgtgaccca caacggcaag cacctggtct acgcgtgcaa cgtgtccggg   660
tcgtcgtacg gttcgatgat gttcagtccc ttcacggact ggccggacat ggcgtcggcc   720
ggccagacgg gaatgagcca ggccgcggtg gcgcccacgc tgttctactt cgcgcccaag   780
aacatctggg tactggccgta ccagtggggc gcgtggccgt tcatctaccg cacgtcgagc   840
aaccccgccg accccaacgg ctggtcctcc ccgcagccgc tgttcaccgg gagcatctcc   900
ggatccgaca ccggcccgat cgatcagacc ctgatcgccg acggacagaa catgtacctg   960
ttcttcgccg gtgacaacgg gaagatctac cgggcgagca tgccgatcgg gaacttcccg   1020
ggcagcttcg gctcgtcgta cacgacggtc atgagcgaca cgaaggccaa cctgttcgag   1080
ggcgtccagg tctacaaggt caaggaccgg agccagtacc tcatgatcgt cgaggcgaag  1140
ggtgcgaacg ggcgctactt ccgctccttc acggcctcca gcctgaacgg gacgtggacc   1200
ccgcaggccc caccgagag cagcccttc gcgggcaagg ccaacagcgg tgccacctgg   1260
accaacgaca tcagccacgg cgacctggtc gcgacaacc cgaccagac catgaccgtc   1320
gaccctgca acctgcggtt cctctaccag gcaaggcgc ccgacgcggg cggcgagtac   1380
aaccggctgc cgtggcggcc gggggtcctc accctgcggc gctga                  1425

SEQ ID NO: 29          moltype = AA   length = 474
FEATURE                Location/Qualifiers
source                 1..474
                       mol_type = protein
                       organism = Streptomyces nitrosporeus
SEQUENCE: 29
MYRGSLSRGR TPAVLAAAVA VLAALAAMLV ATPAQAAASG ALRGAGSGRC VDVTGGERTD    60
GTTLQLYDCW GGTNQQWTST DSGQLTVYGD KCLDVPGHAT TPGTRVQIWG CSGGANQQWR   120
VNSDGTVVGV ESGLCLEAAG AGTANGTAVQ LWTCNGGSNQ KWTGLPATPP TDGTCSLPSA   180
```

```
YRWTSTGVLA QPANGWAAVK DFTTVTHNGK HLVYASNVSG SSYGSMMFSP FTDWPDMASA   240
GQTGMSQAAV APTLFYFAPK NIWVLAYQWG AWPFIYRTSS NPADPNGWSS PQPLFTGSIS   300
GSDTGPIDQT LIADGQNMYL FFAGDNGKIY RASMPIGNFP GSFGSSYTTV MSDTKANLFE   360
GVQVYKVKDR SQYLMIVEAM GANGRYFRSF TASSLNGTWT PQAATESSPF AGKANSGATW   420
TNDISHGDLV RDNPDQTMTV DPCNLRFLYQ GKAPDAGGEY NRLPWRPGVL TLRR         474

SEQ ID NO: 30           moltype = AA   length = 438
FEATURE                 Location/Qualifiers
source                  1..438
                        mol_type = protein
                        organism = Streptomyces nitrosporeus
SEQUENCE: 30
AASGALRGAG SGRCVDVTGG ERTDGTTLQL YDCWGGTNQQ WTSTDSGQLT VYGDKCLDVP    60
GHATTPGTRV QIWGCSGGAN QQWRVNSDGT VVGVESGLCL EAAGAGTANG TAVQLWTCNG   120
GSNQKWTGLP ATPPTDGTCS LPSAYRWTST GVLAQPANGW AAVKDFTTVT HNGKHLVYAS   180
NVSGSSYGSM MFSPFTDWPD MASAGQTGMS QAAVAPTLFY FAPKNIWVLA YQWGAWPFIY   240
RTSSNPADPN GWSSPQPLFT GSISGSDTGP IDQTLIADGQ NMYLFFAGDN GKIYRASMPI   300
GNFPGSFGSS YTTVMSDTKA NLFEGVQVYK VKDRSQYLMI VEAMGANGRY FRSFTASSLN   360
GTWTPQAATE SSPFAGKANS GATWTNDISH GDLVRDNPDQ TMTVDPCNLR FLYQGKAPDA   420
GGEYNRLPWR PGVLTLRR                                                 438

SEQ ID NO: 31           moltype = DNA   length = 1422
FEATURE                 Location/Qualifiers
misc_feature            1..1422
                        note = Expression construct
sig_peptide             1..81
mat_peptide             82..1419
source                  1..1422
                        mol_type = other DNA
                        organism = synthetic construct
CDS                     1..1419
SEQUENCE: 31
atgaagaaac cgttgggggaa aattgtcgca agcaccgcac tactcatttc tgttgctttt    60
agttcatcga tagcatcagc acatcatcat caccatcatc ctaggggccg cagcggcgcg   120
ctgcgcggtg ccggttcggg ccggtcgtc gacgtgacgg gcggcgaacg gaccgacggc   180
actaccctcc agctctacga ctgctggggc gggaccaacc agcagtggac gtcgacggac   240
agcggccagc tgaccgtgta cggcgacaag tgcctggacg ttccgggcca cgccaccaca   300
cccggtacca gggtgcagat ctgggggctgc tccggcggtg cgaaccagca gtggcgggtg   360
aactccgacg gcacggtcgt cggcgtggag tccggggctgt gcctggaggc cgccgggcgc   420
ggtacggcca acggcacagc ggtccagctc tggacgtgca acggcgggcag caaccagaag   480
tggaccggtc tgcccgcgac gccgccgacg gacggcacgt gttccttcc gtcggcgtac   540
cggtggacgt ctacgggcgt gctggcgcag ccggcgaacg gtgggccgc ggtgaaggac   600
ttcaccaccg tgacccacaa cggcaagcac ctggtctacg cgtcgaacgt gtcggggtcg   660
tcgtacggtt cgatgatgtt cagtcccttc acggactggc cggacatggc gtcggccggc   720
cagacgggaa tgagccaggc cgcggtggcc cccacgctgt tctacttcgc gcccaagaac   780
atctgggtac tggcgtacca gtggggcgcg tggcccttca tctaccgcac gtcgagcaac   840
cccgccgacc caacggctg gtcctccccg cagccgctgt tcaccgggac catctccgga   900
tccgacaccg gcccgatcga tcagaccctg atcgccgacg gacagaacat gtacctgttc   960
ttcgccggtc acaacgggaa gatctaccgg gcgagcatgc cgatcgggaa cttcccgggc  1020
agcttcggct cgtcgtacac gacggtcatg agcgacacga aggccaacct gttcgagggc  1080
gtccaggtct acaaggtcaa ggaccggagc cagtacctga tgatcgtcga ggcgatggt  1140
gcgaacgggc gctacttccg ctccttcacg gcctccagcc tgaacgggac gtggaccccg  1200
caggccgcca ccgagagcag ccccttcgcg ggcaaggcca acagcggtgc cacctggacc  1260
aacgacatca gccacggcga cctggtccgc gacaaccccg accagaccat gaccgtcgac  1320
ccctgcaacc tgcggttcct ctaccagggc aaggcgcccg acgcgggcgg cgagtacaac  1380
cggctgccgt ggcggccggg ggtcctcacc ctgcggcgct ga                     1422

SEQ ID NO: 32           moltype = AA   length = 473
FEATURE                 Location/Qualifiers
REGION                  1..473
                        note = Synthetic Construct
source                  1..473
                        mol_type = protein
                        organism = synthetic construct
SEQUENCE: 32
MKKPLGKIVA STALLISVAF SSSIASAHHH HHHPRAASGA LRGAGSGRCV DVTGGERTDG    60
TTLQLYDCWG GTNQQWTSTD SGQLTVYGDK CLDVPGHATT PGTRVQIWGC SGGANQQWRV   120
NSDGTVVGVE SGLCLEAAGA GTANGTAVQL WTCNGGSNQK WTGLPATPPT DGTCSLPSAY   180
RWTSTGVLAQ PANGWAAVKD FTTVTHNGKH LVYASNVSGS SYGSMMFSPF TDWPDMASAG   240
QTGMSQAAVA PTLFYFAPKN IWVLAYQWGA WPFIYRTSSN PADPNGWSSP QPLFTGSISG   300
SDTGPIDQTL IADGQNMYLF FAGDNGKIYR ASMPIGNFPG SFGSSYTTVM SDTKANLFEG   360
VQVYKVKDRS QYLMIVEAMG ANGRYFRSFT ASSLNGTWTP QAATESSPFA GKANSGATWT   420
NDISHGDLVR DNPDQTMTVD PCNLRFLYQG KAPDAGGEYN RLPWRPGVLT LRR          473

SEQ ID NO: 33           moltype = AA   length = 446
FEATURE                 Location/Qualifiers
REGION                  1..446
                        note = Mature sequence with His-tag
source                  1..446
```

-continued

```
                        mol_type = protein
                        organism = synthetic construct
SEQUENCE: 33
HHHHHHPRAA  SGALRGAGSG  RCVDVTGGER  TDGTTLQLYD  CWGGTNQQWT  STDSGQLTVY   60
GDKCLDVPGH  ATTPGTRVQI  WGCSGGANQQ  WRVNSDGTVV  GVESGLCLEA  AGAGTANGTA  120
VQLWTCNGGS  NQKWTGLPAT  PPTDGTCSLP  SAYRWTSTGV  LAQPANGWAA  VKDFTTVTHN  180
GKHLVYASNV  SGSSYGSMMF  SPFTDWPDMA  SAGQTGMSQA  AVAPTLFYFA  PKNIWVLAYQ  240
WGAWPFIYRT  SSNPADPNGW  SSPQPLFTGS  ISGSDTGPID  QTLIADGQNM  YLFFAGDNGK  300
IYRASMPIGN  FPGSFGSSYT  TVMSDTKANL  FEGVQVYKVK  DRSQYLMIVE  AMGANGRYFR  360
SFTASSLNGT  WTPQAATESS  PFAGKANSGA  TWTNDISHGD  LVRDNPDQTM  TVDPCNLRFL  420
YQGKAPDAGG  EYNRLPWRPG  VLTLRR                                          446

SEQ ID NO: 34           moltype = DNA  length = 1425
FEATURE                 Location/Qualifiers
sig_peptide             1..108
mat_peptide             109..1422
source                  1..1425
                        mol_type = other DNA
                        organism = Streptomyces beijiangensis
CDS                     1..1422
SEQUENCE: 34
atgagcagac gaactttcag tcgcaggcat ccatctgctg tgctcgccgc cgtgatcgcg   60
gctctgggag cattggcggc gatgctcgtc gccaccccgg ctcaggcggc tgccggcggc  120
gccctgcgcc aggccgcttc cggccggtgc ctcgatgtgc cgggcgccgt ccagaccgac  180
ggtacgtccg tgcagatcta tgactgctgg agtggaacca accagcagtg gacgtcgacg  240
gacgccaacc agctcaccgt gtacggcaac aagtgcctgg atgtccccgg tcacgccacc  300
acggccggga cccgggtgca gatatgagc tgttccggcg gtgcgaacca gcagtggagg  360
gtgaactccg acggcacggt caccggcgtg gagtcagggc tgtgcctgga ggccgcgggc  420
gccgccacgg ccaacggaac ggcggtgcag ctggaacgt gcaaccaggg aagcaaccag  480
aaatggagcg gtctgaccgg gacgccgccg acggacgacc cgtgttccct gccgtcgagc  540
taccgctggt cgtcgacggg tgtgctggcg cagcctgcga acgggtgggc ggcggtgaag  600
gacttcacca ccgtgaccta caacggcaag cacctggtct acgcctcgaa cgtgtcggga  660
tcgtcgtacg gctcgatgat gttcagtccc ttcacgaact ggtcggacat ggcgtcggcc  720
ggccagagcg gatgagcca ggccgcgtg gcacccacgc tgttctactt cgcgcccaag  780
aacatctggg tgctggcgta ccagtgggc cgtcgcgccc tcgtctaccg cacgtcgagc  840
gaccccacca accccaacgg ctggtcatca ccgcagccac tgttcaccgg gagcatctcc  900
ggctccgaca ccgaccgat cgaccagacc ctgatcgccg acggcagaa catgtacctg  960
ttcttcgccg gcgacaacgg caagatctac cgggcgagca tgccgatcgg gaactttccg 1020
gcaacttcg gctcgtcgta cacgacggtc atgagcgaca ccaaggccaa cctgttcgaa 1080
ggcgtacagg tctacaaggt ccagggccag aaccagtacc tcatgatcgt cgaggcgatg 1140
ggtgcgaacg ggcgctactt ccgtccttc accgcctcca gtctgaacgg gcatgggcc 1200
ccgcaggcgg caaccgagag caaccccttc gcgggcaagg ccaacagcgg tgccacctgg 1260
accaacgaca tcagccacgg ggacctgtc cggggcaacc cggatcagac catgacgatc 1320
gatccttgca acctgcaact cctctaccag gggaaatctc ccaccgcggg cggcccctac 1380
gaccaactgc cgtggcggcc aggcgtcctc tcccttcagc gctga            1425

SEQ ID NO: 35           moltype = AA  length = 474
FEATURE                 Location/Qualifiers
source                  1..474
                        mol_type = protein
                        organism = Streptomyces beijiangensis
SEQUENCE: 35
MSRRTFSRRH  PSAVLAAVIA  ALGALAAMLV  ATPAQAAAGG  ALRQAASGRC  LDVPGAVQTD   60
GTSVQIYDCW  SGTNQQWTST  DANQLTVYGN  KCLDVPGHAT  TAGTRVQIWS  CSGGANQQWR  120
VNSDGTVTGV  ESGLCLEAAG  AATANGTAVQ  LGTCNQKWSG  LTGTPPTDGS  CSLPST     180
YRWSSTGVLA  QPANGWAAVK  DFTTVTYNGK  HLVYASNVSG  SSYGSMMFSP  FTNWSDMASA  240
GQSGMSQAAV  APTLFYFAPK  NIWVLAYQWG  ASPFVYRTSS  DPTNPNGWSS  PQPLFTGSIS  300
GSDTGPIDQT  LIADGQNMYL  FFAGDNGKIY  RASMPIGNFP  GNFGSSYTTV  MSDTKANLFE  360
GVQVYKVQGQ  NQYLMIVEAM  GANGRYFRSF  TASSLNGSWA  PQAATESNPF  AGKANSGATW  420
TNDISHGDLV  RGNPDQTMTI  DPCNLQLLYQ  GKSPTAGGPY  DQLPWRPGVL  SLQR        474

SEQ ID NO: 36           moltype = AA  length = 438
FEATURE                 Location/Qualifiers
REGION                  1..438
                        note = Mature sequence with His-tag
source                  1..438
                        mol_type = protein
                        organism = synthetic construct
SEQUENCE: 36
AAGGALRQAA  SGRCLDVPGA  VQTDGTSVQI  YDCWSGTNQQ  WTSTDANQLT  VYGNKCLDVP   60
GHATTAGTRV  QIWSCSGGAN  QQWRVNSDGT  VTGVESGLCL  EAAGAATANG  TAVQLGTCNQ  120
GSNQKWSGLT  GTPPTDGSCS  LPSTYRWSST  GVLAQPANGW  AAVKDFTTVT  YNGKHLVYAS  180
NVSGSSYGSM  MFSPFTNWSD  MASAGQSGMS  QAAVAPTLFY  FAPKNIWVLA  YQWGASPFVY  240
RTSSDPTNPN  GWSSPQPLFT  GSISGSDTGP  IDQTLIADGQ  NMYLFFAGDN  GKIYRASMPI  300
GNFPGNFGSS  YTTVMSDTKA  NLFEGVQVYK  VQGQNQYLMI  VEAMGANGRY  FRSFTASSLN  360
GSWAPQAATE  SNPFAGKANS  GATWTNDISH  GDLVRGNPDQ  TMTIDPCNLQ  LLYQGKSPTA  420
GGPYDQLPWR  PGVLSLQR                                                   438

SEQ ID NO: 37           moltype = DNA  length = 1422
```

| FEATURE | Location/Qualifiers |
|---|---|
| misc_feature | 1..1422 |
| | note = Expression construct |
| sig_peptide | 1..81 |
| mat_peptide | 82..1419 |
| source | 1..1422 |
| | mol_type = other DNA |
| | organism = synthetic construct |
| CDS | 1..1419 |

SEQUENCE: 37

```
atgaagaaac cgttgggaa aattgtcgca agcaccgcac tactcatttc tgttgctttt   60
agttcatcga tagcatcagc acatcatcat caccatcatc ctagggctgc cggcggcgcc  120
ctgcgccagg ccgcttccgg ccggtgcctc gatgtgccgg gcgccgtcca gaccgacggt  180
acgtccgtgc agatctatga ctgctggagt ggaaccaacc agcagtggac tagtgacggc  240
gccaaccagc tcaccgtgta cggcaacaag tgcctggatg tccccggtca cgccaccacg  300
gccgggaccc gggtgcagat atggagctgt tccggcggtg cgaaccagca gtggagggtg  360
aactccgacg gcacggtcac cggcgtggag tcagggctgt gcctggaggc cgcggcgcc   420
gccacggcca acggaacggc ggtgcagctg gaactgtcca accagggaag caaccagaaa  480
tggagcggtc tgaccgggac gccgccgacg gacggctcgt gttccctgcc gtcgacgtac  540
cgctggtcgt cgacgggtgt gctggcgcag cctgcgaacg ggtgggcggc ggtgaaggac  600
ttcaccaccg tgacctacaa cggcaagcac ctggtctacg cctcgaacgt gtcgggatcg  660
tcgtacggct cgatgatgtt cagtcccttc acgaactggt cggacatggc gtcggccagc  720
cagagcggga tgagccaggc cgcggtggca cccacgctgt tctacttcgc gcccaagaac  780
atctgggtgc tggcgtacca gtggggcgcg tcgcccttcg tctaccgcac gtcgagcgac  840
cccaccaacc caacggctg gtcatcaccg cagccactgt tcaccgggag catctccggc  900
tccgacaccg gaccgatcga ccagaccctg atcgccgacg gccagaacat gtacctgttc  960
ttcgccggcg acaacggcaa gatctaccgg gcgagcatgc cgatcgggaa cttcccgggc 1020
aacttcggct cgtcgtacac gacggtcatg agcgacacca aggccaacct gttcgaggc   1080
gtacaggtct acaaggtcca gggccagaac cagtacctga tcgtcgaa ggcgatgggt    1140
gcgaacgggc gctacttccg ctccttcacc gcctccagtc tgaacgggtc atgggccccc  1200
caggcggcaa ccgagagcaa ccccttcgcg gcaaggcca acagcggtgc cacctggacc   1260
aacgacatca gccacgggga cctggtccgg ggcaacccgg atcagaccat gacgatcgat  1320
ccttgcaacc tgcaactcct ctaccagggg aatctcccaa ccgcgggcgg ccctacgac   1380
caactgccgt ggcggccagg cgtcctctcc cttcagcgct ga                    1422
```

| SEQ ID NO: 38 | moltype = AA  length = 473 |
|---|---|
| FEATURE | Location/Qualifiers |
| REGION | 1..473 |
| | note = Synthetic Construct |
| source | 1..473 |
| | mol_type = protein |
| | organism = synthetic construct |

SEQUENCE: 38

```
MKKPLGKIVA STALLISVAF SSSIASAHHH HHHPRAAGGA LRQAASGRCL DVPGAVQTDG   60
TSVQIYDCWS GTNQQWTSTD ANQLTVYGNK CLDVPGHATT AGTRVQIWSC SGGANQQWRV  120
NSDGTVTGVE SGLCLEAAGA ATANGTAVQL GTCNQGSNQK WSGLTGTPPT DGSCSLPSTY  180
RWSSTGVLAQ PANGWAAVKD FTTVTYNGKH LVYASNVSGS SYGSMMFSPF TNWSDMASAG  240
QSGMSQAAVA PTLFYFAPKN IWVLAYQWGA SPFVYRTSSD PTNPNGWSSP QPLFTGSISG  300
SDTGPIDQTL IADGQNMYLF FAGDNGKIYR ASMPIGNFPG NFGSSYTTVM SDTKANLFEG  360
VQVYKVQGQN QYLMIVEAMG ANGRYFRSFT ASSLNGSWAP QAATESNPFA GKANSGATWT  420
NDISHGDLVR GNPDQTMTID PCNLQLLYQG KSPTAGGPYD QLPWRPGVLS LQR         473
```

| SEQ ID NO: 39 | moltype = AA  length = 446 |
|---|---|
| FEATURE | Location/Qualifiers |
| REGION | 1..446 |
| | note = Mature sequence with His-tag |
| source | 1..446 |
| | mol_type = protein |
| | organism = synthetic construct |

SEQUENCE: 39

```
HHHHHHPRAA GGALRQAASG RCLDVPGAVQ TDGTSVQIYD CWSGTNQQWT STDANQLTVY   60
GNKCLDVPGH ATTAGTRVQI WSCSGGANQQ WRVNSDGTVT GVESGLCLEA AGAATANGTA  120
VQLGTCNQGS NQKWSGLTGT PPTDGSCSLP STYRWSSTGV LAQPANGWAA VKDFTTVTYN  180
GKHLVYASNV SGSSYGSMMF SPFTNWSDMA SAGQSGMSQA AVAPTLFYFA PKNIWVLAYQ  240
WGASPFVYRT SSDPTNPNGW SSPQPLFTGS ISGSDTGPID QTLIADGQNM YLFFAGDNGK  300
IYRASMPIGN FPGNFGSSYT TVMSDTKANL FEGVQVYKVQ GQNQYLMIVE AMGANGRYFR  360
SFTASSLNGS WAPQAATESN PFAGKANSGA TWTNDISHGD LVRGNPDQTM TIDPCNLQLL  420
YQGKSPTAGG PYDQLPWRPG VLSLQR                                       446
```

| SEQ ID NO: 40 | moltype = DNA  length = 1011 |
|---|---|
| FEATURE | Location/Qualifiers |
| sig_peptide | 1..54 |
| mat_peptide | 55..1008 |
| source | 1..1011 |
| | mol_type = other DNA |
| | organism = Aspergillus clavatus |
| CDS | 1..1008 |

SEQUENCE: 40

```
atgcggtcga tcctcttcct agtcacttcc accctcgctg ctgctgctgc tgctgcttcc   60
```

-continued

```
ttacccagaa gcttcaaatg gagctccagc gccgccctcg tgggccctaa gaacgatggc    120
cgccatatcg agggcatcaa ggatccctcc atcgtcgagg tggacggcac ctaccacgtc    180
ttcgctagca ccgcccaggc ctccggctac aacctggtgt atcttagctt caccgacttc    240
aataaggctc acctggctcc attccactac ctggaccaga cccggatcgg caaaggctac    300
cgcgccgcgc cacaggtctt ctacttcaag ccccacaaac tgtggtatct ggtctaccag    360
aacggcaacg cagcctattc caccaacccc gacatcagca acccggccgg ctggaccctc    420
ccgcagaact tcttcagcgg cacacccagc atcatcaccc acaacatggg ccgcggcgcc    480
tgggtggaca tgtggaccat ctgcgacaca cgcaactgct acctcttctc ctcagacgac    540
aacggacacc tctaccgctc ccagacatcc ctggccgact tcccccacgg catgggcaac    600
actgctattg ccctcgcaga ccgcaacaag ttcagcctct cgaagcatc caatgtctac     660
cacaccgggg atggaagcta tctgctcatc gtcgaggcga tcggcaacga cggccagcgg    720
tacttccgct cctggactgc gagcagcttg gccggccagt ggaagcccct ggcggatacc    780
gagtcgaacc ccttcgcgcg ctcgaacaat gttgccttcg ctaatggcca tgcctggacg    840
aagagcatca gccacggcga gatgatccga acccagacgg atcagactat gactatccag    900
ccgtgcaagc tgcggtatct gtaccagggg gtggatcctg cggctaaggg ggattataat    960
gcgcttccgt ggaagctggg cttgctgacc cagacgaact cggcttgtta a             1011
```

SEQ ID NO: 41       moltype = AA   length = 336
FEATURE             Location/Qualifiers
source              1..336
                    mol_type = protein
                    organism = Aspergillus clavatus
SEQUENCE: 41
MRSILFLVTS TLAAAAAAS LPRSFKWSSS AALVGPKNDG RHIEGIKDPS IVEVDGTYHV      60
FASTAQASGY NLVYLSFTDF NKAHLAPFHY LDQTRIGKGY RAAPQVFYFK PHKLWYLVYQ    120
NGNAAYSTNP DISNPAGWTS PQNFFSGTPS IITHNMGRGA WVDMWTICDT RNCYLFSSDD    180
NGHLYRSQTS LADFPHGMGN TAIALADRNK FSLFEASNVY HTGDGSYLLI VEAIGNDGQR    240
YFRSWTASSL AGQWKPLADT ESNPFARSNN VAFANGHAWT KSISHGEMIR TQTDQTMTIS    300
PCKLRYLYQG VDPAAKGDYN ALPWKLGLLT QTNSAC                              336

SEQ ID NO: 42       moltype = AA   length = 318
FEATURE             Location/Qualifiers
source              1..318
                    mol_type = protein
                    organism = Aspergillus clavatus
SEQUENCE: 42
ASLPRSFKWS SSAALVGPKN DGRHIEGIKD PSIVEVDGTY HVFASTAQAS GYNLVYLSFT     60
DFNKAHLAPF HYLDQTRIGK GYRAAPQVFY FKPHKLWYLV YQNGNAAYST NPDISNPAGW    120
TSPQNFFSGT PSIITHNMGR GAWVDMWTIC DTRNCYLFSS DDNGHLYRSQ TSLADFPHGM    180
GNTAIALADR NKFSLFEASN VYHTGDGSYL LIVEAIGNDG QRYFRSWTAS SLAGQWKPLA    240
DTESNPFARS NNVAFANGHA WTKSISHGEM IRTQTDQTMT ISPCKLRYLY QGVDPAAKGD    300
YNALPWKLGL LTQTNSAC                                                  318

SEQ ID NO: 43       moltype = DNA   length = 1035
FEATURE             Location/Qualifiers
misc_feature        1..1035
                    note = Expression construct
sig_peptide         1..54
mat_peptide         55..1032
source              1..1035
                    mol_type = other DNA
                    organism = synthetic construct
CDS                 1..1032
SEQUENCE: 43
atgcggtcga tcctcttcct agtcacttcc accctcgctg ctgctgctgc tgctgcttcc     60
ttacccagaa gcttcaaatg gagctccagc gccgccctcg tgggccctaa gaacgatggc    120
cgccatatcg agggcatcaa ggatccctcc atcgtcgagg tggacggcac ctaccacgtc    180
ttcgctagca ccgcccaggc ctccggctac aacctggtgt atcttagctt caccgacttc    240
aataaggctc acctggctcc attccactac ctggaccaga cccggatcgg caaaggctac    300
cgcgccgcgc cacaggtctt ctacttcaag ccccacaaac tgtggtatct ggtctaccag    360
aacggcaacg cagcctattc caccaacccc gacatcagca acccggccgg ctggaccctc    420
ccgcagaact tcttcagcgg cacacccagc atcatcaccc acaacatggg ccgcggcgcc    480
tgggtggaca tgtggaccat ctgcgacaca cgcaactgct acctcttctc ctcagacgac    540
aacggacacc tctaccgctc ccagacatcc ctggccgact tcccccacgg catgggcaac    600
actgctattg ccctcgcaga ccgcaacaag ttcagcctct cgaagcatc caatgtctac     660
cacaccgggg atggaagcta tctgctcatc gtcgaggcga tcggcaacga cggccagcgg    720
tacttccgct cctggactgc gagcagcttg gccggccagt ggaagcccct ggcggatacc    780
gagtcgaacc ccttcgcgcg ctcgaacaat gttgccttcg ctaatggcca tgcctggacg    840
aagagcatca gccacggcga gatgatccga acccagacgg atcagactat gactatccag    900
ccgtgcaagc tgcggtatct gtaccagggg gtggatcctg cggctaaggg ggattataat    960
gcgcttccgt ggaagctggg cttgctgacc cagacgaact cggcttgtcg acatcaccat   1020
caccatcacc catga                                                    1035

SEQ ID NO: 44       moltype = AA   length = 344
FEATURE             Location/Qualifiers
REGION              1..344
                    note = Synthetic Construct
source              1..344
                    mol_type = protein

```
                        organism = synthetic construct
SEQUENCE: 44
MRSILFLVTS TLAAAAAAAS LPRSFKWSSS AALVGPKNDG RHIEGIKDPS IVEVDGTYHV    60
FASTAQASGY NLVYLSFTDF NKAHLAPFHY LDQTRIGKGY RAAPQVFYFK PHKLWYLVYQ   120
NGNAAYSTNP DISNPAGWTS PQNFFSGTPS IITHNMGRGA WVDMWTICDT RNCYLFSSDD   180
NGHLYRSQTS LADFPHGMGN TAIALADRNK FSLFEASNVY HTGDGSYLLI VEAIGNDGQR   240
YFRSWTASSL AGQWKPLADT ESNPFARSNN VAFANGHAWT KSISHGEMIR TQTDQTMTIS   300
PCKLRYLYQG VDPAAKGDYN ALPWKLGLLT QTNSACRHHH HHHP                   344

SEQ ID NO: 45           moltype = AA   length = 326
FEATURE                 Location/Qualifiers
REGION                  1..326
                        note = Mature sequence with His-tag
source                  1..326
                        mol_type = protein
                        organism = synthetic construct
SEQUENCE: 45
ASLPRSFKWS SSAALVGPKN DGRHIEGIKD PSIVEVDGTY HVFASTAQAS GYNLVYLSFT    60
DFNKAHLAPF HYLDQTRIGK GYRAAPQVFY FKPHKLWYLV YQNGNAAYST NPDISNPAGW   120
TSPQNFFSGT PSIITHNMGR GAWVDMWTIC DTRNCYLFSS DDNGHLYRSQ TSLADFPHGM   180
GNTAIALADR NKFSLFEASN VYHTGDGSYL LIVEAIGNDG QRYFRSWTAS SLAGQWKPLA   240
DTESNPFARS NNVAFANGHA WTKSISHGEM IRTQTDQTMT ISPCKLRYLY QGVDPAAKGD   300
YNALPWKLGL LTQTNSACRH HHHHP                                        326

SEQ ID NO: 46           moltype = DNA  length = 984
FEATURE                 Location/Qualifiers
sig_peptide             1..75
mat_peptide             76..981
source                  1..984
                        mol_type = other DNA
                        organism = Aspergillus wentii
CDS                     1..981
SEQUENCE: 46
atgaaattct tcaaggcgca agctggtgtg ccatctggca tattcttgct ctctctggca    60
ccagttgtca ttgccgactg cgctcttccg tcaacctata gctggacatc aactggctct   120
ctggcagatc caaagtctgg atggacggc tcaaggatt ttaccaatgt ggtctccaac   180
aacaaacata tcgtctatgc atcaaccact gacgccagtg aaactacgg ctcgatgaat   240
tttgcctcct tttcagactg gtctgacatg gcatctgcaa gtcaagccgc gacgagcttt   300
acggcagttg cgcccacttt gctctacttc agccaaaaga gcatctgggt gctggcctac   360
caatggggct cgagtacgtt tacctaccga acgtcaagcg atcctaccaa tgccaatgga   420
tggtcatccg agaaagctct tttctctgga aagatcaccg gctcggacac tggcgccatt   480
gatcagaccc ttatcggtga cgccacgaat atgtatcttt tctttgcggg agataacggc   540
aagatctatc ggtcgagcat gccaatcgcc aacttccctg gagacttcgg aacggcgtca   600
gaagtcgttc ttagtgacag cccggaacaat ctcttcgaag cagtccaagt ttacaccgtc   660
gaagggcaaa accagtatct gatgatcgtc gaggcaattg gaacaaacgg ccgttatttc   720
cgttcattca ccgccagcag tctcgacggt tcgtggacag agcaggcagc cagcgagaac   780
aatcccttcg ctggaaaggc caacagcggt gcgacctgga caacgacat cagtcacggc   840
gatttggttc gcaataaccc tgaccaaaca atgactatcg acccatgcaa cctgcaattc   900
ctctaccagg gcgcgatgc gagtgccggt ggtaactaca ataccctgcc gtggaggcca   960
ggtgtactga ctctgaagca ctaa                                        984

SEQ ID NO: 47           moltype = AA   length = 327
FEATURE                 Location/Qualifiers
source                  1..327
                        mol_type = protein
                        organism = Aspergillus wentii
SEQUENCE: 47
MKFFKAQAGV PSGIFLLSLA PVVIADCALP STYSWTSTGS LADPKSGWTA LKDFTNVVSN    60
NKHIVYASTT DASGNYGSMN FASFSDWSDM ASASQAATSF TVAPTLLYF QPKSIWVLAY   120
QWGSSTFTYR TSSDPTNANG WSSEKALFSG KITGSDTGAI DQTLIGDATN MYLFFAGDNG   180
KIYRSSMPIA NFPGDFGTAS EVVLSDSRNN LFEAVQVYTV EGQNQYLMIV EAIGTNGRYF   240
RSFTASSLDG SWTEQAASEN NPFAGKANSG ATWTNDISHG DLVRNNPDQT MTIDPCNLQF   300
LYQGRDASAG GNYNTLPWRP GVLTLKH                                      327

SEQ ID NO: 48           moltype = AA   length = 302
FEATURE                 Location/Qualifiers
source                  1..302
                        mol_type = protein
                        organism = Aspergillus wentii
SEQUENCE: 48
DCALPSTYSW TSTGSLADPK SGWTALKDFT NVVSNNKHIV YASTTDASGN YGSMNFASFS    60
DWSDMASASQ AATSFTAVAP TLLYFQPKSI WVLAYQWGSS TFTYRTSSDP TNANGWSSEK   120
ALFSGKITGS DTGAIDQTLI GDATNMYLFF AGDNGKIYRS SMPIANFPGD FGTASEVVLS   180
DSRNNLFEAV QVYTVEGQNQ YLMIVEAIGT NGRYFRSFTA SSLDGSWTEQ AASENNPFAG   240
KANSGATWTN DISHGDLVRN NPDQTMTIDP CNLQFLYQGR DASAGGNYNT LPWRPGVLTL   300
KH                                                                302

SEQ ID NO: 49           moltype = DNA  length = 1011
FEATURE                 Location/Qualifiers
```

| | | |
|---|---|---|
| misc_feature | 1..1011 | |
| | note = Expression construct | |
| sig_peptide | 1..75 | |
| mat_peptide | 76..1008 | |
| source | 1..1011 | |
| | mol_type = other DNA | |
| | organism = synthetic construct | |
| CDS | 1..1008 | |

SEQUENCE: 49
```
atgaaattct tcaaggcgca agctggtgtg ccatctggca tattcttgct ctctctggca   60
ccagttgtca ttgccgactg cgctcttccg tcaacctata gctggacatc aactggctct  120
ctggcagatc caaagtctgg atggacggcg ctcaaggatt ttaccaatgt ggtctccaac  180
aacaaacata tcgtctatgc atcaaccact gacgccagtg gaaactacgg ctcgatgaat  240
tttgcctcct tttcagactg gtctgacatg gcatctgcaa gtcaagccgc gacgagcttt  300
acggcagttg cgcccacttt gctctacttc cagccaaaga gcatctgggt gctggcctac  360
caatggggct cgagtacgtt tacctaccga acgtcaagcg atcctaccaa tgccaatgga  420
tggtcatccg agaaagctct tttctctgga agatcaccg gctcggacac tggcgccatt  480
gatcagatcc ttatcggtga cgccacgaat atgtatcttt tctttgcggg agataacgct  540
aagatctatc ggtcgagcat gccaatcgcc aacttccctg gagacttcgg aacggcgtca  600
gaagtcgttc ttagtgacag ccggaacaat ctcttcgaag cagtccaagt ttacaccgtc  660
gaagggcaaa accagtatct gatgatcgtc gaggcaattg aacaaacgg ccgttatttc  720
cgttcattca ccgccagcag tctcgacggt tcgtggacag agcaggcagc cagcgagaac  780
aatcccttcg ctggaaaggc caacagcggt gcgacctgga ccaacagcat cagtcacggc  840
gatttggttc gcaataaccc tgaccaaaca atgactatcg acccatgcaa cctgcaattc  900
ctctaccagg ggcgcgatgc gagtgccggt ggtaactaca atccctgcc gtggaggcca  960
ggtgtactga ctctgaagca cacgcgtgcg catcaccatc accatcacta a          1011
```

| | | |
|---|---|---|
| SEQ ID NO: 50 | moltype = AA length = 336 | |
| FEATURE | Location/Qualifiers | |
| REGION | 1..336 | |
| | note = Synthetic Construct | |
| source | 1..336 | |
| | mol_type = protein | |
| | organism = synthetic construct | |

SEQUENCE: 50
```
MKFFKAQAGV PSGIFLLSLA PVVIADCALP STYSWTSTGS LADPKSGWTA LKDFTNVVSN   60
NKHIVYASTT DASGNYGSMN FASFSDWSDM ASASQAATSF TAVAPTLLYF QPKSIWVLAY  120
QWGSSTFTYR TSSDPTNANG WSSEKALFSG KITGSDTGAI DQTLIGDATN MYLFFAGDNG  180
KIYRSSMPIA NFPGDFGTAS EVVLSDSRNN LFEAVQVYTV EGQNQYLMIV EAIGTNGRYF  240
RSFTASSLDG SWTEQAASEN NPFAGKANSG ATWTNDISHG DLVRNNPDQT MTIDPCNLQF  300
LYQGRDASAG GNYNTLPWRP GVLTLKHTRA HHHHHH                            336
```

| | | |
|---|---|---|
| SEQ ID NO: 51 | moltype = AA length = 311 | |
| FEATURE | Location/Qualifiers | |
| REGION | 1..311 | |
| | note = Mature sequence with His-tag | |
| source | 1..311 | |
| | mol_type = protein | |
| | organism = synthetic construct | |

SEQUENCE: 51
```
DCALPSTYSW TSTGSLADPK SGWTALKDFT NVVSNNKHIV YASTTDASGN YGSMNFASFS   60
DWSDMASASQ AATSFTAVAP TLLYFQPKSI WVLAYQWGSS TFTYRTSSDP TNANGWSSEK  120
ALFSGKITGS DTGAIDQTLI GDATNMYLFF AGDNGKIYRS SMPIANFPGD FGTASEVVLS  180
DSRNNLFEAV QVYTVEGQNQ YLMIVEAIGT NGRYFRSFTA SSLDGSWTEQ AASENNPFAG  240
KANSGATWTN DISHGDLVRN NPDQTMTIDP CNLQFLYQGR DASAGGNYNT LPWRPGVLTL  300
KHTRAHHHHH H                                                       311
```

| | | |
|---|---|---|
| SEQ ID NO: 52 | moltype = DNA length = 1411 | |
| FEATURE | Location/Qualifiers | |
| sig_peptide | 1..72 | |
| mat_peptide | 73..1408 | |
| source | 1..1411 | |
| | mol_type = other DNA | |
| | organism = Acrophialophora fusispora | |
| CDS | 1..318 | |
| CDS | 470..1298 | |
| CDS | 1392..1408 | |

SEQUENCE: 52
```
atgaagttct ccaaatcgga tctcggcgct gccgtcgcct tcctggcttc ggccgtccct   60
ctcgctgaag ccgcgtgctc cttgccgtca agctaccgct gggcaagcac cgggccattg  120
gccaacccca gtcaggctg gtacagtctc aaggacttta ctcatgtccc ttacaacggc  180
aagcacttgg tctatgcgtc aaactatgcc ggatccgcct acggtccat gaacttcggc  240
ctcttctcca actggtccga catggcctcg gcgagtcaaa actctatgaa tgcggccgcc  300
gtcgcaccca ccctgtttgt aagtcagacc tttgccgctt tgctctatcc ttaaagcctt  360
aagggggttgt cattcctctg accctgtttt ccgttaaact gctcggacaa caaccccct  420
tcccccaac tctccttccc cgaaaaacac atgactgaca gctgggcagt actttgcacc  480
taagaatatc tgggtacttg catgcagtg gggagctact cccttcttct accgcacgtc  540
gaccgaccct acgaatccca acagctggtc gtcgaaccag ccgctgttca ccggctccat  600
ctcggactca tccactgggc ccatcgacca gacgctcatt ggtgatgcca actacatgta  660
```

-continued

```
tctcttcttt gcgggcgaca acggcaagat ttaccgctct cggatgccca tcggaaactt    720
cccgggcagc tttggctcat cctacgaagt catcctgagc ggctcgagga acgatttctt    780
cgaggcggtc caggtctaca ccgtgacagg ccaaagctcg ccgctgtacc tcatgatcat    840
cgagagcatc ggtagcagag gccggtactt ccgctcctac acggccacca acctcggggg    900
ctcgtggtct ccgcaggcca cgagcgagag ctcgccgttt gccggggccg cgaacagcgg    960
cgcgacctgg accaacgaca tcagccacgg cgacctgatc cgtagcggtc ccgaccagac   1020
tatgcctatc gacccgtgca acctgcagct gctgtaccag ggcctggtcg gcaccaactc   1080
cgactacaac aagctgccct accggcccgg cctcctgacg ctgcagaacc ctgtgggcgg   1140
cggtggcact ccgaccacga ccacgagcaa gccgcccgcg acgacgacgt ccaccggcgg   1200
tggtggcacc gctcctcagt atgctcagtg cggcggtcag ggatacaccg gcccgacggt   1260
gtgcgccagc ccgtacaagt gcacctactc taacccttgt aagttttct gaaattctgt    1320
tttcttttct ctttgtatct cttccttttt catgattaca ttggattgtt gctgacgata   1380
tctccacata gggtattccc agtgcctgta a                                  1411
```

```
SEQ ID NO: 53           moltype = AA  length = 388
FEATURE                 Location/Qualifiers
source                  1..388
                        mol_type = protein
                        organism = Acrophialophora fusispora
SEQUENCE: 53
MKFSKSDLGA AVAFLASAVP LAEAACSLPS SYRWASTGPL ANPKSGWYSL KDFTHVPYNG    60
KHLVYASNYA GSAYGSMNFG LFSNWSDMAS ASQNSMNAAA VAPTLFYFAP KNIWVLASQW   120
GATPFFYRTS TDPTNPNSWS SNQPLFTGSI SDSSTGPIDQ TLIGDANYMY LFFAGDNGKI   180
YRSRMPIGNF PGSFGSSYEV ILSGSRNDFF EAVQVYTVTG QSSPLYLMII ESIGSRGRYF   240
RSYTATNLGG SWSPQATSES SPFAGAANSG ATWTNDISHG DLIRSGPDQT MPIDPCNLQL   300
LYQGLVGTNS DYNKLPYRPG LLTLQNPVGG GGTPTTTTSK PPATTTSTGG GGTAPQYAQC   360
GGQGYTGPTV CASPYKCTYS NPWYSQCL                                     388
```

```
SEQ ID NO: 54           moltype = AA  length = 364
FEATURE                 Location/Qualifiers
source                  1..364
                        mol_type = protein
                        organism = Acrophialophora fusispora
SEQUENCE: 54
ACSLPSSYRW ASTGPLANPK SGWYSLKDFT HVPYNGKHLV YASNYAGSAY GSMNFGLFSN    60
WSDMASASQN SMNAAAVAPT LFYFAPKNIW VLASQWGATP FFYRTSTDPT NPNSWSSNQP   120
LFTGSISDSS TGPIDQTLIG DANYMYLFFA GDNGKIYRSR MPIGNFPGSF GSSYEVILSG   180
SRNDFFEAVQ VYTVTGQSSP LYLMIIESIG SRGRYFRSYT ATNLGGSWSP QATSESSPFA   240
GAANSGATWT NDISHGDLIR SGPDQTMPID PCNLQLLYQG LVGTNSDYNK LPYRPGLLTL   300
QNPVGGGGTP TTTTSKPPAT TTSTGGGGTA PQYAQCGGQG YTGPTVCASP YKCTYSNPWY   360
SQCL                                                               364
```

```
SEQ ID NO: 55           moltype = DNA  length = 1438
FEATURE                 Location/Qualifiers
misc_feature            1..1438
                        note = Expression construct
sig_peptide             1..72
mat_peptide             73..1438
source                  1..1438
                        mol_type = other DNA
                        organism = synthetic construct
CDS                     1..318
CDS                     470..1298
CDS                     1392..1435
SEQUENCE: 55
atgaagttct ccaaatcgga tctcggcgct gccgtcgcct tcctggcttc ggccgtccct    60
ctcgctgaag ccgcgtgctc cttgccgtcc agctaccgct gggcaagcac cgggccattg   120
gccaacccca gtcaggctg gtacagtctc aaggacttta tcatgtccc ttacaacggc    180
aagcacttgg tctatgcgtc aaactatgcc ggatccgcct acggctcgct gaacttcggc   240
ctcttctcca actggtccga catggcctcg gcgagtcaaa actctatgaa tgccgccgcc   300
gtcgcaccca ccctgtttgt aagtcagacc tttgccgctt tgctctatcc ttaaagcctt   360
aagggggttgt cattcctctg accctgtttt ccgttaaact gctcggacaa caacccccct   420
tccccccaac tctccttccc cgaaaaacac atgactgaca gctgggcagt actttgcacc   480
taagaatatc tgggtacttg catcgcagtg gggagctcct cccttcttct accgcacgtc   540
gaccgaccct acgaatccca acagctggtc gtcgaaccag ccgctgttca ccggctccat   600
ctcggactca tccactgggc ccatcgacca cgctcatt ggtgatgcca actacatgta    660
tctcttcttt gcgggcgaca acggcaagat ttaccgctct cggatgccca tcggaaactt    720
cccgggcagc tttggctcat cctacgaagt catcctgagc ggctcgagga acgatttctt    780
cgaggcggtc caggtctaca ccgtgacagg ccaaagctcg ccgctgtacc tcatgatcat    840
cgagagcatc ggtagcagag gccggtactt ccgctcctac acggccacca acctcggggg    900
ctcgtggtct ccgcaggcca cgagcgagag ctcgccgttt gccggggccg cgaacagcgg    960
cgcgacctgg accaacgaca tcagccacgg cgacctgatc cgtagcggtc ccgaccagac   1020
tatgcctatc gacccgtgca acctgcagct gctgtaccag ggcctggtcg gcaccaactc   1080
cgactacaac aagctgccct accggcccgg cctcctgacg ctgcagaacc ctgtgggcgg   1140
cggtggcact ccgaccacga ccacgagcaa gccgcccgcg acgacgacgt ccaccggcgg   1200
tggtggcacc gctcctcagt atgctcagtg cggcggtcag ggatacaccg gcccgacggt   1260
gtgcgccagc ccgtacaagt gcacctactc taacccttgt aagttttct gaaattctgt    1320
tttcttttct ctttgtatct cttccttttt catgattaca ttggattgtt gctgacgata   1380
tctccacata gggtattccc agtgcctgac gcgtgcgcat caccatcacc atcactaa    1438
```

```
SEQ ID NO: 56            moltype = AA  length = 397
FEATURE                  Location/Qualifiers
REGION                   1..397
                         note = Synthetic Construct
source                   1..397
                         mol_type = protein
                         organism = synthetic construct
SEQUENCE: 56
MKFSKSDLGA AVAFLASAVP LAEAACSLPS SYRWASTGPL ANPKSGWYSL KDFTHVPYNG    60
KHLVYASNYA GSAYGSMNFG LFSNWSDMAS ASQNSMNAAA VAPTLFYFAP KNIWVLASQW   120
GATPFFYRTS TDPTNPNSWS SNQPLFTGSI SDSSTGPIDQ TLIGDANYMY LFFAGDNGKI   180
YRSRMPIGNF PGSFGSSYEV ILSGSRNDFF EAVQVYTVTG QSSPLYLMII ESIGSRGRYF   240
RSYTATNLGG SWSPQATSES SPFAGAANSG ATWTNDISHG DLIRSGPDQT MPIDPCNLQL   300
LYQGLVGTNS DYNKLPYRPG LLTLQNPVGG GGTPTTTTSK PPATTTSTGG GGTAPQYAQC   360
GGQGYTGPTV CASPYKCTYS NPWYSQCLTR AHHHHHH                           397

SEQ ID NO: 57            moltype = AA  length = 373
FEATURE                  Location/Qualifiers
REGION                   1..373
                         note = Mature sequence with His-tag
source                   1..373
                         mol_type = protein
                         organism = synthetic construct
SEQUENCE: 57
ACSLPSSYRW ASTGPLANPK SGWYSLKDFT HVPYNGKHLV YASNYAGSAY GSMNFGLFSN    60
WSDMASASQN SMNAAAVAPT LFYFAPKNIW VLASQWGATP FFYRTSTDPT NPNSWSSNQP   120
LFTGSISDSS TGPIDQTLIG DANYMYLFFA GDNGKIYRSR MPIGNFPGSF GSSYEVILSG   180
SRNDFFEAVQ VYTVTGQSSP LYLMIIESIG SRGRYFRSYT ATNLGGSWSP QATSESSPFA   240
GAANSGATWT NDISHGDLIR SGPDQTMPID PCNLQLLYQG LVGTNSDYNK LPYRPGLLTL   300
QNPVGGGGTP TTTTSKPPAT TTSTGGGGTA PQYAQCGGQG YTGPTVCASP YKCTYSNPWY   360
SQCLTRAHHH HHH                                                     373

SEQ ID NO: 58            moltype = DNA  length = 1404
FEATURE                  Location/Qualifiers
sig_peptide              1..93
mat_peptide              94..1401
source                   1..1404
                         mol_type = other DNA
                         organism = Streptosporangium sp-60756
CDS                      1..1401
SEQUENCE: 58
atgaaaatcc cccgtctccg gctctggctc tccgccgggg tcgccgccgc ggtcggcgtg    60
gtcggcacgg tcggcgcggt gaccgcaccg gccgccggcg ccgccgcggg atgccgcgtg   120
gactacacgg tgagcaacca gtggccgggc ggcttcggcg cgaacgtgaa catcaccaac   180
ctcggcgacc ccatcaacgg ctggcgcctg acctggtcgt tccccgcggg gcagaccatc   240
acccagctgt ggagcggctc ccacacccag tccggctccc aggtcaccgt gaccaacgtg   300
gactacaacg ccggcctccc caccgggggc agcgcgaact tcgggttcaa cggctccttc   360
aacggcagca acccggcacc gacgagcttc gccctcaacg gtgtgacctg caccggcggc   420
gtgaccgctt cgcccagccc gtccaccagc ccctcgaccg gccgtcgcc gtcgtccacg   480
ccgacgtcgc ccggcacctg cgctcttccg tcgacgtacg gctggacgtc gacgggcccg   540
ctggcgaacc cgaagtcggg gtgggtctcg ctcaaggact tcaccaacgt cgtccacaac   600
ggcaagcacc tcgtctacgc cacgacgcac gacacgggga cgagctgggg ctcgatgaac   660
ttcagccccct tcacgaactg gtccgacatg gcctcggccg ccagaacaa gatgaacttc   720
tccaccgtcg cgcccacgct cttctacttc gccccgaaga acatctggtc gctggcctac   780
cagtggggcg ggaccgcctt tcctacccgg acctccagtg acccccaccaa cgccaacggc   840
tggtcggcgc agcagaccct cttcaccgga agcatctccg gctccggaac cgggcccatc   900
gaccagacgc tcatcggcga cggcaccaac atgtacctgt tcttcgccgg ggacaacggc   960
aagatctacc gggccagcat gccgatcggg aacttccccgg gcagcttcgg ctcgaactac  1020
acgacgatca tgagcgacac gaacaacaac ctgttcgaag gggtcgaggt ctacaagtc   1080
cagggggcaga acaagtacct catgctcgtc gaggcgatcg gctcgcaggg tcgctacttc  1140
cgctcgttca cggccaccag cctggacggc acatggacac cccaggccgc gaccgagggc  1200
aacccccttcg ccggcaaggc caacagcggc gccacctgga ccaacgacat cagccacggc  1260
gatctggtcc gcagcaaccc cgaccagacc aagaccgtcg acccctgcaa cctgcaactg  1320
ctctaccagg gccgcagccc caactccggt ggcgactacg gcctgctgcc ctaccggccg  1380
ggggtgctga cactgcagcg ctga                                          1404

SEQ ID NO: 59            moltype = AA  length = 467
FEATURE                  Location/Qualifiers
source                   1..467
                         mol_type = protein
                         organism = Streptosporangium sp-60756
SEQUENCE: 59
MKIPRLRLWL SAGVAAAVGV VGTVGAVTAP AAGAAAGCRV DYTVSNQWPG GFGANVNITN    60
LGDPINGWRL TWSFPAGQTI TQLWSGSHTQ SGSQVTVTNV DYNAGLPTGG SANFGFNGSF   120
NGSNPAPTSF ALNGVTCTGG VTASPSPSTS PSTGPSPSST PTSPGTCALP STYRWTSTGP   180
LANPKSGWVS LKDFTNVVHN GKHLVYATTH DTGTSWGSMN FSPFTNWSDM ASAGQNKMNF   240
STVAPTLFYF APKNIWVLAY QWGGTAFSYR TSSDPTNANG WSAQQTLFTG SISGSGTGPI   300
DQTLIGDGTN MYLFFAGDNG KIYRASMPIG NFPGSFGSNY TTIMSDTTNN LFEGVEVYKL   360
```

```
QGQNKYLMLV EAIGSQGRYF RSFTATSLDG TWTPQAATEG NPPFAGKANSG ATWTNDISHG    420
DLVRSNPDQT KTVDPCNLQL LYQGRSPNSG GDYGLLPYRP GVLTLQR                  467

SEQ ID NO: 60           moltype = AA  length = 436
FEATURE                 Location/Qualifiers
source                  1..436
                        mol_type = protein
                        organism = Streptosporangium sp-60756
SEQUENCE: 60
AGAAAGCRVD YTVSNQWPGG FGANVNITNL GDPINGWRLT WSFPAGQTIT QLWSGSHTQS     60
GSQVTVTNVD YNAGLPTGGS ANFGFNGSFN GSNPAPTSFA LNGVTCTGGV TASPSPSTSP    120
STGPSPSSTP TSPGTCALPS TYRWTSTGPL ANPKSGWVSL KDFTNVVHNG KHLVYATTHD    180
TGTSWGSMNF SPFTNWSDMA SAGQNKMNFS TVAPTLFYFA PKNIWVLAYQ WGGTAFSYRT    240
SSDPTNANGW SAQQTLFTGS ISGSGTGPID QTLIGDGTNM YLFFAGDNGK IYRASMPIGN    300
FPGSFGSNYT TIMSDTTNNL FEGVEVYKLQ GQNKYLMLVE AIGSQGRYFR SFTATSLDGT    360
WTPQAATEGN PFAGKANSGA TWTNDISHGD LVRSNPDQTK TVDPCNLQLL YQGRSPNSGG    420
DYGLLPYRPG VLTLQR                                                   436

SEQ ID NO: 61           moltype = DNA  length = 1416
FEATURE                 Location/Qualifiers
misc_feature            1..1416
                        note = Expression construct
sig_peptide             1..81
mat_peptide             82..1413
source                  1..1416
                        mol_type = other DNA
                        organism = synthetic construct
CDS                     1..1413
SEQUENCE: 61
atgaagaaac cgtttgggga aattgtcgca agcaccgcac tactcatttc tgttgctttt     60
agttcatcga tagcatcagc acatcatcat caccatcatc ctagggccgg cgccgccgcc    120
ggatgccgcg tggactacac ggtgagcaac cagtggccgg cgggcttcgg cgcgaacgtg    180
aacatcacca acctcggcga ccccatcaac ggctggcgcc tgacctggtc gttcccgcg     240
gggcagacca tcacccagct gtggagcggc tcccacaccc agtccggctc ccaggtcacg    300
gtgaccaacg tggactacaa cgccggcctc cccaccgggg gcagcgccaa cttcggtttc    360
aacggctcct tcaacggcag caaccccgca ccgacgagct cgccctcaa cggtgtgacc    420
tgcaccggcg gcgtgaccgc ttcgcccagc cgtccacca gccctcgac cggccgtcg     480
ccgtcgtcca cgccgacgtc gccggcacc tgcgctcttc cgtcgacgta ccgctggacg    540
tcgacgggcc cgctggcgaa cccgaagtcg gggtgggtct cgctcaagga cttcaccaac    600
gtcgtccaca acggcaagca cctcgtctac gccacgacgc acgacacggg gacgagctgg    660
ggctcgatga acttcagccc cttcacgaac tggtccgaca tggcctcggc cggcagaac     720
aagatgaact tctccaccgt cgcgcccacg ctcttctact tcgccccgaa gaacatctgg    780
gtgctggcct accagtgggg cgggaccgcc ttctcctcag ctaccccagc tgaccccacc    840
aacgccaacg gctggtcggc gcagcagacc ctcttcaccg gaagcatctc cggctccgga    900
accgggccca tcgaccagac gctcatcggc gacggcacca acatgtacct gttcttcgcc    960
gggggacaac gcaagatcta ccgggccagc atgccgatcg gaacttccc gggcagcttc    1020
ggctcgaact acacgacgat catgagcgac acgacgaaca acctgttcga aggggtcgag    1080
gtctacaagc tccaggggca gaacaagtac ctcatgctcg tcgaggcgat cggctcgcag    1140
ggtcgctact ccgctcgtt cacggccacc agcctggacg gcacatggac ccccaggcc     1200
gcgaccgagg gcaaccctt cgccggcaag gccaacagcg cgccacctg gaccaacgac    1260
atcagcacg gcgatctggt ccgcagcaac ccgaccagc caagaccgt cgaccctgc      1320
aacctgcaac tgctctacca gggccgcagc cccaactccg gtggcgacta cggcctgctg    1380
cctaccggc cgggggtgct gacactgcag cgctga                              1416

SEQ ID NO: 62           moltype = AA  length = 471
FEATURE                 Location/Qualifiers
REGION                  1..471
                        note = Synthetic Construct
source                  1..471
                        mol_type = protein
                        organism = synthetic construct
SEQUENCE: 62
MKKPLGKIVA STALLISVAF SSSIASAHHH HHHPRAGAAA GCRVDYTVSN QWPGGFGANV     60
NITNLGDPIN GWRLTWSFPA GQTITQLWSG SHTQSGSQVT VTNVDYNAGL PTGGSANFGF    120
NGSFNGSNPA PTSFALNGVT CTGGVTASPS PSTSPSTGPS PSSTPTSPGT CALPSTYRWT    180
STGPLANPKS GWVSLKDFTN VVHNGKHLVY ATTHDTGTSW GSMNFSPFTN WSDMASAGQN    240
KMNFSTVAPT LFYFAPKNIW VLAYQWGGTA FSYRTSSDPT NANGWSAQQT LFTGSISGSG    300
TGPIDQTLIG DGTNMYLFFA GDNGKIYRAS MPIGNFPGSF GSNYTTIMSD TTNNLFEGVE    360
VYKLQGQNKY LMLVEAIGSQ GRYFRSFTAT SLDGTWTPQA ATEGNPFAGK ANSGATWTND    420
ISHGDLVRSN PDQTKTVDPC NLQLLYQGRS PNSGGDYGLL PYRPGVLTLQ R             471

SEQ ID NO: 63           moltype = AA  length = 444
FEATURE                 Location/Qualifiers
REGION                  1..444
                        note = Mature sequence with His-tag
source                  1..444
                        mol_type = protein
                        organism = synthetic construct
SEQUENCE: 63
```

-continued

```
HHHHHHPRAG AAAGCRVDYT VSNQWPGGFG ANVNITNLGD PINGWRLTWS FPAGQTITQL   60
WSGSHTQSGS QVTVTNVDYN AGLPTGGSAN FGFNGSFNGS NPAPTSFALN GVTCTGGVTA  120
SPSPSTSPST GPSPSSTPTS PGTCALPSTY RWTSTGPLAN PKSGWVSLKD FTNVVHNGKH  180
LVYATTHDTG TSWGSMNFSP FTNWSDMASA GQNKMNFSTV APTLFYFAPK NIWVLAYQWG  240
GTAFSYRTSS DPTNANGWSA QQTLFTGSIS GSGTGPIDQT LIGDGTNMYL FFAGDNGKIY  300
RASMPIGNFP GSFGSNYTTI MSDTTNNLFE GVEVYKLQGQ NKYLMLVEAI GSQGRYFRSF  360
TATSLDGTWT PQAATEGNPF AGKANSGATW TNDISHGDLV RSNPDQTKTV DPCNLQLLYQ  420
GRSPNSGGDY GLLPYRPGVL TLQR                                        444

SEQ ID NO: 64           moltype = DNA  length = 1328
FEATURE                 Location/Qualifiers
sig_peptide             1..57
mat_peptide             58..1325
source                  1..1328
                        mol_type = other DNA
                        organism = Acrophialophora fusispora
CDS                     1..330
CDS                     403..655
CDS                     795..948
CDS                     1100..1325
SEQUENCE: 64
atgaagcttc tcaactcggg tatcagcctg ctggcattgg cagtgggcgt cacggcgcag   60
tgccccttgc cctccaccta ccgctggaaa tcgacagggg tgcttgccaa cccaaagtcc  120
ggatgggtgt ccctcaaaga ctttaccgtc gcgccgtaca acggcaagca tctcgtctac  180
gctacgaccc acgacacggg atcgagctgg ggctccatga acttcggcct gttcagcagc  240
tggtccgaca tggccacggc cccccagaat gggatgaacc aggcactgt tgcgcccaac  300
ctgttctact tcaagccgaa ggatatctgg gtacgtaatt gcatcccaga ctttctttcgt  360
ttcccttcac gatgccatac tcgcgagatt cccgtctca aggtgctcgc gtatcaatgg  420
ggcccgacga ccttctccta caagacatca aaggaccccca ccaatgcgaa cggctggggg  480
tcggccgcag ccctcttctc ggggaaaatc tcgggctctt ccaccggcgc cattgaccag  540
accgtcattg gcgatgacac caacatgtac ctcttcttcg ccggcgacaa cggcaagatc  600
taccgcgcca gcatgcccat cgacaggttc cccggcagct tcggcgacca gtaccgtacg  660
tccaatccga gttgttcatt ccccttttcta actgtctcgt gtgccctggg agtcgtgtgg  720
cctcttgaga ggcttgtttg ccactctcga gacacccaca aaataggcat ccaatgactg  780
acatagctgg gcagagacca tcctgagcga tagcaccaac aacttgttcg aggccgtcca  840
ggtctacaag ctccagggct tgaacaagta tctgatgatt gtcgaggcca ttggcagcaa  900
cgggcgctac ttccgctctt tcacggctga caggttggac gggcagtggt acgtctatcc  960
gctctccttt ccccccctttt taagcgactc tcatagtctc ggcgtcacct tccccgcaag 1020
gcgactccgc tcctcccaaa ccgccctcc tcagcaaccc aagtaccgta agggttttct 1080
gactttaatt cttgcacagg acccccagg cagccaccga gagcaatcct ttcgcgggca 1140
aggcaaacag cggagcgacc tggaccaacg atatcgccca cggcgagctg atccgcgtga 1200
gcgccgacca gacctttaca gtcgacccgt gcaacctgca gctgctctac caggggccgct 1260
ccccagctc gggcggcgac tacggggaagc tgccgtaccg gccggggctg ttgacgctgc 1320
agcgttaa                                                         1328

SEQ ID NO: 65           moltype = AA  length = 321
FEATURE                 Location/Qualifiers
source                  1..321
                        mol_type = protein
                        organism = Acrophialophora fusispora
SEQUENCE: 65
MKLLNSGISL LALAVGVTAQ CPLPSTYRWK STGVLANPKS GWVSLKDFTV APYNGKHLVY   60
ATTHDTGSSW GSMNFGLFSS WSDMATAPQN GMNQGTVAPT LFYFKPKDIW VLAYQWGPTT  120
FSYKTSKDPT NANGWGSAQT LFSGKISGSS TGAIDQTVIG DDTNMYLFFA GDNGKIYRAS  180
MPIDRFPGSF GDQYQTILSD STNNLFEAVQ VYKLQGLNKY LMIVEAIGSN GRYFRSFTAD  240
RLDGQWTPQA ATESNPFAGK ANSGATWTND ISHGELIRVS ADQTFTVDPC NLQLLYQGRS  300
PSSGGDYGKL PYRPGLLTLQ R                                           321

SEQ ID NO: 66           moltype = AA  length = 302
FEATURE                 Location/Qualifiers
source                  1..302
                        mol_type = protein
                        organism = Acrophialophora fusispora
SEQUENCE: 66
QCPLPSTYRW KSTGVLANPK SGWVSLKDFT VAPYNGKHLV YATTHDTGSS WGSMNFGLFS   60
SWSDMATAPQ NGMNQGTVAP TLFYFKPKDI WVLAYQWGPT TFSYKTSKDP TNANGWGSAQ  120
TLFSGKISGS STGAIDQTVI GDDTNMYLFF AGDNGKIYRA SMPIDRFPGS FGDQYQTILS  180
DSTNNLFEAV QVYKLQGLNK YLMIVEAIGS NGRYFRSFTA DRLDGQWTPQ AATESNPFAG  240
KANSGATWTN DISHGELIRV SADQTFTVDP CNLQLLYQGR SPSSGGDYGK LPYRPGLLTL  300
QR                                                                302

SEQ ID NO: 67           moltype = DNA  length = 1355
FEATURE                 Location/Qualifiers
misc_feature            1..1355
                        note = Expression construct
sig_peptide             1..57
mat_peptide             58..1352
source                  1..1355
                        mol_type = other DNA
```

```
                        organism = synthetic construct
CDS                     1..330
CDS                     403..655
CDS                     795..948
CDS                     1100..1352
SEQUENCE: 67
atgaagcttc tcaactcggg tatcagcctg ctggcattgg cagtgggcgt cacggcgcag    60
tgccccttgc cctccaccta ccgctggaaa tcgacagggg tgcttgccaa cccaaagtcc   120
ggatgggtgt ccctcaaaga ctttaccgtc gcgccgtaca acggcaagca tctcgtctac   180
gctacgaccc acgacacggg atcgagctgg ggctccatga acttcggcct gttcagcagc   240
tggtccgaca tggccacggc ccccagaat gggatgaacc agggcactgt tgcgcccacc   300
ctgttctact tcaagccgaa ggatatctgg gtacgtaatt gcatcccaga cttctttcgt   360
ttcccttcac gatgccatac tcgcgagatt ccccgtctca aggtgctcgc gtatcaatgg   420
ggcccgacca ccttctccta caagacatca aaggacccca ccaatgcgaa cggctgggga   480
tcggcgcaga ccctcttctc ggggaaaatc tcgggctctt ccaccggcgc cattgaccag   540
accgtcattg gcgatgacac caacatgtac ctcttcttcg ccggcgacaa cggcaagatc   600
taccgcgcca gcatgcccat cgacaggttc cccggcagct cggcgacca gtaccgtacg   660
tccaatccga gttgttcatt ccctttcta actgtctcgt gtgccctggg agtcgtgtgg   720
cctcttgaga ggcttgtttg ccactctcga cacccacaa aataggcat ccaatgactg    780
acatagctgg gcagagacca tcctgagcga tagcaccaac aacttgttcg aggccgtcca   840
ggtctacaag ctccagggct tgaacaagta tctgatgatt gtcgaggcca ttggcagcaa   900
cgggcgctac ttccgctctt tcacggctga caggttggac gggcagtgat acgtctatcc   960
gctctcctt cccccccttt taagcgactc tcatagtctc ggcgtcacct tccccgcaag  1020
gcgactccgc tcctcccaaa ccgccctcc tcagcaaccc aagtaccgta agggttttct   1080
gactttaatt cttgcacagg acccccagg cagccaccga gagcaatcct ttcgcgggca   1140
aggcaaaacag cggagcgacc tggaccaacg atatcgagctg atccgcgtga   1200
gcgccgacca gacctttaca gtcgacccgt gcaacctgca gctgctctac cagggccgct   1260
cccccagctc gggcggcgac tacgggaagc tgccgtaccg gccggggctg ttgacgctgc   1320
agcgtacgcg tgcgcatcac catcaccatc actaa                             1355

SEQ ID NO: 68           moltype = AA  length = 330
FEATURE                 Location/Qualifiers
REGION                  1..330
                        note = Synthetic Construct
source                  1..330
                        mol_type = protein
                        organism = synthetic construct
SEQUENCE: 68
MKLLNSGISL LALAVGVTAQ CPLPSTYRWK STGVLANPKS GWVSLKDFTV APYNGKHLVY     60
ATTHDTGSSW GSMNFGLFSS WSDMATAPQN GMNQGTVAPT LFYFKPKDIW VLAYQWGPTT   120
FSYKTSKDPT NANGWGSAQT LFSGKISGSS TGAIDQTVIG DDTNMYLFFA GDNGKIYRAS   180
MPIDRFPGSF GDQYQTILSD STNNLFEAVQ VYKLQGLNKY LMIVEAIGSN GRYFRSFTAD   240
RLDGQWTPQA ATESNPFAGK ANSGATWTND ISHGELIRVS ADQTFTVDPC NLQLLYQGRS   300
PSSGGDYGKL PYRPGLLTLQ RTRAHHHHHH                                    330

SEQ ID NO: 69           moltype = AA  length = 311
FEATURE                 Location/Qualifiers
REGION                  1..311
                        note = Mature sequence with His tag
source                  1..311
                        mol_type = protein
                        organism = synthetic construct
SEQUENCE: 69
QCPLPSTYRW KSTGVLANPK SGWVSLKDFT VAPYNGKHLV YATTHDTGSS WGSMNFGLFS     60
SWSDMATAPQ NGMNQGTVAP TLFYFKPKDI WVLAYQWGPT TFSYKTSKDP TNANGWGSAQ   120
TLFSGKISGS STGAIDQTVI GDDTNMYLFF AGDNGKIYRA SMPIDRFPGS FGDQYQTILS   180
DSTNNLFEAV QVYKLQGLNK YLMIVEAIGS NGRYFRSFTA DRLDGQWTPQ AATESNPFAG   240
KANSGATWTN DISHGELIRV SADQTFTVDP CNLQLLYQGR SPSSGGDYGK LPYRPGLLTL   300
QRTRAHHHHH H                                                       311

SEQ ID NO: 70           moltype = AA  length = 384
FEATURE                 Location/Qualifiers
source                  1..384
                        mol_type = protein
                        organism = Aspergillus aculeatus
SEQUENCE: 70
VGLDQAAVAK GLQYFGTATD NPELTDIPYV TQLNNTADFG QITPGNSMKW DATEPSQGTF     60
TFTKGDVIAD LAEGNGQYLR CHTLVWYNQL PSWVTSGTWT NATLTAALKN HITNVVSHYK   120
GKCLHWDVVN EALNDDGTYR TNIFYTTIGE AYIPIAFAAA AADPDAKLF YNDYNLEYGG    180
AKAASARAIV QLVKNAGAKI DGVGLQAHFS VGTVPSTSSL VSVLQSFTAL GVEVAYTEAD   240
VRILLPTTAT TLAQQSSDFQ ALVQSCVQTT GCVGFTIWDW TDKYSWVPST FSGYGAALPW   300
DENLVKKPAY NGLLAGMGVT VTTTTTTTA TATGKTTTTT TGATSTGTTA AHWGQCGGLN    360
WSGPTACATG YTCTYVNDYY SQCL                                          384

SEQ ID NO: 71           moltype = AA  length = 288
FEATURE                 Location/Qualifiers
source                  1..288
                        mol_type = protein
                        organism = Clostridium acetobutylicum
```

```
SEQUENCE: 71
AMSHSKFVGN IIAGSIPSNF DTYWNQVTPE NATKWGAIEY GRGNYNWGSA DLIYNYARSK     60
NMPFKFHNLV WGSQQLTWLS NLSPQDQKSE VSKWIAAAGQ RYSGSAFVDV VNEPLHTQPS    120
YKNALGGDGS TGYDWIVWSY QQARKAFPNS KLLINEYGII GDPNAAANYV KIINVLKSKG    180
LIDGIGIQCH YFNMDNVSVG TMNYVLNMLS NTGLPIYVSE LDMTGDDSTQ LARYQQKFPV    240
LYQNPNVKGI TLWGYMQGQT WNSGTYLVNS NGTERPALKW LRSYLASH                 288

SEQ ID NO: 72          moltype = AA  length = 308
FEATURE                Location/Qualifiers
source                 1..308
                       mol_type = protein
                       organism = Aspergillus aculeatus
SEQUENCE: 72
NPIEPRQASV SIDAKFKAHG KKYLGTIGDQ YTLNKNAKTP AIIKADFGQL TPENSMKWDA     60
TEPNRGQFSF SGSDYLVNFA QSNGKLIRGH TLVWHSQLPS WVQSISDKNT LIQVMQNHIT    120
TVMQRYKGKV YAWDVVNEIF NEDGSLCQSH FYNVIGEDYV RIAFETARAV DPNAKLYIND    180
YNLDSASYPK LTGLVNHVKK WVAAGVPIDG IGSQTHLSAG AGAAVSGALN ALAGAGTKEV    240
AITELDIAGA SSTDYVNVVK ACLNQPKCVG ITVWGSSDPD SWRSSSSPLL FDSNYNPKAA    300
YTAIANAL                                                             308

SEQ ID NO: 73          moltype = AA  length = 195
FEATURE                Location/Qualifiers
source                 1..195
                       mol_type = protein
                       organism = Thermomyces lanuginosus
SEQUENCE: 73
RQTTPNSEGW HDGYYYSWWS DGGAQATYTN LEGGTYEISW GDGGNLVGGK GWNPGLNARA     60
IHFEGVYQPN GNSYLAVYGW TRNPLVEYYI VENFGTYDPS SGATDLGTVE CDGSIYRLGK    120
TTRVNAPSID GTQTFDQYWS VRQDKRTSGT VQTGCHFDAW ARAGLNVNGD HYYQIVATEG    180
YFSSGYARIT VADVG                                                     195

SEQ ID NO: 74          moltype = AA  length = 203
FEATURE                Location/Qualifiers
source                 1..203
                       mol_type = protein
                       organism = Dictyoglomus thermophilum
SEQUENCE: 74
QTSITLTSNA SGTFDGYYYE LWKDTGNTTM TVYTQGRFSC QWSNINNALF RTGKKYNQNW     60
QSLGTIRITY SATYNPNGNS YLCIYGWSTN PLVEFYIVES WGNWRPPGAT SLGQVTIDGG    120
TYDIYRTTRV NQPSIVGTAT FDQYWSVRTS KRTSGTVTVT DHFRAWANRG LNLGTIDQIT    180
LCVEGYQSSG SANITQNTFS QGS                                            203

SEQ ID NO: 75          moltype = AA  length = 182
FEATURE                Location/Qualifiers
source                 1..182
                       mol_type = protein
                       organism = Paenibacillus Pabuli
SEQUENCE: 75
TDYWQNWTDG GGTVNAVNGS GGNYSVNWQN TGNFVVGKGW TYGTPNRVVN YNAGVFSPSG     60
NGYLTFYGWT RNALIEYYV DNWGTYRPTG TYKGTVTSDG GTYDIYTTMR YNQPSIDGYS    120
TFPQYWSVRQ SKRPIGVNSQ ITFQNHVNAW ASKGMYLGNS WSYQVMATEG YQSSGSSNVT    180
VW                                                                   182

SEQ ID NO: 76          moltype = DNA  length = 633
FEATURE                Location/Qualifiers
sig_peptide            1..81
mat_peptide            82..633
source                 1..633
                       mol_type = genomic DNA
                       organism = Geobacillus stearothermophilus
CDS                    1..630
SEQUENCE: 76
atgaagttaa agaagaagat gcttactcta ctcctgacgg cttcgatgag tttcggttta     60
tttggggcaa cctcaagtgc agcaacggat tattggcaat attggacgga tggcggcggg    120
atggtgaatg cggttaatgg gcccggaggc aattacagtg ttacctggca aaataccggg    180
aacttcgtgg tcggcaaagg ctggacggtt ggatcgccga tcgggtgat caactacaat    240
gcgggcatct gggaaccttc ggggaacggg tacttaaccc tttacggatg gacgaggaac    300
gcgctgatcg agtattacgt tgtggacagc tggggacgt accggcctac cggcaattac    360
aagggaacgg tgaacagcga cggaggaact tacgatattt atacgaccat gcgttataat    420
gcaccttcca ttgatggcac gcagacgttc caacagttct ggagtgtgcg caatcgaaa    480
cgacctaccg gcagcaacgt atccatcacc ttcagcaatc acgtgaatgc ctggagaagc    540
aagggcatga acctgggcag cagctgggct tatcaggttc tggcgacgga aggctatcag    600
agcagcggaa gatccaacgt tacggtttgg taa                                 633

SEQ ID NO: 77          moltype = AA  length = 210
FEATURE                Location/Qualifiers
source                 1..210
                       mol_type = protein
                       organism = Geobacillus stearothermophilus
```

```
SEQUENCE: 77
MKLKKKMLTL LLTASMSFGL FGATSSAATD YWQYWTDGGG MVNAVNGPGG NYSVTWQNTG   60
NFVVGKGWTV GSPNRVINYN AGIWEPSGNG YLTLYGWTRN ALIEYYVVDS WGTYRPTGNY  120
KGTVNSDGGT YDIYTTMRYN APSIDGTQTF QQFWSVRQSK RPTGSNVSIT FSNHVNAWRS  180
KGMNLGSSWA YQVLATEGYQ SSGRSNVTVW                                   210

SEQ ID NO: 78           moltype = AA  length = 183
FEATURE                 Location/Qualifiers
source                  1..183
                        mol_type = protein
                        organism = Geobacillus stearothermophilus
SEQUENCE: 78
ATDYWQYWTD GGGMVNAVNG PGGNYSVTWQ NTGNFVVGKG WTVGSPNRVI NYNAGIWEPS   60
GNGYLTLYGW TRNALIEYYV VDSWGTYRPT GNYKGTVNSD GGTYDIYTTM RYNAPSIDGT  120
QTFQQFWSVR QSKRPTGSNV SITFSNHVNA WRSKGMNLGS SWAYQVLATE GYQSSGRSNV  180
TVW                                                                183

SEQ ID NO: 79           moltype = DNA  length = 627
FEATURE                 Location/Qualifiers
misc_feature            1..627
                        note = Synthetic construct
sig_peptide             1..81
mat_peptide             82..624
source                  1..627
                        mol_type = other DNA
                        organism = synthetic construct
CDS                     1..624
SEQUENCE: 79
atgaagaaac cgttggggaa aattgtcgca agcaccgcac tactcatttc tgttgctttt   60
agttcatcga tcgcatcggc tgactattgg caatactgga cagatggtgg cggtatggtt  120
aacgctgtta acggtcctgg aggcaactat tctgttactt ggcagaacac aggcaacttc  180
gttgttggca aaggatggac ggttggttct cctaaccgcg ttatcaacta caacgctggc  240
atctgggagc cttctggcaa cggttacctt acgctttacg gctggacacg caacgctctt  300
atcgagtact atgttgttga ctcttggggc acttatcgcc ctacgggcaa ctacaaaggc  360
acggtaaact ctgatggtgg cacgtacgac atctataca aatgcgcta caacgctcct   420
tctatcgacg gcactcagac ttttcaacag ttttggtcag ttcgccaatc taaacgccct  480
acaggctcta acgtttctat cacattctct aaccatgtta acgcttggcg ctctaaaggc  540
atgaaccttg gcagctcatg gcttatcaa gtacttgcaa ctgagggcta ccaatcttct  600
ggacgctcta acgttacagt atggtaa                                      627

SEQ ID NO: 80           moltype = AA  length = 208
FEATURE                 Location/Qualifiers
REGION                  1..208
                        note = Synthetic Construct
source                  1..208
                        mol_type = protein
                        organism = synthetic construct
SEQUENCE: 80
MKKPLGKIVA STALLISVAF SSSIASADYW QYWTDGGGMV NAVNGPGGNY SVTWQNTGNF   60
VVGKGWTVGS PNRVINYNAG IWEPSGNGYL TLYGWTRNAL IEYYVVDSWG TYRPTGNYKG  120
TVNSDGGTYD IYTTMRYNAP SIDGTQTFQQ FWSVRQSKRP TGSNVSITFS NHVNAWRSKG  180
MNLGSSWAYQ VLATEGYQSS GRSNVTVW                                     208

SEQ ID NO: 81           moltype = AA  length = 181
FEATURE                 Location/Qualifiers
REGION                  1..181
                        note = Mature sequence
source                  1..181
                        mol_type = protein
                        organism = synthetic construct
SEQUENCE: 81
DYWQYWTDGG GMVNAVNGPG GNYSVTWQNT GNFVVGKGWT VGSPNRVINY NAGIWEPSGN   60
GYLTLYGWTR NALIEYYVVD SWGTYRPTGN YKGTVNSDGG TYDIYTTMRY NAPSIDGTQT  120
FQQFWSVRQS KRPTGSNVSI TFSNHVNAWR SKGMNLGSSW AYQVLATEGY QSSGRSNVTV  180
W                                                                  181

SEQ ID NO: 82           moltype = DNA  length = 1026
FEATURE                 Location/Qualifiers
sig_peptide             1..126
mat_peptide             127..1023
source                  1..1026
                        mol_type = genomic DNA
                        organism = Streptomyces beijiangensis
CDS                     1..1023
SEQUENCE: 82
atgagcgcac ccgtgccact gccccgcaga cgcagaccccg ccgcttcat gaccctgctg   60
agaagctcct gggcgatcgc cctggccgcg gtcgccgtgc tgctgctgcc caacgccgcc  120
agcgccgaca ccgtcgtcaa ctcgaaccag accggcacca caacggtta ctactactcg   180
cactggagcg atggcggcgg ctcggtgtcg atgacgctgg gctcgggcgg caactacggc  240
```

```
taccagtgga gcaacgtcgg aaacttcgtc ggcggcaagg ggtggagcac cggcggacgc    300
aagtccgtga actactccgg cagtttcaac ccgtcgggca cgcctacctc gcgctctac    360
ggctggacca ccaacccgct ggtcgagtac tacgtcgtcg agaacttcgg cacgtaccgc    420
cccaccggca ccttcaaggg cacggtcacc agcgacggag caacctacga catctatgag    480
acgacccggg tgaaccagcc ctcgatcgag ggcaccaaga ccttcaagca gtactggagc    540
gtccgccagt cgaagcggac gggggggcacc atcaccacgg gcaaccactt cgacgcctga    600
tcgagccacg gcatgagcat gggttccttc aactacatga tcatggcgac cgagggctac    660
cagagcagcg gcagctccaa catcaccgtc agcgagggca gttccggtgg cgggacgggc    720
ggtggcggca cgggcggcgg tacgggcggc ggcggctccg gcggctgcac cgcgacgctt    780
tccgcgggag acaagtggag cgaccgctac aacctgaacg tctccgtctc cggcgccggc    840
aactggaccg tcacgatgaa ggtccccctcg cccgagaagg tgctgtccac ctggaacgtg    900
agcgccgcct acccggacag ccagaccctc gtggccaagt ccaacggcag cggcagcaac    960
tggggggcga ccatccagac caacggctcc tggacgtggc ccacggtcac ctgcagcgcc   1020
ggctga                                                              1026

SEQ ID NO: 83          moltype = AA  length = 341
FEATURE                Location/Qualifiers
source                 1..341
                       mol_type = protein
                       organism = Streptomyces beijiangensis
SEQUENCE: 83
MSAPVPLPRR RRPGRFMTLL RSSWAIALAA VAVLLLPNAA SADTVVNSNQ TGTNNGYYYS     60
HWSDGGGSVS MTLGSGGNYG YQWSNVGNFV GGKGWSTGGR KSVNYSGSFN PSGNAYLALY    120
GWTTNPLVEY YVVENFGTYR PTGTFKGTVT SDGGTYDIYE TTRVNQPSIE GTKTFKQYWS    180
VRQSKRTGGT ITTGNHFDAW SSHGMSMGSF NYMIMATEGY QSSGSSNITV SEGSSGGGTG    240
GGGTGGGTGG GGSGGCTATL SAGDKWSDRY NLNVSVSGAG NWTVTMKVPS PEKVLSTWNV    300
SAAYPDSQTL VAKSNGSGSN WGATIQTNGS WTWPTVTCSA G                       341

SEQ ID NO: 84          moltype = AA  length = 299
FEATURE                Location/Qualifiers
source                 1..299
                       mol_type = protein
                       organism = Streptomyces beijiangensis
SEQUENCE: 84
DTVVNSNQTG TNNGYYYSHW SDGGGSVSMT LGSGGNYGYQ WSNVGNFVGG KGWSTGGRKS     60
VNYSGSFNPS GNAYLALYGW TTNPLVEYYV VENFGTYRPT GTFKGTVTSD GGTYDIYETT    120
RVNQPSIEGT KTFKQYWSVR QSKRTGGTIT TGNHFDAWSS HGMSMGSFNY MIMATEGYQS    180
SGGSSNITVSE GSSGGGTGGG GTGGGTGGGG SGGCTATLSA GDKWSDRYNL NVSVSGAGNW    240
TVTMKVPSPE KVLSTWNVSA AYPDSQTLVA KSNGSGSNWG ATIQTNGSWT WPTVTCSAG    299

SEQ ID NO: 85          moltype = DNA  length = 1005
FEATURE                Location/Qualifiers
misc_feature           1..1005
                       note = Expression construct
sig_peptide            1..81
mat_peptide            82..1002
source                 1..1005
                       mol_type = other DNA
                       organism = synthetic construct
CDS                    1..1002
SEQUENCE: 85
atgaagaaac cgttggggaa aattgtcgca agcaccgcac tactcatttc tgttgctttt     60
agttcatcga tagcatcagc acatcatcat caccatcatc ctagggacac cgtcgtcaac    120
tcgaaccaga ccggcaccaa caacggttac tactactcgc actggagcga tggcggcggc    180
tcggtgtcga tgacgctggg ctcggggggc aactacggct accagtggag caacgtcgga    240
aacttcgtcg gcggcaaggg gtggagcacc ggcggacgca agtccgtgaa ctactccggc    300
agtttcaacc cgtcgggcaa cgcctacctc gcgctctacg gctggaccac caacccgctg    360
gtcgagtact acgtcgtcga gaacttcggc acgtaccgcc ccaccggcac cttcaagggc    420
acggtcacca gcgacggagc aacctacgac atctatgaga cgacccgggt gaaccagccc    480
tcgatcgagg gcaccaagac cttcaagcag tactggagcg tccgccagtc gaagcggacg    540
gggggcacca tcaccacggg caaccacttc gacgcctggt cgagccacgg catgagcatg    600
ggttccttca actacatgat catggcgacc gagggctacc agagcagcgg cagctccaac    660
atcaccgtca gcgagggcag ttccggtggc gggacgggcg gtggcggcac gggcggcggt    720
acgggcggcg gcggctccgg cggctgcacc gcgacgcttt ccgcgggaga caagtggagc    780
gaccgctaca acctgaacgt ctccgtctcc ggcgccggca actggaccgt cacgatgaag    840
gtccccctcgc ccgagaaggt gctgtccacc tggaacgtga gcgccgccta cccggacagc    900
cagaccctcg tggccaagtc caacggcagc ggcagcaact ggggggcgac catccagacc    960
aacggctcct ggacgtggcc cacggtcacc tgcagcgccg gctga                 1005

SEQ ID NO: 86          moltype = AA  length = 334
FEATURE                Location/Qualifiers
REGION                 1..334
                       note = Synthetic Construct
source                 1..334
                       mol_type = protein
                       organism = synthetic construct
SEQUENCE: 86
MKKPLGKIVA STALLISVAF SSSIASAHHH HHHPRDTVVN SNQTGTNNGY YYSHWSDGGG     60
SVSMTLGSGG NYGYQWSNVG NFVGGKGWST GGRKSVNYSG SFNPSGNAYL ALYGWTTNPL    120
```

```
VEYYVVENFG TYRPTGTFKG TVTSDGGTYD IYETTRVNQP SIEGTKTFKQ YWSVRQSKRT    180
GGTITTGNHF DAWSSHGMSM GSFNYMIMAT EGYQSSGSSN ITVSEGSSGG GTGGGGTGGG    240
TGGGGSGGCT ATLSAGDKWS DRYNLNVSVS GAGNWTVTMK VPSPEKVLST WNVSAAYPDS    300
QTLVAKSNGS GSNWGATIQT NGSWTWPTVT CSAG                                334

SEQ ID NO: 87              moltype = AA  length = 307
FEATURE                    Location/Qualifiers
REGION                     1..307
                           note = Mature sequence with His-tag
source                     1..307
                           mol_type = protein
                           organism = synthetic construct
SEQUENCE: 87
HHHHHHPRDT VVNSNQTGTN NGYYYSHWSD GGGSVSMTLG SGGNYGYQWS NVGNFVGGKG     60
WSTGGRKSVN YSGSFNPSGN AYLALYGWTT NPLVEYYVVE NFGTYRPTGT FKGTVTSDGG    120
TYDIYETTRV NQPSIEGTKT FKQYWSVRQS KRTGGTITTG NHFDAWSSHG MSMGSFNYMI    180
MATEGYQSSG SSNITVSEGS SGGGTGGGGT GGGTGGGGGS GCTATLSAGD KWSDRYNLNV    240
SVSGAGNWTV TMKVPSPEKV LSTWNVSAAY PDSQTLVAKS NGSGSNWGAT IQTNGSWTWP    300
TVTCSAG                                                              307

SEQ ID NO: 88              moltype = AA  length = 188
FEATURE                    Location/Qualifiers
source                     1..188
                           mol_type = protein
                           organism = Fusarium oxysporum
SEQUENCE: 88
TQPTTGTSGG YYFSFWTDTP NSVTYTNGNG GQFSMQWSGN GNHVGGKGWM PGTSRTIKYS     60
GSYNPNGNSY LAVYGWTRNP LIEYYIVENF GTYNPSSGGQ KKGEVNVDGS VYDIYVSTRV    120
NAPSIDGNKT FQQYWSVRRN KRSSGSVNTG AHFQAWKNVG LNLGTHDYQI LAVEGYYSSG    180
SASMTVSQ                                                             188

SEQ ID NO: 89              moltype = AA  length = 189
FEATURE                    Location/Qualifiers
source                     1..189
                           mol_type = protein
                           organism = Aspergillus clavatus
SEQUENCE: 89
AGTPSSTGWN NGYYYSFWTD NGGTVNYQNG NGGSYSVQWK DTGNFVGGKG WNPGSARTIN     60
YSGSFNPSGN AYLTVYGWTT NPLVEYYIVE NYGTYNPGNG GTYRGSVYSD GANYNIYTAT    120
RYNAPSIEGD KTFTQYWSVR QSKRTGGTVT TANHFNAWAQ LGMSLGTHNY QIVATEGYQS    180
SGSSSITVY                                                            189

SEQ ID NO: 90              moltype = AA  length = 27
FEATURE                    Location/Qualifiers
REGION                     1..27
                           note = Bacillus lentus secretion signal
source                     1..27
                           mol_type = protein
                           organism = synthetic construct
SEQUENCE: 90
MKKPLGKIVA STALLISVAF SSSIASA                                         27

SEQ ID NO: 91              moltype = AA  length = 8
FEATURE                    Location/Qualifiers
REGION                     1..8
                           note = His-tag RHHHHHHP
source                     1..8
                           mol_type = protein
                           organism = synthetic construct
SEQUENCE: 91
RHHHHHHP                                                               8

SEQ ID NO: 92              moltype = AA  length = 8
FEATURE                    Location/Qualifiers
REGION                     1..8
                           note = His-tag HHHHHHPR
source                     1..8
                           mol_type = protein
                           organism = synthetic construct
SEQUENCE: 92
HHHHHHPR                                                               8

SEQ ID NO: 93              moltype = AA  length = 558
FEATURE                    Location/Qualifiers
SIGNAL                     1..18
PEPTIDE                    19..558
source                     1..558
                           mol_type = protein
                           organism = Humicola insolens
```

```
SEQUENCE: 93
MLGLKVLCLS AVVGTAVSVP HAGNLPRQAS TFTNPVLWED HPDLEVFRVG SVFYYSSSTF    60
AYSPGAPVLK SYDLVHWTPV THSVPRLNFG SNYDLPSGTP GAYVKGIWAS TLRYRRSNDR   120
FYWYGCVEGR TYLWTSPGGN ALANNGEVPP SAWNWQHTAT IDNCYYDAGL LIDDDDTMYI   180
AYGNPTINVA QLSPDGTRQV RVQQRVYAHP QGQTVEGARM YKIRGNYYIL VTRPADAEYV   240
LRSTTGSPFG PYEARTLVSR IQGPLANAGF AHQGGIVDAP DGTWHYVAFM DAYPGGRIPV   300
VAPLRWTADG WPEVVTDSQG RWGTSYPIPV RGAKNATEGL ASTDLDEFRG TRFSEHWEWN   360
HNPDTSKFTL LGGNEGGLIL RTATVTGDLF AARNTLTRRI AGPKASGIFR LDVRGMRDGD   420
RAGAVLFRDR AAYIGVWKQG NEARIVMVDD LRLNEDGWRT ASTGRVAANG PVIDTNAQQD   480
IWLRIDADIT PAFGTNTERT TTFYYSIDGG RTYTRLGPAF AMTNSWRYFT GYRFGVFNFS   540
TKSLGGEVKV KGFKMNMI                                                 558

SEQ ID NO: 94           moltype = AA  length = 643
FEATURE                 Location/Qualifiers
SIGNAL                  1..16
PEPTIDE                 17..643
source                  1..643
                        mol_type = protein
                        organism = Meripilus giganteus
SEQUENCE: 94
MKLLFLLGAF VAQCLAVTVT VNKNPSHTVP STLYGLMFED INHSGDGGLY AELLQNRAFQ    60
QVTPNTAAAL AAWHPISNAK LAVIQDPSPV SNALPNSLQF SVPSGSSGRV GFTNEGFWGI   120
KVDSTWTYKA SLFFRFPTSS SFSGALTVGL QTNAGRVLAQ NSTQIRGTTT KWTQINLELH   180
PTASAPDVSN SFFVTIDGAA GAGQTINFAM FSLFPPTFKN RPNGLRADIA ETLAEMGPSF   240
FRFPGGNNLE GQTTATRWQW NATVGSLLDR PGRVGDWGYV NTDGLGLLEY LQFFEDTGME   300
PIMAVWAGYS LGGTSLAENQ LAPYIQQAID QINFVIGDPA KSAPAALRAS LGHPEPFTLR   360
FVEVGNEDFF AAGSYPYRWH DFVTALQAQF PQIRFIATTN AWNPVLSPVP QSYDVHVYQT   420
PTWFYQNAFY YDGFQRNGTT YFEGEYAAIS TNANDLFGTV ADGRLAFPTV QSATGEAAFM   480
TGLERNSDIV FAASYAPLLQ HVNSTQWTPD LVSYDAGSVI KSTSFFAQKL FALNKGDQYL   540
PSTLPTNGGT LHWSITRASS SGKTFIKIAN AGSSAQSLTF QLTQFNSVSS TGTLQVLTGP   600
ETASNTPEAP QAIVPKTSTI GTGKTFTYNA PAFSVSVITV TTN                     643

SEQ ID NO: 95           moltype = DNA  length = 1430
FEATURE                 Location/Qualifiers
source                  1..1430
                        mol_type = genomic DNA
                        organism = Talaroymces leycettanus
SEQUENCE: 95
gccgactact cgggcaccta cggagtgacc accagcggca actccctccg cctcaacttc    60
gtcacccagg cgtcacagaa gaacgtcggc tcccgtcttt acctgatgga gaatgacaca   120
acctaccaga tcttcaagct gctgaaccag gagttcacct tgatgtcga tgtgtccaac    180
ctgccgtaag tgacttacca tgaaccctg acgctatctc cttgttggct cccagctgac    240
tggccaattc aagctgcggc ttgaacggtg ctctctacgt ggtggccatg gacgccgatg   300
gtggcatggc caagtacccc accaacaagg ctggtgccaa gtacggtacc gggtactgcg   360
actcccagtc tccccgcgac ctcaagttca tcaatggcga ggccaacgtc gagggctggc   420
agccgtcgtc caacgatccc aactctggca ttggcaacca cggatcctgc tgcgcggaga   480
tggatatctg ggaggccaac agcatctcca atgctgtcac tccccacccg tgcgacactc   540
ccggccaggt gatgtgcacc ggtaacaact gcgtggcac atacagcact actcgctatg   600
cgggcacttg cgatcccgac ggctgcgact caaccccta ccgcatgggc aaccacagct   660
tctacggccc taaacagatc gtcgatacca gctcgaagtt caccgtcgtg acgcagttcc   720
tcacggatga cggcacctcc accggcaccc tctctgaaat ccgccgcttc tatgtccaga   780
acggccaggt gatcccgaac tcggtgtcga ccatcagtgg cgtgagcggc aactccatca   840
ccaccgagtt ctgcactgcc cagaagcagg ccttcggcga cacggacgac ttctcaaagc   900
acggcggcct gtccggcatg agcgctgccc tctctcaggg tatggttctg gtcatgagtc   960
tgtgggatga tgtgagtttg atggacaaac atgcgcgttg acaaagagtc aagcagctga  1020
ctgagatgtt acagcacgcc gccaacatgc tctggctcga cagcacctac ccgaccaacg  1080
cgacctcctc caccccggt gccgcccgtg gaacctgcga catctcgtcc ggtgtccctg   1140
cggatgtcga atccaacgac cccaacgcct acgtggtcta ctcgaacatc aaggttggtc  1200
ccatcggctc gaccttcagc agcagcggct ctggatcttc ttcctctagc tccaccacta  1260
ccacgaccac cgcttcccca accaccacga cctcctccgc atcgagccgt ggcactggag  1320
tggcacagca ctggggccag tgtggtggac agggctggac cggccccaca acctgcgtca  1380
gcccttatac ttgccaggag ctgaacccct actactacca gtgtctgtaa               1430

SEQ ID NO: 96           moltype = AA  length = 532
FEATURE                 Location/Qualifiers
source                  1..532
                        mol_type = protein
                        organism = Talaromyces leycettanus
SEQUENCE: 96
MASLFSFKMY KAALVLSSLL AATQAQQAGT LTTETHPSLT WQQCSAGGSC TTQNGKVVID    60
ANWRWVHSTS GSNNCYTGNT WDATLCPDDV TCAANCALDG ADYSGTYGVT TSGNSLRLNF   120
VTQASQKNVG SRLYLMENDT TYQIFKLLNQ EFTFDVDVSN LPCGLNGALY LVAMDADGGM   180
AKYPTNKAGA KYGTGYCDSQ CPRDLKFING EANVEGWQPS SNDPNSGIGN HGSCCAEMDI   240
WEANSISNAV TPHPCDTPGQ VMCTGNNCCG TYSTTRYAGT CDPDGCDFNP YRMGNHSFYG   300
PKQIVDTSSK FTVVTQFLTD DGTSTGTLSE IRRFYVQNGQ VIPNSVSTIS GVSGNSITTE   360
FCTAQKQAFG DTDDFSKHGG LSGMSAALSQ GMVLVMSLWD DHAANMLWLD STYPTNATSS   420
TPGAARGTCD ISSGVPADVE SNDPNAYVVY SNIKVGPIGS TFSSSGSGSS SSSSTTTTTT   480
ASPTTTTSSA SSTGTGVAQH WGQCGGQGWT GPTTCVSPYT CQELNPYYYQ CL           532
```

| SEQ ID NO: 97 | moltype = DNA length = 1898 |
|---|---|
| FEATURE | Location/Qualifiers |
| source | 1..1898 |
| | mol_type = genomic DNA |
| | organism = Taloromyces leycettanus |

SEQUENCE: 97

```
atgcggtctc tcctggctct tgcccctacc ctgctcgcgc ctgttgttca ggctcagcaa    60
accatgtggg gtcaatgtaa gttcttttca ctgcttacca tgtataatct ttgatatcaa   120
gcatcatatc tgactcacgt tttaggcggt ggtcagggct ggaccggacc taccatctgt   180
gtagcaggcg cgacatgcag cacacagaac ccttgtaagt cgggccttca tcaaaacttc   240
aacatcacca cctcgatgga gcaggagttg acctgatctt tacccttagg gtatgcgcag   300
tgcaccccag cacctaccgc gccgacgacc ttgcaaacaa caactacgac gagctcgaaa   360
tcgtccacga ccacgagctc gaagtcgtcc acgaccacga gtggaagtgg cggtggaact   420
acgacctcaa cgtcagccac catcgcgcg gctccatctg gtaaccccata ctccggatac   480
cagctctatg tgaaccagga atactcgtcc gaggtgtacg cgtctgctat tccttcccttt   540
accggcactc tggtcgcgaa ggcaagcgcc gcggcagagg tgccatcttt cctgtggctg   600
taagttttt tgaccttgaa tgaacgccct gtcctctacg agtggccgca ggagctaatt   660
gagatgccaa tgaacaggga cactgcctcc aaggtgccac tgatgggcac ttacttgcag   720
gatatccagg cgaagaacgc tgctggcgcc aaccccccat atgccggtca attcgtggtt   780
tacgacttgc cggatcgtga ttgcgctgca ttggccagca atggagagta ctccattgct   840
aacaatggtg ttgccaacta caaggcttac atcgactcca tccgcgcgct tcttgttcaa   900
tactcgaacg tccatgtcat cctttcgatc ggtgagctat tgcagctccg cttttaaagcg   960
tttgactaga tcaatgtcgc taatggtacc taccgcacag agcccgacag cttggccaac  1020
cttgtcacca acctgaatgt tcagaagtgt gctaatgctc agagtgctta cctggagtgc  1080
atcaactatg ccctcactca gttgaacctc aagaacgttg ctatgtacat cgatgctggt  1140
gcgtgaacct tccctagtca gcccaaaata actgaaataa agagacggaa tgtactgatt  1200
gtcatgcagg tcatgctgga tggctcggct ggcccgccaa ccttagcccg ccgctcaac  1260
tctttgcttc cgtataccag aatgcaagct ccccagctgc cgttcgcggc ctggcaacca  1320
acgtggccaa ctataatgcc tggtcgatcg ccacttgccc atcttacacc caaggcgacc  1380
ccaactgcga cgagcagaaa tacatcaacg ctctcgctcc attgcttcag caacagggat  1440
ggtcatcagt tcactttatc accgataccg gtaagtctgc ctgtcctgcc aaccatgcgt  1500
tcaagagcgt tgcaatccta accatgctgg tatcttccag gccgtaacgg tgtccagcct  1560
accaagcaga atgcctgggg tgactggtgc aacgttatcg gaaccggctt cggtgtccgt  1620
cccaccacca acactggcga tccattggag gatgctttcg tctgggtcaa gcctggtggt  1680
gagagtgatg gtacttccaa cctccacttcg cctcgctacg acgcccactg cggttacagt  1740
gatgctcttc agcctgctcc tgaggctggt acctggttcg aggtaagctt ctgcatactg  1800
agatcgagaa tcctgaaagg gttaacctgc taatgcttcg gtgtttgata taggcttact  1860
ttgagcaact ccttaccaac gccaacccct ctttctaa                          1898
```

| SEQ ID NO: 98 | moltype = AA length = 464 |
|---|---|
| FEATURE | Location/Qualifiers |
| source | 1..464 |
| | mol_type = protein |
| | organism = Taloromyces leycettanus |

SEQUENCE: 98

```
MRSLLALAPT LLAPVVQAQQ TMWGQCGGQG WTGPTICVAG ATCSTQNPWY AQCTPAPTAP    60
TTLQTTTTTS SKSSTTTSSK SSTTTGGSGG GTTTSTSATI TAAPSGNPYS GYQLYVNQEY   120
SSEVYASAIP SLTGTLVAKA SAAAEVPSFL WLDTASKVPL MGTYLQDIQA KNAAGANPPY   180
AGQFVVYDLP DRDCAALASN GEYSIANNGV ANYKAYIDSI RALLVQYSNV HVILVIEPDS   240
LANLVTNLNV QKCANAQSAY LECINYALTQ LNLKNVAMYI DAGHAGWLGW PANLSPAAQL   300
FASVYQNASS PAAVRGLATN VANYNAWSIA TCPSYTQGDP NCDEQKYINA LAPLLQQQGW   360
SSVHFITDTG RNGVQPTKQN AWGDWCNVIG TGFGVRPTTN TGDPLEDAFV WVKPGGESDG   420
TSNSTSPRYD AHCGYSDALQ PAPEAGTWFE AYFEQLLTNA NPSF                    464
```

| SEQ ID NO: 99 | moltype = DNA length = 3060 |
|---|---|
| FEATURE | Location/Qualifiers |
| source | 1..3060 |
| | mol_type = genomic DNA |
| | organism = Aspergillus fumigatus |

SEQUENCE: 99

```
atgagattcg gttggctcga ggtggccgct ctgacggccg cttctgtagc caatgcccag    60
gtttgtgatg ctttcccgtc attgtttcgg atatagttga caatagtcat ggaaataatc   120
aggaattggc tttctctcca ccattctacc cttcgccttg gctgatggc cagggagagt   180
gggcagatgc ccatcgacgc gccgtcgaga tcgtttctca cgatgacactg gcggagaagg   240
ttaaccttac aacgggtact gggtgggttg cgacttttttt gttgacagtg agctttcttc   300
actgaccatc tacacagatg gaaatggac cgatgcgtcg gtcaaaccgg cagcgttccc   360
aggtaagctt gcaattctgc aacaacgtgc aagtgtagtt gctaaaacgc ggtggtcag   420
acttggtatc aactggggtc tttgtggcca ggattcccct ttgggtatcc gtttctgtga   480
gctataccccg cggagtcttt cagtccttgt attatgtct gatgattgtc tctgctatagc   540
tgacctcaac tccgccttcc ctgctggtac taatgtcgcc gcgacatggg acaagacact   600
cgcctacctt cgtggcaagg ccatgggtga ggaattcaac gacaagggcg tggacatttt   660
gctgggggcct gctgctggtc ctctcggcaa ataccccggac ggcggcagaa tctgggaagg   720
cttctctcct gatccggttc tcactggtgt acttttcgcc gaactatca agggtatcca   780
agacgcgggt gtgattctga tgccaagca ttacatcaat gaacagg agcatttcga   840
acaggttggc gaggcccagg atatgggtta caacatcacg gagacgatca gctccaacgt   900
ggatgacaag accatgcacg agttgtacct tggtgagta gttgacactg caaatgagga   960
ccttgattga ttttgactgac ctggaatgca ggccctttgc agatgctgtg cgcggtaaga  1020
ttttccgtag acttgacctc gcgacgaaga aatcgctgac gaaccatcgt agctggcgtt  1080
ggcgctgtca tgtgttccta caatcaaatc aacaacagct acggttgtca aaacagtcaa  1140
```

```
actctcaaca agctcctcaa ggctgagctg ggcttccaag gcttcgtcat gagtgactgg  1200
agcgctcacc acagcggtgt cggcgctgcc ctcgctgggt tggatatgtc gatgcctgga  1260
gacatttcct tcgacgacgg actctccttc tggggcacga acctaactgt cagtgttctt  1320
aacggcaccg ttccagcctg cgtgtcgat gacatggctg ttcgtatcat gaccgcgtac  1380
tacaaggttg gtcgtgaccg tcttcgtatt cccctaact tcagctcctg gacccgggat  1440
gagtacggct gggagcattc tgctgtctcc gagggagcct ggaccaaggt gaacgacttc  1500
gtcaatgtgc agcgcagtca ctctcagatc atccgtgaga ttggtgccgc tagtacagtg  1560
ctcttgaaga acacgggtgc tcttcctttg accggcaagg aggttaaagt gggtgttctc  1620
ggtgaagacg ctggttccaa cccgtggggt gctaacggct gccccgaccg cggctgtgat  1680
aacggcactc ttgctatggc ctgggtagt ggtactgcca acttcccta ccttgtcacc  1740
cccgagcagg ctatccagcg agaggtcatc agcaacggcg gcaatgtctt tgctgtgact  1800
gataacgggg ctctcagcca gatggcagat gttgcatctc aatccaggtg agtgcgggct  1860
cttagaaaaa gaacgttctc tgaatgaagt tttttaacca ttgcgaacag cgtgtctttg  1920
gtgtttgtca acgccgactc tggagagggt ttcatcagtg tcgacggcaa cgagggtgac  1980
cgcaaaaatc tcactctgtg gaagaacggc gaggccgtca ttgacactgt tgtcagccac  2040
tgcaacaaca cgattgtggt tattcacagt gttgggcccg tcttgatcga ccggtggtat  2100
gataacccca acgtcactgc catcatctgg gccggcttgc ccggtcagga gagtggcaac  2160
tccctggtcg acgtgctcta tggccgtc aaccccaacg ccaagacccc gttcacctgg  2220
ggcaagactc gggagtctta cggggctccc ttgctcaccg agcctaacaa tggcaatggt  2280
gctcccagg atgatttcaa cgagggcgtc ttcattgact accgtcactt tgacaagcgc  2340
aatgagaccc ccatttatga gtttggccat ggcttgagct acaccacctt tggttactct  2400
caccctgggg ttcaggccct caatagttcg agttcggcat atgtcccgac tagcggaacg  2460
accaagcctg cgccaaccta tggtgagatc ggtagtgccg ccgactacct gtatcccgag  2520
ggtctcaaaa gaattaccaa gtttatttac ccttggctca actcgaccga cctcgaggat  2580
tcttctgacg acccgaacta cggctgggag gactcggagt acattcccga aggcgctagg  2640
gatgggtctc ctcaaccct cctgaaggct ggcggcgctc tggtggtaa ccctaccctt  2700
tatcaggatc ttgttagggt gtcggccacc ataaccaaca ctggtaacgt cgccggttat  2760
gaagtccctc aattggtgag tgaccccgcat gttccttgcg ttgcaatttg gctaactcgc  2820
ttctagtatg tttcactggg cggaccgaac gagcctcggg tcgttctgcg caagttcgac  2880
cgaatcttcc tggctcctgg ggagcaaaag gtttggacca cgactcttaa ccgtcgtgag  2940
ctcgccaatt gggatgtgga ggctcaggac tgggtcatca caaagtaccc caagaaagtg  3000
cacgtcggca gctcctcgcg taagctgcct ctgagagcgc ctctgccccg tgtctactag  3060
```

```
SEQ ID NO: 100         moltype = AA  length = 863
FEATURE                Location/Qualifiers
source                 1..863
                       mol_type = protein
                       organism = Aspergillus fumigatus
SEQUENCE: 100
MRFGWLEVAA LTAASVANAQ ELAFSPPFYP SPWADGQGEW ADAHRRAVEI VSQMTLAEKV   60
NLTTGTGWEM DRCVGQTGSV PRLGINWGLC GQDSPLGIRF SDLNSAFPAG TNVAATWDKT  120
LAYLRGKAMG EEFNDKGVDI LLGPAAGPLG KYPDGGRIWE GFSPDPVLTG VLFAETIKGI  180
QDAGVIATAK HYILNEQEHF RQVGEAQGYG YNITETISSN VDDKTMHELY LWPFADAVRA  240
GVGAVMCSYN QINNSYGCQN SQTLNKLLKA ELGFQGFVMS DWSAHHSGVG AALAGLDMSM  300
PGDISFDDGL SFWGTNLTVS VLNGTVPAWR VDDMAVRIMT AYYKVGRDRL RIPPNFSSWT  360
RDEYGWEHSA VSEGAWTKVN DFVNVQRSHS QIIREIGAAS TVLLKNTGAL PLTGKEVKVG  420
VLGEDAGSNP WGANGCPDRG CDNGTLAMAW GSGTANFPYL VTPEQAIQRE VISNGGNVFA  480
VTDNGALSQM ADVASQSSVS LVFVNADSGE GFISVDGNEG DRKNLTLWKN GEAVIDTVVS  540
HCNNTIVVIH SVGPVLIDRW YDNPNVTAII WAGLPGQESG NSLVDVLYGR VNPSAKTPFT  600
WGKTRESYGA PLLTEPNNGN GAPQDDFNEG VFIDYRHFDK RNETPIYEFG HGLSYTTFGY  660
SHLRVQALNS SSSAYVPTSG ETKPAPTYGE IGSAADYLYP EGLKRITKFI YPWLNSTDLE  720
DSSDDPNYGW EDSEYIPEGA RDGSPQPLLK AGGAPGGNPT LYQDLVRVSA TITNTGNVAG  780
YEVPQLYVSL GGPNEPRVVL RKFDRIFLAP GEQKVWTTTL NRRDLANWDV EAQDWVITKY  840
PKKVHVGSSS RKLPLRAPLP RVY                                          863

SEQ ID NO: 101         moltype = DNA  length = 835
FEATURE                Location/Qualifiers
source                 1..835
                       mol_type = genomic DNA
                       organism = Penicillium sp. emersonii
SEQUENCE: 101
atgctgtctt cgacgactcg caccctcgcc tttacaggcc ttgcgggcct tctgtccgct   60
cccctggtca aggcccatgg ctttgtccag ggcattgtca tcggtgacca attgtaagtc  120
cctctcttgc agttctgtcg attaactgct ggactgcttc cttgactccc tgctgactcct  180
caacagctac agcgggtaca tcgtcaactc gttcccctac gaatccaacc cacccccgt  240
catcggctgg gccacgaccg ccacgacct gggcttcgtc gacggcacag gataccaagg  300
cccggacatc atctgccacc ggaatgcgac gcccgcgccg ctgacagccc ccgtggccgc  360
cggcggcacc gtcgagctgc agtggacgcc gtggccggac agccaccacg accccgtcat  420
cacctacctg cgccgtgca acggcaactg ctcgaccgtc gacaagacga cgctggagtt  480
cttcaagatc gaccagcagg gcctgatcga cgacacgagc ccgccgggca cctgggcgtc  540
ggacaacctc atcgccaaca caatagctg accgtcacc attccaaca gcgtcgcccc  600
cggcaactac gtcctgcgcc acgagatcat cgccctgcac tcgccaaca caaggacgg  660
cgcccagaac taccccagt gcatcaacat cgaggtcacg gcggcggct ccgacgcgcc  720
tgagggtact ctgggcgagg atctctacca tgcaccgac ccgggcatc tggtcgacat  780
ttacgagccc attgcgacgt ataccattcc ggggcgcct gagccgacgt tctag       835

SEQ ID NO: 102         moltype = AA  length = 253
FEATURE                Location/Qualifiers
source                 1..253
```

```
                        mol_type = protein
                        organism = Penicillium sp. Emersonii
SEQUENCE: 102
MLSSTTRTLA FTGLAGLLSA PLVKAHGFVQ GIVIGDQFYS GYIVNSFPYE SNPPPVIGWA    60
TTATDLGFVD GTGYQGPDII CHRNATPAPL TAPVAAGGTV ELQWTPWPDS HHGPVITYLA   120
PCNGNCSTVD KTTLEFFKID QQGLIDDTSP PGTWASDNLI ANNNSWTVTI PNSVAPGNYV   180
LRHEIIALHS ANNKDGAQNY PQCINIEVTG GGSDAPEGTL GEDLYHDTDP GILVDIYEPI   240
ATYTIPGPPE PTF                                                     253

SEQ ID NO: 103          moltype = DNA  length = 1520
FEATURE                 Location/Qualifiers
source                  1..1520
                        mol_type = genomic DNA
                        organism = Talaromyces leycettanus
SEQUENCE: 103
atggtccatc tttcttccct ggccctggct ttggccgccg gctcgcagct gtatgtgatc    60
catgccatga ctcgagaagt gctcccaaaa ctgactccaa gtctcaatct tagtgcccaa   120
gctgcaggtc ttaacactgc tgccaaagcg atttggaaag tctatttcgg taccgcaacc   180
gacaacccgg agctgtccga cagcacatac atgcaggaga cggataacac cgatgatttc   240
ggccaactca ccccagctaa ctccatgaag gttcgctgac atcttagttc cccccccctt   300
ttgggaatct gcgcggagat atgctgagcc ttcaaaacta gtgggatgcc accgagccct   360
ctcagaacac cttcaccttc accaacggtg atcagatcgc aaaccttgct aagagcaacg   420
gtcagatgct gagatgccac aacctggtgt ggtacaacca gttgcccagc tggggtaagc   480
aaccggttct gttaatatca tcagcgtgac cgcatcgatc gtattgcgcg agattggaa   540
agatttgcaa gctaatgtca ctacagtcac cagcggatct tggaccaatg ccacgcttct   600
tgcggccatg aagaaccaca tcaccaacgt tgtgacccac tacaagggac atgctacgc   660
ttgggatgtt gtcaacgaag gtacgtttcg attcggcttc cctcggaccg tatctgcagg   720
caaaaaggtc aatcaattga caatcgtgat ccccagctct caacgatgat ggcacctacc   780
gatccaatgt cttctatcag tacatcggcg aggcatacat tccattgcc tttgcgaccg   840
ctgccgccgc cgatccaaac gcgaagctct actacaacga ctacaacatt gagtacccg   900
gcgccaaggc caccgccgcc cagaacatcg tcaagatggt caaggcttac ggcgcgaaaa   960
tcgacggtgt cggtctgcaa tctcacttca tcgttggcag caccctagc cagagctccc  1020
agcagagcaa catggctgct ttcaccgcgc tcggcgtcga ggtcgccatc accgaactgg  1080
atatccgcat gacgttgcct tccaccagtg ctctcttggc ccagcaatcc accgattacc  1140
agagcactgt gtcggcttgc gtgaacactc cgaagtgcat tggtatcacc tctcgggact  1200
ggaccgacaa gtactcctgg gttcccaaca ccttctccgg ccaaggtgac gcctgccct   1260
gggattctaa ctaccagaag aagcctgcct actacggtat cttgactgcg ctcggaggca  1320
gcgcttccac ctccaccacc accactctgg tgacctccac caggacttcg actacgacca  1380
gcacttcggc cacctccacg tctactgcg ttgctcagca ctggggccag tgcggtggta  1440
tcggctggac agggccgact acctgcgcta gcccctacac ctgccaggaa ctgaatccct  1500
actactacca gtgcctgtaa                                              1520

SEQ ID NO: 104          moltype = AA  length = 405
FEATURE                 Location/Qualifiers
source                  1..405
                        mol_type = protein
                        organism = Talaromyces leycettanus
SEQUENCE: 104
MVHLSSLALA LAAGSQLAQA AGLNTAAKAI GKLYFGTATD NPELSDSTYM QETDNTDDFG    60
QLTPANSMKW DATEPSQNTF TFTNGDQIAN LAKSNGQMLR CHNLVWYNQL PSWVTSGSWT   120
NATLLAAMKN HITNVVTHYK GQCYAWDVVN EALNDDGTYR SNVFYQYIGE AYIPIAFATA   180
AAADPNAKLY YNDYNIEYPG AKATAAQNIV KMVKAYGAKI DGVGLQSHFI VGSTPSQSSQ   240
QSNMAAFTAL GVEVAITELD IRMTLPSTSA LLAQQSTDYQ STVSACVNTP KCIGITLWDW   300
TDKYSWVPNT FSGQGDACPW DSNYQKKPAY YGILTALGGS ASTSTTTLV TSTRTSTTTS   360
TSATSTSTGV AQHWGQCGGI GWTGPTTCAS PYTCQELNPY YYQCL                  405

SEQ ID NO: 105          moltype = DNA  length = 1197
FEATURE                 Location/Qualifiers
source                  1..1197
                        mol_type = other DNA
                        organism = Trichophaea sacatta
SEQUENCE: 105
atgcgtacct tctcgtctct tctcggtgtt gcccttctct tgggtgcagc taatgcccag    60
gtcgcggttt ggggacagtg tggtggcatt ggttactctg gctcgacaac ctgcgctgcg   120
ggaacgactt tgttaagct gaacgactac tactcccaat gccaaccggg cggtaccact   180
ttgacaacca ccaccaaacc cgccaccact accactacca ccacggcaac ttctccctca   240
tcttctcccg gattaaatgc cctggcacaa agagcggcc ggtacttcgg tagtgcaact   300
gacaacccag agctctccga tgcggcatac attgccatcc tgagcaacaa aaacgagttt   360
gggatcatca cgctcggaaa ctcgatgaaa tgggatgcta ctgaacctca ccgcgggagt   420
ttctcgttca ctggtggaca gcaaattgtt gatttttgcgc agggcaatgg gcaggctatc   480
agaggccata ctcttgtctg gtactcccag ttgccgtcct gggttactag cggaaacttc   540
gataaagcta cattgacatc gatcatgcaa atcacatta caactcttgt cagccactgg   600
aagggccagc tcgcctactg ggatgttgtc aacgaagcat tcaacgatga tggcactttc   660
cgtcaaaacg tgttctacac aaccattgga ggagactaca tccagctcgc cttcgaagcc   720
gccgttgccg ccgaccccga cgcaaagctc tgcatcaacg actacaacat tgagggcact   780
ggagccaagt caacagccat gtacaatctc gtctcgaagc tgaaatcgc cggcgttccc   840
atcgactgta ttggtgttca gggacacctc atcgtcggtg aagttccac accatccaa   900
gcaaaccttg cccagtttgc gtcctttggt gtggatgtcg cgatcacgga gctagatatc   960
agaatgacgc tgccatctac gactgcattg ctccagcagc aggctaagga ttacgtctcg  1020
```

```
gttgttacag cctgcatgaa tgttcccagg tgtatcggta tcaccatctg ggactacact   1080
gataaatact cttgggtgcc acaaaccttc agcggccagg gcgatgcttg cccatgggat   1140
gccaacctgc agaagaagcc agcctactcc gctattgcgt ctgctcttgc ggcttga      1197

SEQ ID NO: 106           moltype = AA  length = 398
FEATURE                  Location/Qualifiers
source                   1..398
                         mol_type = protein
                         organism = Trichophaea saccata
SEQUENCE: 106
MRTFSSLLGV ALLLGAANAQ VAVWGQCGGI GYSGSTTCAA GTTCVKLNDY YSQCQPGGTT    60
LTTTTKPATT TTTTTATSPS SSPGLNALAQ KSGRYFGSAT DNPELSDAAY IAILSNKNEF   120
GIITPGNSMK WDATEPSRGS FSFTGGQQIV DFAQGNGQAI RGHTLVWYSQ LPSWVTSGNF   180
DKATLTSIMQ NHITTLVSHW KGQLAYWDVV NEAFNDDGTF RQNVFYTTIG EDYIQLAFEA   240
ARAADPTAKL CINDYNIEGT GAKSTAMYNL VSKLKSAGVP IDCIGVQGHL IVGEVPTTIQ   300
ANLAQFASLG VDVAITELDI RMTLPSTTAL LQQQAKDYVS VVTACMNVPR CIGITIWDYT   360
DKYSWVPQTF SGQGDACPWD ANLQKKPAYS AIASALAA                          398

SEQ ID NO: 107           moltype = DNA  length = 2391
FEATURE                  Location/Qualifiers
source                   1..2391
                         mol_type = other DNA
                         organism = Talaromyces emersonii
SEQUENCE: 107
atgatgactc ccacggcgat tctcaccgca gtggcggcgc tcctgcccac cgcgacatgg     60
gcacaggata accaaaccta tgccaattac tcgtcgcagt ctcagccgga cctgtttccc    120
cggaccgtcg cgaccatcga cctgtccttc cccgactgtg agaatgggcc gctcagcacg    180
aacctggtgt gcaacaaatc ggccgatccc tgggcccgag ctgaggccct catctcgctc    240
tttaccctcg aagagctgat taacaacacc cagaacaccg ctcctggcgt gccccgtttg    300
ggtctgcccc agtatcaggt gtggaatgaa gctctgcacg gactggaccg cgccaatttc    360
tcccattcgg gcgaatacag ctgggccacg tccttcccca tgcccatcct gtcgatggca    420
tccttcaacc ggaccctcat caaccagatt gcctccatca ttgcaacgca agcccgtgcc    480
ttcaacaacg ccggccgtta cggccttgac agctatgcgc caacatcaa tggcttccgc     540
agtcccctct ggggccgtgg acaggagacg cctggtgagg atgcgttctt cttgagttcc    600
acctatgcgt acgagtacat cacaggcctg cagggcgtcg tcgacccaga gcatgtcaag    660
atcgtcgcga cggcgaagca cttcgccggc tatgatctgg agaactgggg caacgtctct    720
cggctggggt tcaatgctat catcacgcag caggatctct ccgagtacta caccctcag     780
ttcctggcgt ctgctcgata cgccaagacg cgcagcatca tgtgctccta caatgcagtg    840
aatggagtcc caagctgtgc caactccttc ttcctccaga cgcttctccg agaaaactt     900
gacttcgttg acgacgggta cgtctcgtcg gattgcgacg ccgtctacaa cgtcttcaac    960
ccacacggtt acgcccttaa ccagtcggga gccgctgcgg actcgctcct agcaggtacc   1020
gatatcgact gtggtcagac cttgccgtgg cacctgaatg agtccttcgt agaaggatac   1080
gtctcccgcg gtgatatcga gaatccctc accgtctct actcaaacct ggtcgtctc    1140
ggctactttg acggcaacaa cagcgagtac cgcaacctca actggaacga cgtcgtgact   1200
acggacgcct ggaacatctc gtacgaggcc gcggtggaag gtatcaccct gctcaagaac   1260
gacggaacgc tgccgctgtc caagaaggtc cgcagcattg cgctcatcgg tccttgggcc   1320
aatgccacgg tgcagatgca gggtaactac tatggaaccg taccgtatct gatcagtccg   1380
ctggaagccg ccaaggccag tgggttcacg tcaactatg cattcggtac caacatctg    1440
accgattcta cccagtggtt cgcggaagcc atcgcggcgg cgaagaagtc ggacgtgatc   1500
atctacgccg tggtattga caacacgatc gaggcagagg acaggaccg cacggatctc    1560
aagtggccgg ggaaccagct ggatctgatc agcagctca gccaggtggg caagcccttg    1620
gtcgtcctgc agatgggcgg tggccaggtg gattcgtcgt cactcaaggc caacaagaat   1680
gtcaacgctc tggtgtgggg tggctatccc ggacagtcgg gtggtgcggc cctgtttgac   1740
atccttacgg gcaagcgtgc gccggccggt cgtctggtga gcacgcagta cccggccgag   1800
tatgcgacgc agttcccggc caacgacatg aacctgcgtc gaacggcag caacccggga   1860
cagacataca tctggtacac gggcacgccc gtgtatgagt cggccacgg tctgttctac   1920
acggagttcc aggagtcggc tgcggcgggc acgaacaaga cgtcgacttt cgacattctg   1980
gacctttct ccacccctca tccgggatac gagtacatcg agcaggttcc gttcatcaac    2040
gtgactgtgg acgtgaagaa cgtcggccac acgcgtcacg cgtacgcggg tctgttgttc   2100
gcgaacacga cagccggcc caagcgctac ccgaacaaat ggctcgtcgg gttcgactgg    2160
ctgccgacga tccagccggg cgagactgcc aagttgacga tcccggtgcc gttgggcgcg   2220
attgcgtggg cggacgagaa cggcaacaag gtggtcttcc cgggcaacta cgaattggca   2280
ctgaacaatg agcgatcgt agtggtgtcg ttcacgctga cggcgatgc ggcgactcta    2340
gagaaatggc ctttgtggga gcaggcggtt ccggggggtgc tgcagcaata a           2391

SEQ ID NO: 108           moltype = AA  length = 796
FEATURE                  Location/Qualifiers
source                   1..796
                         mol_type = protein
                         organism = Talaromyces emersonii
SEQUENCE: 108
MMTPTAILTA VAALLPTATW AQDNQTYANY SSQSQPDLFP RTVATIDLSF PDCENGPLST    60
NLVCNKSADP WARAEALISL FTLEELINNT QNTAPGVPRL GLPQYQVWNE ALHGLDRANF   120
SHSGEYSWAT SFPMPILSMA SFNRTLINQI ASIIATQARA FNNAGRYGLD SYAPNINGFR   180
SPLWGRGQET PGEDAFFLSS TYAYEYITGL QGGVDPEHVK IVATAKHFAG YDLENWGNVS   240
RLGFNAIITQ QDLSEYYTPQ FLASARYAKT RSIMCSYNAV NGVPSCANSF FLQTLLRENF   300
DFVDDGYVSS DCDAVYNVFN PHGYALNQSG AAADSLLAGT DIDCGQTLPW HLNESFVEGY   360
VSRGDIEKSL TRLYSNLVRL GYFDNNSEY RNLNWNDVVT TDAWNISYEA AVEGITLLKN    420
DGTLPLSKKV RSIALIGPWA NATVQMQGNY YGTPPYLISP LEAAKASGFT VNYAFGTNIS   480
```

```
TDSTQWFAEA IAAAKKSDVI IYAGGIDNTI EAEGQDRTDL KWPGNQLDLI EQLSQVGKPL    540
VVLQMGGGQV DSSSLKANKN VNALVWGGYP GQSGGAALFD ILTGKRAPAG RLVSTQYPAE    600
YATQFPANDM NLRPNGSNPG QTYIWYTGTP VYEFGHGLFY TEFQESAAAG TNKTSTFDIL    660
DLFSTPHPGY EYIEQVPFIN VTVDVKNVGH TPSPYTGLLF ANTTAGPKPY PNKWLVGFDW    720
LPTIQPGETA KLTIPVPLGA IAWADENGNK VVFPGNYELA LNNERSVVVS FTLTGDAATL    780
EKWPLWEQAV PGVLQQ                                                   796

SEQ ID NO: 109            moltype = DNA  length = 1507
FEATURE                   Location/Qualifiers
source                    1..1507
                          mol_type = genomic DNA
                          organism = Trichoderma reesei
SEQUENCE: 109
atggcgccct cagttacact gccgttgacc acggccatcc tggccattgc ccggctcgtc     60
gccgcccagc aacgggtac cagcacccc gaggtccatc ccaagttgac aacctacaag    120
tgtacaaagt ccgggggtg cgtggcccag gacacctcgg tggtccttga ctggaactac    180
cgctggatgc acgacgcaaa ctacaactcg tgcaccgtca acggcggcgt caacaccacg    240
ctctgccctg acgaggcgac ctgtggcaag aactgcttca tcgagggcgt cgactacgcc    300
gcctcgggcg tcacgacctc gggcagcagc ctcaccatga accagtacat gcccagcagc    360
tctggcggct acagcagcgt ctctcctcgg ctgtatctcc tggactctga cggtgagtac    420
gtgatgctga agctcaacgg ccaggagctg agcttcgacg tcgacctctc tgctctgccg    480
tgtggagaga acggctcgct ctacctgtct cagatggacg agaacggggg cgccaaccag    540
tataacacgg ccggtgccaa ctacggggagc ggctactgcg atgctcagtg ccccgtccag    600
acatggagga acggcaccct caacactagc caccagggct ctgctgcaa cgagatggat    660
atcctggagg gcaactcgag ggcgaatgcc ttgacccctc actcttgcac ggccacggcc    720
tgcgactctg ccggttgcgg cttcaacccc tatggcagcg gctacaaaag gtgagcctga    780
tgccactact accccttcc tggcgctctc gcggttttcc atgctgacat ggttttccag    840
ctactacggc cccggagata ccgttgcacc ctccaagacc ttcaccatca tcacccagtt    900
caacacggac aacggctcgc cctcgggcaa ccttgtgagc atcacccgca agtaccagca    960
aaacggcgtc gacatcccca gcgcccagcc cggcggcgac accatctcgt cctgcccgtc   1020
cgcctcagcc tacggcggcc tcgccaccat gggcaaggcc ctgagcagcg gcatggtgct   1080
cgtgttcagc atttggaacg acaacagcca gtacatgaac tggctcgaca gcggcaacgc   1140
cggcccctgc agcagcaccg agggcaaccc atccaacatc ctggccaaca ccccaacac   1200
gcacgtcgtc ttctccaaca tccgctgggg agacattggg tctactacga actcgactcg   1260
gccccccgcc ccgcctgcgt ccagcacgac gttttcgact acacggaggca gctcgacgac   1320
ttcgagcagc ccgagctgca cgcagactca ctgggggcag tcggtggca tttgggtacag   1380
cgggtgcaag acgtgcacgt cgggcactac gtgccagtat agcaacgact gttcgtatcc   1440
ccatgcctga cgggagtgat tttgagatgc taaccgctaa aatacagact actcgcaatg   1500
cctttag                                                             1507

SEQ ID NO: 110            moltype = AA  length = 459
FEATURE                   Location/Qualifiers
source                    1..459
                          mol_type = protein
                          organism = Trichoderma reseei
SEQUENCE: 110
MAPSVTLPLT TAILAIARLV AAQQPGTSTP EVHPKLTTYK CTKSGGCVAQ DTSVVLDWNY     60
RWMHDANYNS CTVNGGVNTT LCPDEATCGK NCFIEGVDYA ASGVTTSGSS LTMNQYMPSS    120
SGGYSSVSPR LYLLDSDGEY VMLKLNGQEL SFDVDLSALP CGENGSLYLS QMDENGGANQ    180
YNTAGANYGS GYCDAQCPVQ TWRNGTLNTS HQGFCCNEMD ILEGNSRANA LTPHSCTATA    240
CDSAGCGFNP YGSGYKSYYG PGDTVDTSKT FTIITQFNTD NGSPSGNLVS ITRKYQQNGV    300
DIPSAQPGGD TISSCPSASA YGGLATMGKA LSSGMVLVFS IWNDNSQYMN WLDSGNAGPC    360
SSTEGNPSNI LANNPNTHVV FSNIRWGDIG STTNSTAPPP PPASSTTFST TRRSSTTSSS    420
PSCTQTHWGQ CGGIGYSGCK TCTSGTTCQY SNDYYSQCL                           459

SEQ ID NO: 111            moltype = DNA  length = 1507
FEATURE                   Location/Qualifiers
source                    1..1507
                          mol_type = genomic DNA
                          organism = Tirchoderma reesei
SEQUENCE: 111
atggcgccct cagttacact gccgttgacc acggccatcc tggccattgc ccggctcgtc     60
gccgcccagc aacgggtac cagcacccc gaggtccatc ccaagttgac aacctacaag    120
tgtacaaagt ccgggggtg cgtggcccag gacacctcgg tggtccttga ctggaactac    180
cgctggatgc acgacgcaaa ctacaactcg tgcaccgtca acggcggcgt caacaccacg    240
ctctgccctg acgaggcgac ctgtggcaag aactgcttca tcgagggcgt cgactacgcc    300
gcctcgggcg tcacgacctc gggcagcagc ctcaccatga accagtacat gcccagcagc    360
tctggcggct acagcagcgt ctctcctcgg ctgtatctcc tggactctga cggtgagtac    420
gtgatgctga agctcaacgg ccaggagctg agcttcgacg tcgacctctc tgctctgccg    480
tgtggagaga acggctcgct ctacctgtct cagatggacg agaacggggg cgccaaccag    540
tataacacgg ccggtgccaa ctacggggagc ggctactgcg atgctcagtg ccccgtccag    600
acatggagga acggcaccct caacactagc caccagggct ctgctgcaa cgagatggat    660
atcctggagg gcaactcgag ggcgaatgcc ttgacccctc actcttgcac ggccacggcc    720
tgcgactctg ccggttgcgg cttcaacccc tatggcagcg gctacaaaag gtgagcctga    780
tgccactact accccttcc tggcgctctc gcggttttcc atgctgacat ggttttccag    840
ctactacggc cccggagata ccgttgcacc ctccaagacc ttcaccatca tcacccagtt    900
caacacggac aacggctcgc cctcgggcaa ccttgtgagc atcacccgca agtaccagca    960
aaacggcgtc gacatcccca gcgcccagcc cggcggcgac accatctcgt cctgcccgtc   1020
cgcctcagcc tacggcggcc tcgccaccat gggcaaggcc ctgagcagcg gcatggtgct   1080
```

```
cgtgttcagc atttggaacg acaacagcca gtacatgaac tggctcgaca gcggcaacgc  1140
cggcccctgc agcagcaccg agggcaaccc atccaacatc ctggccaaca accccaacac  1200
gcacgtcgtc ttctccaaca tccgctgggg agacattggg tctactacga actcgactgc  1260
gccccgccc ccgcctgcgt ccagcacgac gttttcgact acacggagga gctcgacgac  1320
ttcgagcagc ccgagctgca cgcagactca ctggggggca tcggtggca ttgggtacag  1380
cgggtgcaag acgtgcacgt cgggcactac gtgccagtat agcaacgga gttcgtatcc  1440
ccatgcctga cgggagtgat tttgagatgc taaccgctaa aatacagact actcgcaatg  1500
cctttag                                                            1507

SEQ ID NO: 112           moltype = AA   length = 418
FEATURE                  Location/Qualifiers
source                   1..418
                         mol_type = protein
                         organism = Trichoderma Reesei
SEQUENCE: 112
MNKSVAPLLL AASILYGGAA AQQTVWGQCG GIGWSGPTNC APGSACSTLN PYYAQCIPGA  60
TTITTSTRPP SGPTTTTRAT STSSSTPPTS SGVRFAGVNI AGFDFGCTTD GTCVTSKVYP  120
PLKNFTGSNN YPDGIGQMQH FVNDDGMTIF RLPVGWQYLV NNNLGGNLDS TSISKYDQLV  180
QGCLSLGAYC IVDIHNYARW NGGIIGQGGP TNAQFTSLWS QLASKYASQS RVWFGIMNEP  240
HDVNINTWAA TVQEVVTAIR NAGATSQFIS LPGNDWQSAG AFISDGSAAA LSQVTNPDGS  300
TTNLIFDVHK YLDSDNSGTH AECTTNNIDG AFSPLATWLR QNNRQAILTE TGGGNVQSCI  360
QDMCQQIQYL NQNSDVYLGY VGWGAGSFDS TYVLTETPTG SGNSWTDTSL VSSCLARK    418

SEQ ID NO: 113           moltype = DNA   length = 1599
FEATURE                  Location/Qualifiers
source                   1..1599
                         mol_type = other DNA
                         organism = Aspergillus Fumigatus
SEQUENCE: 113
atgctggcct ccaccttctc ctaccgcatg tacaagaccg cgctcatcct ggccgccctt  60
ctgggctctg gccaggctca gcaggtcggt acttcccagg cggaagtgca tccgtccatg  120
acctggcaga gctgcacggc tggcggcagc tgcaccacca acaacggcaa ggtggtcatc  180
gacgcgaact ggcgttgggt gcacaaagtc ggcgactaca ccaactgcta caccggcaac  240
acctgggaca cgactatctg ccctgacgat gcgaccgcgc catccaactg cgcccttgag  300
ggtgccaact acgaatccac ctatggtgtg accggcaacg gcaattccct ccgcctcaac  360
ttcgtcacca ccagccagca gaagaacatt ggctcgcgtc tgtacatgat gaaggacgac  420
tcgacctacg agatgtttaa gctgctgaac caggagttca ccttcgatgt cgatgtctcc  480
aacctcccct gcggtctcaa cggtgctctg tactttgtcg ccatggacgc cgacggtggc  540
atgtccaagt acccaaccaa caaggccggt gccaagtacg gtacttgata ctgtgactcg  600
cagtgccctc gcgacctcaa gttcatcaac ggtcaggcaa acgtcgaagg gtggcagccc  660
tcctccaacg atgccaatgc gggtaccggc aaccacgggt cctgctgcgc ggagatggat  720
atctgggagg ccaacagcat ctccacggcc ttcaccccc atccgtgcga cacgcccggc  780
caggtgatgt gcaccggtga tgcctgcggt ggcacctaca gctccgaccg ctacggcggc  840
acctgcgacc ccgacggatg tgatttcaac tccttccgcc agggcaacaa gaccttctac  900
ggccctggca tgaccgtcga caccaagagc aagtttaccg tcgtcaccca gttcatcacc  960
gacgacggca cctccagcgg caccctcaag gagatcaagc gcttctacgt gcagaacggc  1020
aaggtgatcc caactcgga gtcgacctgg accggcgtca gcggcaactc catcaccacc  1080
gagtactgca ccgcccagaa gagcctgttc caggaccaga acgtcttcga aaagcacggc  1140
ggcctcgagg gcatgggtgc tgccctcgcc cagggtatgg ttctcgtcat gtccctgtgg  1200
gatgatcact cggccaacat gctctggctc gacagcaact acccgaccac tgcctcttcc  1260
accactcccg gcgtcgcccg tggtacctgc gacatctcct ccggcgtcc tgccgatgtc  1320
gaggcgaacc accccgacgc ctacgtcgtc tactccaaca tcaaggtcgg ccccatcggc  1380
tcgaccttca cagcggtgg ctcgaacccc ggtggcggaa ccaccacgac aactaccacc  1440
cagcctacta ccaccacgac cacggctgga accctggcg caccggagt cgcacagcac  1500
tatggccagt gtggtggaat cggatggacc ggacccacaa cctgtgccag cccttatacc  1560
tgccagaagc tgaatgatta ttactctcag tgcctgtag                         1599

SEQ ID NO: 114           moltype = AA   length = 532
FEATURE                  Location/Qualifiers
source                   1..532
                         mol_type = protein
                         organism = Aspergillus fumigatus
SEQUENCE: 114
MLASTFSYRM YKTALILAAL LGSGQAQQVG TSQAEVHPSM TWQSCTAGGS CTTNNGKVVI  60
DANWRWVHKV GDYTNCYTGN TWDTTICPDD ATCASNCALE GANYESTYGV TSGNSLRLN   120
FVTTSQQKNI GSRLYMMKDD STYEMFKLLN QEFTFDVDVS NLPCGLNGAL YFVAMDADGG  180
MSKYPTNKAG AKYGTGYCDS QCPRDLKFIN GQANVEGWQP SSNDANAGTG NHGSCCAEMD  240
IWEANSISTA FTPHPCDTPG QVMCTGDACG GTYSSDRYGG TCDPDGCDFN SFRQGNKTFY  300
GPGMTVDTKS KFTVVTQFIT DDGTSSGTLK EIKRFYVQNG KVIPNSESTW TGVSGNSITT  360
EYCTAQKSLF QDQNVFEKHG GLEGMGAALA QGMVLVMSLW DDHSANMLWL DSNYPTTASS  420
TTPGVARGTC DISSGVPADV EANHPDAYVV YSNIKVGPIG STFNSGGSNP GGGTTTTTT   480
QPTTTTTAG NPGGTGVAQH YGQCGGIGWT GPTTCASPYT CQKLNDYYSQ CL           532

SEQ ID NO: 115           moltype = DNA   length = 1713
FEATURE                  Location/Qualifiers
source                   1..1713
                         mol_type = genomic DNA
                         organism = Aspergillus fumigatus
SEQUENCE: 115
```

-continued

```
atgaagcacc ttgcatcttc catcgcattg actctactgt tgcctgccgt gcaggcccag    60
cagaccgtat ggggccaatg tatgttctgc ctgtcactgg aataagactg tatcaactgc   120
tgatatgctt ctaggtggcg gccaaggctg gtctggcccg acgagctgtg ttgccggcgc   180
agcctgtagc acactgaatc cctgtatgtt agatatcgtc ctgagtggag acttatactg   240
acttccttag actacgctca gtgtatcccg ggagccacca cgacgtccac caccctcacg   300
acgacgacgg cggcgacgac gacatcccga accaccacca aacctaccac gactggtcca   360
actacatccg cacccaccgt gaccgcatcc ggtaacccttt tcagcggcta ccagctgtat   420
gccaaccccct actactcctc cgaggtccat actctggcca tgccttctct gcccagctcg   480
ctgcagccca aggctagtgc tgttgctgaa gtgcccctca ttgtttggct gtaagtggcc   540
ttatcccaat actgagacca actctctgac agtcgtagcg acgttgccgc caaggtgccc   600
actatgggaa cctaccctggc cgacattcag gccaagaaca aggccggcgc caaccctcct   660
atcgctggta tcttcgtggt ctacgacttg ccggaccgtg actgccgccg tctggccagt   720
aatggcgagt actcaattgc caacaacggt gtggccaact acaaggcgta cattgacgcc   780
atccgctcgc agctggtgaa gtactctgac gttcacacca tcctcgtcat cggtaggccg   840
tacacctccg ttgcgcgccc cctttctctg acatcttgca gaacccgaca gcttggccaa   900
cctggtgacc aacctcaacg tcgccaaatg cgccaatgcg cagagcgcct acctggagtg   960
tgtcgactat gctctgaagc agctcaacct gcccaacgtc gccatgtacc tcgacgcagg  1020
tatgcctcac ttccccgcatt ctgtatccct tccagacact aactcatcag gccatgcggt  1080
ctggctcgga tggcccgcca acttgggcc cgccgcaaca ctcttcgcca aagtctacac  1140
cgacgcgggt tcccccgcgg ctgttcgtgg cctggccacc aacgtcgcca actacaacgc  1200
ctggtcgctc agtacctgcc cctcctacac ccagggagac cccaactgcg acgagaagaa  1260
gtacatcaac gccatggccc tccttctcaa ggaagccggc ttcgatgccc acttcatcat  1320
ggatacctgt aagtgcttat tccaatcgcc gatgtgtgcc gactaatcaa tgtttcagcc  1380
cggaatggcg tccagcccac gaagcaaaac gcctggggtg actggtgcaa cgtcatcggc  1440
accggcttcg gtgttcgccc ctcgactaac accggcgatc cgctccagga tgcctttgtg  1500
tggatcaagc ccggtggaga gagtgatggc acgtccaagc cgacttcccc ccggtatgac  1560
gcgcactgcg gatatagtga tgctctgcag cctgctcctg aggctggtac ttggttccaa  1620
gtatgtcatc cattagccag atgagggata agtgactgac ggacctaggc ctactttgag  1680
cagcttctga ccaacgctaa cccgtccttt taa                                1713

SEQ ID NO: 116           moltype = AA  length = 454
FEATURE                  Location/Qualifiers
source                   1..454
                         mol_type = protein
                         organism = Aspergillus fumigatus
SEQUENCE: 116
MKHLASSIAL TLLLLPAVQAQ QTVWGQCGGQ GWSGPTSCVA GAACSTLNPY YAQCIPGATA    60
TSTTLTTTTA ATTTSQTTTK PTTTGPTTSA PTVTASGNPF SGYQLYANPY YSSEVHTLAM   120
PSLPSSLQPK ASAVAEVPSF VWLDVAAKVP TMGTYLADIQ AKNKAGANPP IAGIFVVYDL   180
PDRDCAALAS NGEYSIANNG VANYKAYIDA IRAQLVKYSD VHTILVIEPD SLANLVTNLN   240
VAKCANAQSA YLECVDYALK QLNLPNVAMY LDAGHAGWLG WPANLGPAAT LFAKVYTDAG   300
SPAAVRGLAT NVANYNAWSL STCPSYTQGD PNCDEKKYIN AMAPLLKEAG FDAHFIMDTS   360
RNGVQPTKQN AWGDWCNVIG TGFGVRPSTN TGDPLQDAFV WIKPGGESDG TSNSTSPRYD   420
AHCGYSDALQ PAPEAGTWFQ AYFEQLLTNA NPSF                               454

SEQ ID NO: 117           moltype = AA  length = 332
FEATURE                  Location/Qualifiers
SIGNAL                   1..26
PEPTIDE                  27..332
source                   1..332
                         mol_type = protein
                         organism = Aspergillus Niger
SEQUENCE: 117
MKFFNAKGSL LSSGIYLIAL TPFVNAKCSL PSSYSWSSTD ALATPKSGWT ALKDFTDVVS    60
DGKHIVYAST TDEAGNYGSM TFGAFSEWSN MASASQTATP FNAVAPTLFY FKPKSIWVLA   120
YQWGSSTFTY RTSQDPTNVN GWSSEQALFT GKLSDSSTGA IDQTVIGDDT NMYLFFAGDN   180
GKIYRSSMSI DEFPGSFGSQ YEEILSGATN DLFEAVQVYT VDGGEGNSKY LMIVEAIGST   240
GHRYFRSFTA SSLGGEWTAQ AASEDKPFAG KANSGATWTE DISHGDLVRN NPDQTMTVDP   300
CNLQLLYQGH DPNSSGDYNL LPWKPGVLTL KQ                                 332

SEQ ID NO: 118           moltype = AA  length = 332
FEATURE                  Location/Qualifiers
SIGNAL                   1..26
PEPTIDE                  27..332
source                   1..332
                         mol_type = protein
                         organism = Aspergillus Niger
SEQUENCE: 118
MKFLKAKGSL LSSGIYLIAL APFVNAKCAL PSTYSWTSTD ALATPKSGWT ALKDFTDVVS    60
NGKHIVYAST TDTDQGNYGSM GFGAFSDWSD MASASQTATS FSAVAPTLFY FQPKSIWVLA   120
YQWGSSTFTY RTSQDPTNVN GWSSEQALFT GKISGSSTGA IDQTVIGDDT NMYLFFAGDN   180
GKIYRSSMSI NDFPGSFGSQ YEEILSGATN DLFEAVQVYT VDGGEGDSKY LMIVEAIGST   240
GHRYFRSFTA SSLGGEWTAQ AASEDQPFAG KANSGATWTD DISHGDLVRN NPDQTMTVDP   300
CNLQLLYQGH DPNSNSDYNL LPWKPGVLTL KQ                                 332

SEQ ID NO: 119           moltype = AA  length = 319
FEATURE                  Location/Qualifiers
SIGNAL                   1..19
PEPTIDE                  20..319
```

```
source          1..319
                mol_type = protein
                organism = Aspergillus Niger
SEQUENCE: 119
MVQIKVAALA MLFASQVLSE PIEPRQASVS IDTKFKAHGK KYLGNIGDQY TLTKNSKTPA     60
IIKADFGALT PENSMKWDAT EPSRGQFSFS GSDYLVNFAQ SNNKLIRGHT LVWHSQLPSW    120
VQSITDKNTL IEVMENHITT VMQHYKGKIY AWDVVNEIFN EDGSLRDSVF YKVIGEDYVR    180
IAFETARAAD PNAKLYINDY NLDSASYPKL TGMVSHVKKW IAAGIPIDGI GSQTHLSAAL    240
NALAGAGTKE IAVTELDIAG ASSTDYVEVV EACLNQPKCI GITVWGVADP DSWRSSSTPL    300
LFDSNYNPKP AYTAIANAL                                                319
```